(12) United States Patent
Yoshimoto et al.

(10) Patent No.: US 6,607,008 B1
(45) Date of Patent: Aug. 19, 2003

(54) PULSATING VIBRATION AIR GENERATION MEANS

(75) Inventors: Hirokazu Yoshimoto, Shizuoka (JP); Kiyoshi Morimoto, Shizuoka (JP); Yuji Iwase, Shizuoka (JP); Kazue Murata, Hirakat (JP)

(73) Assignees: Kyowa Hakko Kogyo Co., Ltd., Tokyo (JP); Kabushikikaisha Matsui Seisakusho, Osaka (JP)

( * ) Notice: Subject to any disclaimer, the term of this patent is extended or adjusted under 35 U.S.C. 154(b) by 0 days.

(21) Appl. No.: 09/869,040
(22) PCT Filed: Dec. 24, 1999
(86) PCT No.: PCT/JP99/07242
§ 371 (c)(1), (2), (4) Date: Aug. 22, 2001
(87) PCT Pub. No.: WO00/38848
PCT Pub. Date: Jul. 6, 2000

(30) Foreign Application Priority Data

Dec. 25, 1998 (JP) ............................................. 10-371052

(51) Int. Cl.[7] .............................. B06B 1/18; B65G 53/66
(52) U.S. Cl. .................................... 137/624.13; 251/309
(58) Field of Search ..................... 137/624.13; 251/304, 251/309

(56) References Cited

U.S. PATENT DOCUMENTS 2,980,138 A * 4/1961 Detweiler et al. .. 137/624.13 X
5,490,485 A * 2/1996 Kutlucinar ......... 137/624.13 X
6,345,645 B1 * 2/2002 Kenna et al. ....... 137/624.13 X \* cited by examiner Primary Examiner—Kevin Lee
(74) Attorney, Agent, or Firm—Fitzpatrick, Cella, Harper & Scinto

(57) ABSTRACT

Pulsating vibration air generation apparatus comprising a cylindrical casing having an air supply port connected with an air source and a wave transmission port provided at the circumferential surface thereof, and a drum type rotary valve constructed rotatably in the casing, wherein the air supply port is located where a circumferential surface of the rotary valve is positioned when the rotary valve is contained in the casing, the wave transmission port is located apart from where the circumferential surface of the rotary valve is positioned when the rotary valve is contained in the casing, the drum type rotary valve is comprised of a rotary support shaft at a center axis, one end of the rotary valve is opened, another end of the rotary valve is closed, at least one ventilation window is provided at the circumferential surface of the rotary valve, the rotary valve is contained in the casing in such a manner that the open end of the rotary valve faces to the wave transmission port of the casing, and the at least one ventilation window provided at the circumferential surface of the rotary valve is designed to intermittently meet the air supply port according to rotation of the valve when a rotary drive apparatus is connected with the rotary support shaft and the rotary drive apparatus is driven.

12 Claims, 30 Drawing Sheets

(a)

(b)

(a)

(b)

(a)

(b)

(a)

(b)

(a)

(b)

PULSATING VIBRATION AIR GENERATION MEANS

TECHNICAL FIELD

The present invention relates to pulsating vibration air generation means for generating pulsating vibration air used for removing extra powder of tablets, pneumatically transporting powdered material, and vibrating mechanical members.

BACKGROUND ART

For example, pulsating vibration air generation means in which an electromagnetic valve is interposed in a pneumatic transport pipe and compressed air generation means (air source) such as a blower is connected to one end of the pneumatic transport pipe has been already known.

According to such a pulsating vibration air generation means, compressed air is supplied into the pneumatic transport pipe from one end thereof by driving the compressed air generation means (air source) and pulsating vibration air of positive pressure is generated between the position where the electro magnetic valve of the pneumatic transport pipe is provided and the other end thereof by opening and closing the electromagnetic valve.

Further, pulsating vibration air generation means in which an electromagnetic valve is interposed in a pneumatic transport pipe and air suction means (air source) such as a vacuum pump and a blower is connected to one end of the pneumatic transport pipe has been also known.

According to such a pulsating vibration air generation means, air in the pneumatic transport pipe is sucked from one end of the pneumatic transport pipe by driving the air suction means (air source) and pulsating vibration air of negative pressure is generated between the position where the electromagnetic valve is provided and the other end of the pneumatic transport pipe by opening and closing the electromagnetic valve.

However, according to the above-mentioned pulsating vibration air generation means using an electromagnetic valve, the electromagnetic valve is heated when pulsating vibration air is generated for a long time so that such means isn't suitable for means generating pulsating vibration air for a long time.

The applicants of the present invention have already proposed pulsating vibration air generation means for resolving such problems in JP-A-6-312158.

FIG. 29 shows diagrammatic configuration of the pulsating vibration air generation means disclosed in JP-A-6-312158.

The pulsating vibration air generation means 301 is provided with a cylindrical casing 302, a rotary type valve 303 located so as to divide inside of the casing 302 into two parts, and an air source 304 such as a blower.

A wave transmission port h301 and connection ports h302, h303 are provided on a circumferential surface of the casing 302.

A conduit (pneumatic transport pipe, not shown) is connected to the wave transmission port h301.

The air source 304 is provided with an air supply port h304 and an air suction port h305.

A conduit T301 is connected between the connection port h302 provided at the circumferential surface of the casing 302 and the air supply port h304 of the air source 304.

A conduit T302 is connected between the connection port h303 provided on the circumferential surface of the casing 302 and the air suction port h305 of the air source 304.

Rotary drive means such as a motor (not shown) is connected to a rotary shaft 303a of a rotary valve 303 and the rotary valve 303 is rotated at a fixed rotational speed when the rotary drive means is driven to be rotated at a fixed speed.

Next, a method for generating pulsating vibration air at the wave transmission port h301 using the pulsating vibration air generation means 301 is explained hereinafter. For generating pulsating vibration air at the wave transmission port h301, the air source 304 is driven at first.

Then air of positive pressure is delivered from the air supply port h304 and air flow of negative pressure is generated toward the air suction port h305 in the conduit T302.

When the rotary drive means (not shown) is driven to be rotated at a fixed speed together with such operation, the rotary valve 303 is rotated at a fixed rotational speed.

When the connection port h302 and the wave transmission port h301 are communicated by the rotary valve 303 (in this time between the connection port h302 and the air suction port h305 is closed by the rotary valve 303), positive air generated by driving the air source 304 is supplied from the wave transmission port h301 to the conduit (pneumatic transport pipe, not shown) connected to the wave transmission port h301.

On the other hand when the connection port h303 and the air suction port h305 is communicated by the rotary valve 303 (in this time between the connection port h302 and the air supply port h304 is closed by the rotary valve 303), negative air flow toward the wave transmission port h301 is generated in the conduit (pneumatic transport pipe, not shown) connected to the wave transmission port h301 because of negative air flow directing to the air suction port h305.

According to the pulsating vibration air generation means 301, the above-mentioned operations are repeated while the air source 304 is driven and the rotary valve 303 is driven and rotated so that positive pressure and negative pressure are alternately caused and pulsating vibration air is generated in the conduit (pneumatic transport pipe, not shown) connected to the wave transmission port h301.

Further according to the pulsating vibration air generation means 301, pulsating vibration air is generated by the rotary valve 303 of rotary type so that such a problem that heat generation caused by driving an electromagnetic valve for a long time doesn't arise. Therefore, it is suitable for generating pulsating vibration air for a long time.

Moreover, the pulsating vibration air generation means 301 is provided with the cylindrical casing 302 and the rotary type valve 303. As a result, there is an advantage that the apparatus can be easily large scaled in such a manner that the cylindrical casing 302 is enlarged into its diametrical direction and/or longitudinal direction and accordingly the rotary valve 303 is enlarged into its diametrical direction and/or longitudinal direction for generating large amount of pulsating vibration air.

FIG. 30 shows diagrammatic configuration of another pulsating vibration air generation means which has been disclosed in JP-A-9-75848 by the present applicants.

The pulsating vibration air generation means 401 is provided with a main body 402 including a hollow chamber R402 having an air supply port h402 connected to an air source 414 (compressed air generation means such as a blower in this embodiment) and a wave transmission port h401, a valve seat 403 provided in the hollow chamber R402 of the main body 402, a valve 404 for opening and closing the valve seat 403, and a rotary cam 405 rotatably provided for opening and closing the valve 404 for the valve seat 403.

The valve 404 has a plug 404a.

The plug 404a is up and down movably and airtightly attached in a plug insertion hole h403 provided for the main body 402.

A rotary roller 406 is rotatably attached at the lower end of the plug 404a.

The rotary cam 405 has an inner rotary cam 405a and an outer rotary cam 405b.

A fixed concavo-convex pattern is provided on each of the inner rotary cam 405a and the outer rotary cam 405b so as to have a distance of about the diameter of the rotary roller 406.

The rotary roller 406 is rotatably inserted between the inner rotary cam 405a and the outer rotary cam 405b.

The rotary cam 405 is designed to be attached on a rotary plug 404a Ma of rotary drive means such as a motor (not shown).

A conduit T401 is connected between an air source 414 and the air supply port h402.

A conduit (pneumatic transport pipe) T402 is connected to the wave transmission port h401.

A hole shown as h404 is, for example, a penetrating hole designed so as to communicate with atmosphere and is provided if necessary. In this embodiment, a conduit T404 is connected with the penetrating hole h404 and a valve 407 is interposed therebetween.

The member indicated as numeral 408 in FIG. 30 shows a flow controller provided if necessary.

Next, a method for generating pulsating vibration air at the wave transmission port h401 using the pulsating vibration air generation means 401 is explained hereinafter.

For generating pulsating vibration air at the wave transmission port h401, a rotary cam 405 having a concavo-convex pattern which is suitable for mixing and dispersing powdered material depending on its physical property is attached on the rotary shaft Ma of the rotary drive means such as a motor (not shown).

Then the air source 414 (compressed air generation means such as a blower in this embodiment) is driven and positive air is transmitted in the conduit T401.

If the flow controller 408 is interposed in the conduit T401, flow amount of positive air supplied to the air supply port h402 is controlled by means of the flow controller 408.

The rotary drive means (not shown) is rotated at a fixed speed together with the above-mentioned operations, then the rotary cam 405 attached on the rotary shaft Ma is rotated at a fixed rotational speed.

The rotary roller 406 is rotated between the inner rotary cam 405a and the outer rotary cam 405b by the rotation of the rotary cam 405 and is moved up and down in compliance with the concavo-convex pattern provided for the inner rotary cam 405a and the outer rotary cam 405b respectively. Therefore, the valve 404 is moved up and down in compliance with the concavo-convex pattern of the rotary cam 405 so as to open and close the valve seat 403.

Because of the open and close operations of the valve seat 403 caused by up and down movement of the valve 404 according to the concavo-convex pattern of the rotary cam 405, pulsating vibration air of positive pressure is output from the transmission port h401 into the conduit T403 (pneumatic transport pipe) connected to the wave transmission port h401.

If air suction means such as a vacuum pump is used as the air source 414, positive pulsating vibration air toward the wave transmission port h401 can be generated in the conduit T402 (pneumatic transport pipe) by the same manner mentioned above.

According to the pulsating vibration air generation means 401, pulsating vibration air is generated by opening and closing the valve seat 403 with the valve 404 by means of the rotary cam 405 so that such a problem of heat generation caused by operating an electromagnetic valve for a long time doesn't arise. Therefore, such means is suitable for producing pulsating vibration air for a long time.

Further according to the pulsating vibration air generation means 401, when compressed air generation means is used as the air source 414 and powdered material is pneumatically transported, a rotary cam 405 having a concavo-convex pattern suitable for mixing and dispersing powdered material depending on its physical property is used. Accordingly there is an advantage that efficient pneumatic transport of powdered material can be achieved.

Moreover according to the pulsating vibration air generation means 401, when air suction means is used as the air source 414 and powder attached on the surface of tablet is removed, a rotary cam 405 having a concavo-convex pattern suitable for sucking and removing powder from the surface of tablet depending on the physical property of the powder to be removed is used. Therefore, there is such an advantage that efficient powder removing operation can be achieved.

However, when high pressure air is supplied to the connection port h302 of the casing 302, there is a case that air is leaked from the gap between the rotary valve 303 and the inner circumference side wall of the casing 302. Therefore, the above-mentioned pulsating vibration air generation means 301 has a problem that accurate pulsating vibration air can't be obtained at high pressure.

On the other hand, when the rotary cam 405 having different concavo-convex pattern is used for the pulsating vibration air generation means 401, pulsating vibration air having wave shape according to the physical property of powdered material. However, pulsating vibration air is generated by opening and closing the valve seat 403 with the valve 404 so that there is a problem such that enlargement of the apparatus is difficult comparing to the pulsating vibration air generation means 301 for generating large amount of pulsating vibration air.

Further, the inventors of the present invention have found that there is a work environmental problem such that operators get sick when they actually use the pulsating vibration air generation means 301.

In detail, the inventors of the-present invention have found that operators often complain that they feel bad when pulsating vibration air from greater than or equal to 1 Hz to less than or equal to 5 Hz is generated using the pulsating vibration air generation means 301.

As a result of examination and analysis of its reason, they have found that vibration (low frequency) is generated in the pulsating vibration air generation means 301 and such vibration (low frequency) makes the operators feel bad because continuous air supply or air suction is executed from the air source 304 when the wave transmission port h301 is completely closed by the rotary valve 303.

Similarly the inventors have found that there is also a work environmental problem such that the operators also feel bad when they use the pulsating vibration air generation means 401.

In detail, the inventors of the present invention have also found that operators often complain that they feel bad when pulsating vibration air from greater than or equal to 1 Hz to less than or equal to 5 Hz is generated using the pulsating vibration air generation means 401.

As a result of examination and analysis of its reason, they have also found that vibration (low frequency) is generated in the pulsating vibration air generation means 401 and such vibration (low frequency) makes the operators feel bad because continuous air supply or air suction is executed from the air source 414 when the valve seat 403 is completely closed by the rotary valve 404.

The inventors have found that the pulsating vibration air generation means 301, 401 has a problem that large load is applied on the air source 304, 414 when air flow is shut off in case of using means such as a blower continuously generating air as the air source 304, 414, accordingly it requires to devise a countermeasure for preventing breakdown of the air source 304, 414.

The present invention is proposed to solve the above-mentioned problems. The first object of the present invention is to provide pulsating vibration air generation means suitable for converting high pressure air into pulsating vibration air, having new construction, and capable of easily enlarged.

The second object of the present invention is to provide pulsating vibration air generation means which can prevent vibration (low frequency) from its body, doesn't apply large load on its air source, and doesn't cause any loss of drive efficiency of its air source.

DISCLOSURE OF THE INVENTION

Pulsating vibration air generation means described in claim 1 is comprised of a cylindrical casing having an air supply port connected with an air source and a wave transmission port, and a drum type rotary valve constructed rotatably in the casing, the air supply port is provided on a circumferential surface of the casing, the air supply port provided on a circumferential surface of the casing is located where the circumferential surface of the rotary valve is positioned when the rotary valve is contained in the casing, the wave transmission port provided for the casing is located apart from where the circumferential surface of the rotary valve is positioned when the rotary valve is contained in the casing, the drum type rotary valve is comprised of a rotary support shaft at a center axis of the rotary valve, one end of the rotary valve is opened, another end of the rotary valve is closed, at least one ventilation window is provided at a circumferential surface of the rotary valve, the rotary valve is contained in the casing in such a manner that the open end of the rotary valve faces to the wave transmission port of the casing, and the at least one ventilation window provided at a circumferential surface of the rotary valve is designed to intermittently meet the air supply port provided on a circumferential surface of the casing when rotary drive means is connected with the rotary support shaft and the drive means is driven so as to rotate the rotary valve in the casing.

According to such constructed pulsating vibration air generation means, the air supply port provided on the circumferential surface of the casing is arranged at where the circumferential surface of the drum type rotary valve is located when the drum type rotary valve is contained in the casing.

Accordingly, when the compressed air generation means is used as an air source, the drum type rotary valve is rotated in the casing, and the circumferential surface of the drum type rotary valve other than the ventilation window is located at the air supply port, the air supply port is closed by the circumferential surface of the drum type rotary valve. Therefore, the compressed air supplied from the air supply port provided at the circumferential surface of the casing isn't supplied from the wave transmission port into the conduit (pneumatic transport pipe) connected to the wave transmission port.

On the other hand, when the ventilation window provided at the circumferential surface of the drum type rotary valve comes to the supply port, the ventilation window and the supply port are communicated so that the compressed air supplied to the air supply port is supplied to the drum type rotary valve via the ventilation window from the air supply port provided at the circumferential surface of the casing. The compressed air thus supplied in the drum type rotary valve through the ventilation window is supplied from the wave transmission port to the conduit (pneumatic transport pipe) connected to the wave transmission port.

When compressed air is used as an air source and the drum type rotary valve is rotated in the casing, supply and stop of compressed air from the wave transmission port into the conduit (pneumatic transport pipe) connected to the wave transmission port are repeated, as the result, pulsating vibration air of positive pressure is supplied in the conduit (pneumatic transport pipe) connected to the wave transmission port.

Further, when the compressed air generation means is used as an air source, the drum type rotary valve is rotated in the casing, and the circumferential surface of the drum type rotary valve other than the ventilation window is located at the air supply port, the air supply port is closed by the circumferential surface of the drum type rotary valve. Therefore, air flow toward the wave transmission port isn't generated in the conduit (pneumatic transport pipe) connected to the wave transmission port.

On the other hand, when the ventilation window provided at the circumferential surface of the drum type rotary valve comes to the supply port, the ventilation window and the supply port are communicated. As a result, the air supply port provided at the circumferential surface of the casing and the wave transmission port provided at the circumferential surface of the casing are communicated through the ventilation window provided at the circumferential surface of the drum type rotary valve and one open end of the drum type rotary valve, so that air flow directing the wave transmission port is generated in the conduit (pneumatic transport pipe) connected to the wave transmission port.

When air suction means is used as an air source and the drum type rotary valve is rotated in the casing, flow and stop of air flow toward the wave transmission port in the conduit (pneumatic transport pipe) connected to the wave transmission port are repeated, as the result, pulsating vibration air of negative pressure is generated in the conduit (pneumatic transport pipe) connected to the wave transmission port.

According to such pulsating vibration air generation means, as the drum type rotary valve having the ventilation window is contained in the casing, if the drum type rotary valve is contained in the casing so as not to have any gap between the inner circumferential surface of the casing and the outer circumferential surface of the drum type rotary valve, air isn't leaked from the wave transmission port of the casing even if high pressure air is supplied to the air supply port of the casing because the air supply port of the casing is closed by the circumferential surface of the drum type rotary valve except when the ventilation window of the drum type rotary valve is positioned at the air supply port of the casing.

Further according such pulsating vibration air generation means, as the drum type rotary valve having the ventilation window is contained in the casing, if the drum type rotary valve is contained in the casing so as not to have gap between the circumferential surface of the casing and the outer circumferential surface of the drum type rotary valve, the air supply port of the casing is closed by the circumferential surface of the drum type rotary valve except when the ventilation window of the drum type rotary valve is positioned at the air supply port of the casing. Therefore, even if air is strongly sucked by the air suction means by connecting the air suction means to the air supply port of the casing, air flow toward the wave transmission port isn't generated in the conduit (pneumatic transport pipe) connected to the wave transmission port of the casing.

Further according to the pulsating vibration air generation means, as pulsating vibration air is generated by means of the drum type rotary valve, there is no trouble such that heat generation is caused by driving an electromagnetic valve for a long time. Therefore, such pulsating vibration air generation means is suitable for generating pulsating vibration air for a long time.

Moreover, the pulsating vibration air generation means is provided with the cylindrical casing and the drum type rotary valve. As a result, there is an advantage such that when the apparatus is enlarged so as to generate large amount of pulsating vibration air, it is enough that the cylindrical casing is enlarged in its diametric direction and/or its longitudinal direction and accordingly the drum type rotary valve is enlarged in its diametric direction and/or its longitudinal direction. Pulsating vibration air generation means described in claim 2 is comprised of a cylindrical casing having an air supply port connected with an air source, a wave transmission port, and a drum type rotary valve constructed rotatably in the casing, wherein the wave transmission port is provided on a circumferential surface of the casing and is located where the circumferential surface of the rotary valve is positioned when the rotary valve is contained in the casing, the air supply port provided for the casing is located apart from where the circumferential surface of the rotary valve is positioned when the rotary valve is contained in the casing, the drum type rotary valve is comprised of a rotary support shaft at a center axis of the rotary valve, one end of the rotary valve is opened, another end of the rotary valve is closed, at least one ventilation window is provided at the circumferential surface of the rotary valve, the rotary valve is contained in the casing in such a manner that the one open end of the rotary valve faces to the air supply port of the casing, and the at least one ventilation window provided at the circumferential surface of the rotary valve is designed to intermittently meet the wave transmission port provided on the circumferential surface of the casing according to rotation of the valve when rotary drive means is connected with the rotary support shaft and the drive means is driven so as to rotate the valve in the casing.

According to such constructed pulsating vibration air generation means, the wave transmission port provided on the circumferential surface of the casing is arranged at where the circumferential surface of the drum type rotary valve is located when the drum type rotary valve is contained in the casing.

Accordingly, when the compressed air generation means is used as an air source, the drum type rotary valve is rotated in the casing, and the circumferential surface of the drum type rotary valve other than the ventilation window is located at the wave transmission port, the wave transmission port is closed by the circumferential surface of the drum type rotary valve. Therefore, the compressed air supplied from the air supply port provided at the circumferential surface of the casing isn't supplied from the wave transmission port into the conduit (pneumatic transport pipe) connected to the wave transmission port.

On the other hand, when the ventilation window provided at the circumferential surface of the drum type rotary valve comes to the wave transmission port, the ventilation window and the wave transmission port are communicated so that the compressed air fed from the air supply port is supplied to the conduit (pneumatic transport pipe) via the ventilation window from the open end of the drum type rotary valve.

When compressed air is used as an air source and the drum type rotary valve is rotated in the casing, supply and stop of compressed air from the wave transmission port into the conduit (pneumatic transport pipe) connected to the wave transmission port are repeated, as the result, positive pulsating vibration air is supplied in the conduit (pneumatic transport pipe) connected to the wave transmission port.

Further, when the compressed air generation means is used as an air source, the drum type rotary valve is rotated in the casing, and the circumferential surface of the drum type rotary valve other than the ventilation window is located at the wave transmission port, the wave transmission port is closed by the circumferential surface of the drum type rotary valve. Therefore, air flow toward the wave transmission port isn't generated in the conduit (pneumatic transport pipe) connected to the wave transmission port.

On the other hand, when the ventilation window provided at the circumferential surface of the drum type rotary valve comes to the wave transmission port, the ventilation window and the wave transmission port are communicated. As a result the air supply port provided at the circumferential surface of the casing and the wave transmission port provided at the circumferential surface of the casing are communicated through the ventilation window provided at the circumferential surface of the drum type rotary valve and one open end of the drum type rotary valve, so that air flow toward the wave transmission port is generated in the conduit (pneumatic transport pipe) connected to the wave transmission port.

When compressed air is used as an air source and the drum type rotary valve is rotated in the casing, supply and stop of air flow toward the wave transmission port in the conduit (pneumatic transport pipe) connected to the wave transmission port are repeated, as the result, negative pulsating vibration air is generated in the conduit (pneumatic transport pipe) connected to the wave transmission port.

According to such pulsating vibration air generation means, as the drum type rotary valve having the ventilation window is contained in the casing, if the drum type rotary valve is contained in the casing so as not to have any gap between the inner circumferential surface of the casing and the outer circumferential surface of the drum type rotary valve, air isn't leaked from the wave transmission port of the casing even if high pressure air is supplied to the air supply port of the casing because the wave transmission port of the casing is closed by the circumferential surface of the drum type rotary valve except when the ventilation window of the drum type rotary valve is positioned at the wave transmission port of the casing.

Further according such pulsating vibration air generation means, as the drum type rotary valve having the ventilation window is contained in the casing so as not to have gap between the circumferential surface of the casing and the outer circumferential surface of the drum type rotary valve, the wave transmission port of the casing is closed by the circumferential surface of the drum type rotary valve except when the ventilation window of the drum type rotary valve is positioned at the wave transmission port of the casing. Therefore, even if air is strongly sucked by the air suction means by connecting the air suction means to the air supply port of the casing, air flow toward the wave transmission port isn't generated in the conduit (pneumatic transport pipe) connected to the wave transmission port of the casing.

Further according to the pulsating vibration air generation means, as pulsating vibration air is generated by means of the drum type rotary valve, there is no trouble such that heat generation is caused by driving an electromagnetic valve for a long time. Therefore, such pulsating vibration air generation means is suitable for generating pulsating vibration air for a long time.

Moreover, the pulsating vibration air generation means is provided with the cylindrical casing and the drum type rotary valve. As a result, there is an advantage such that when the apparatus is enlarged so as to generate large amount of pulsating vibration air, it is enough that the cylindrical casing is enlarged in its diametric direction and/or its longitudinal direction and accordingly the drum type rotary valve is enlarged in its diametric direction and/or its longitudinal direction.

According to the pulsating vibration air generation means described in claim 3, in the pulsating vibration air generation means as set forth in claim 1 or 2, a bypass pipe is connected between a conduit connecting the air source and the air supply port of the casing and a pneumatic transport pipe connected to the wave transmission port of the casing.

According to such pulsating vibration air generation means, as a bypass pipe is connected between the conduit connecting the air source and the air supply port of the casing and the pneumatic transport pipe connected to the wave transmission port of the casing, when compressed air generation means is used as an air source, positive air generated by driving the compression air generation means is supplied to the pneumatic transport pipe connected to the wave transmission port of the casing through the bypass pipe when the air supply port or the wave transmission port of the casing is closed by the circumferential surface of the drum type rotary valve.

In other words, even if the air supply port or the wave transmission port of the casing is closed by the circumferential surface of the drum type rotary valve, continuous air supply is executed to the pneumatic transport pipe from the compressed air generation means through the bypass pipe. As a result, according to the pulsating vibration air generation means, because complete retention of air supplied from the compressed air generation means isn't caused, vibration (low frequency), which is apt to be caused when air is completely stayed, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the air supply port or the wave transmission port of the casing is closed by the circumferential surface of the drum type rotary valve is generated in the pneumatic transport pipe connected to the wave transmission port of the casing through the bypass pipe.

Namely, according to the pulsating vibration air generation means, even if the air supply port or the wave transmission port of the casing is closed by the circumferential surface of the drum type rotary valve, continuous air flow (negative air) toward the air suction means is generated via the bypass pipe in the pneumatic transport pipe. Therefore, vibration (low frequency), which is apt to be caused when air flow to the air suction means is completely shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the casing and the pneumatic transport pipe connected to the wave transmission port of the casing and all of the compressed air or suction mode air generated by driving the air source is designed to be returned to the pneumatic transport pipe, so that there is no driving efficiency loss of the air source.

Pulsating vibration air generation means described in claim 4 is comprised of a casing doubly constructed with an inner cylinder and an outer cylinder spaced apart, the casing forming an annular space by closing both ends of the inner cylinder and the outer cylinder, an air supply port connected with an air source being provided at a circumferential surface of the outer cylinder, an opening being provided at a circumferential surface of the inner cylinder, and one end of the inner cylinder being opened, a drum type rotary valve rotatably provided in the inner cylinder of the casing, wherein the opening provided on the circumferential surface of the inner cylinder is located where the circumferential surface of the rotary valve is positioned when the rotary valve is contained in the inner cylinder, the drum type rotary valve is comprised of a rotary support shaft at a center axis of the rotary valve, one end of the rotary valve is opened, another end of the rotary valve is closed, at least one ventilation window is provided at a circumferential surface of the rotary valve, the rotary valve is contained in the inner cylinder in such a manner that the one open end of the rotary valve faces to the open end of the inner cylinder of the casing, and the at least one ventilation window provided at the circumferential surface of the rotary valve is designed to intermittently meet the opening provided on the circumferential surface of the inner cylinder of the casing according to rotation of the rotary valve when rotary drive means is connected with the rotary support shaft and the rotary drive means is driven so as to rotate the rotary valve in the inner cylinder of the casing.

According to such pulsating vibration air generation means, the casing is double structure with the inner cylinder and the outer cylinder, and the opening provided for the circumferential surface of the inner cylinder is located at where the circumferential surface of the drum type rotary valve is positioned when the drum type rotary valve is contained in the inner cylinder.

Therefore, when the compressed air generation means is used as an air source, the drum type rotary valve is rotated in the inner cylinder, and the circumferential surface of the drum type rotary valve other than the ventilation window is located at the opening, the opening is closed by the circumferential surface of the drum type rotary valve. Therefore, the compressed air supplied from the air supply port provided at the circumferential surface of the outer cylinder isn't discharged from the open end of the rotary valve.

On the other hand, when the ventilation window provided at the circumferential surface of the drum type rotary valve comes to the opening of the circumferential surface of the inner cylinder, the ventilation window and the opening are communicated so that the compressed air supplied from the air supply port provided at the circumferential surface of the outer cylinder is supplied to the drum type rotary valve via the ventilation window provided at the circumferential surface of the drum type rotary valve and is discharged from one end of the drum type rotary valve.

When compressed air generation means is used as an air source and the drum type rotary valve is rotated in the inner cylinder, discharge and stop of compressed air from the one end of the drum type rotary valve are repeated, as the result, positive pulsating vibration air is supplied in the conduit (pneumatic transport pipe) connected to the open end of the inner cylinder when the conduit (pneumatic transport pipe) is connected to the open end of the inner cylinder.

Further, when air suction means is used as an air source, the drum type rotary valve is rotated in the inner cylinder, the circumferential surface of the drum type rotary valve other than the ventilation window is located at the opening, the opening is closed by the circumferential surface of the drum type rotary valve. Therefore, air flow toward the open end of the rotary valve isn't generated at the open end of the rotary valve.

On the other hand, when the ventilation window provided at the circumferential surface of the drum type rotary valve comes to the opening of the circumferential surface of the inner cylinder, the ventilation window and the opening are communicated. As a result, the air supply port provided at the circumferential surface of the outer cylinder and the open end of the rotary valve are communicated through the ventilation window and the opening, so that air flow toward the open end of the rotary valve is generated in the opening end of the rotary valve.

When air suction means is used as an air source and the drum type rotary valve is rotated in the inner cylinder, flow and stop of air flow toward the open end of the rotary valve are repeated, as the result, negative pulsating vibration air toward the open end of the drum type rotary valve is generated in the conduit (pneumatic transport pipe) when the conduit (pneumatic transport pipe) is connected to the opening end of the inner cylinder.

According to the pulsating vibration air generation means described in claim 5, in the pulsating vibration air generation means in claim 4, a bypass pipe is connected between a conduit connecting the air source and the air supply port of the outer cylinder and a pneumatic transport pipe connected to the open end of the inner cylinder.

According to such pulsating vibration air generation means, as the bypass pipe is connected between the conduit connecting the air source and the air supply port of the outer cylinder of the casing and the pneumatic transport pipe connected to the open end of the inner cylinder of the casing, when compressed air generation means is used as an air source, positive air generated by driving the compression air generation means is supplied to the pneumatic transport pipe connected to the open end of the inner cylinder of the casing through the bypass pipe when the open end of the inner cylinder of the casing is closed by the circumferential surface of the drum type rotary valve.

In other words, even if the open end of the inner cylinder of the casing is closed by the circumferential surface of the drum type rotary valve, continuous air supply is executed to the pneumatic transport pipe from the compressed air generation means through the bypass pipe. As a result, according to the pulsating vibration air generation means, vibration (low frequency), which is apt to be caused when complete air retention is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the open end of the inner cylinder of the casing is closed by the circumferential surface of the drum type rotary valve is generated in the pneumatic transport pipe connected to the open end of the inner cylinder of the casing through the bypass pipe.

Namely, according to the pulsating vibration air generation means, even if the open end of the inner cylinder of the casing is closed by the circumferential surface of the drum type rotary valve, continuous air flow (negative air) toward the air suction means is generated via the bypass pipe in the pneumatic transport pipe. Therefore, vibration (low frequency), which is apt to be caused when air flow to the air suction means is completely shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the outer cylinder and the pneumatic transport pipe connected to the one open end of the inner cylinder and all of the compressed air or suction mode air generated by driving the air source is designed to be returned to the pneumatic transport pipe, so that there is no driving efficiency loss of the air source.

The pulsating vibration air generation means described in claim 6 is comprised of a casing having an air supply port connected with an air source and a wave transmission port at the circumferential surface thereof, a rotary type valve provided rotatably in the casing and so as to divide the casing into two spaces, and a bypass pipe connecting between a conduit connecting the air source and the air supply port of the casing and a pneumatic transport pipe connected to the wave transmission port of the casing.

According to such pulsating vibration air generation means, as the bypass pipe is connected between the conduit connecting the air source and the air supply port of the casing and the pneumatic transport pipe connected to the wave transmission port of the casing, when compressed air generation means is used as an air source, positive air generated by driving the compression air generation means is supplied to the pneumatic transport pipe connected to the wave transmission port of the casing through the bypass pipe when the wave transmission port of the casing is closed by the circumferential surface of the rotary type valve.

In other words, even if the wave transmission port of the casing is closed by the circumferential surface of the rotary type valve, continuous air supply is executed to the pneumatic transport pipe from the compressed air generation means through the bypass pipe. As a result, according to the pulsating vibration air generation means, vibration (low frequency), which is apt to be caused when retention of air supplied from the compressed air generation means is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the wave transmission port of the casing is closed by the circumferential surface of the rotary type valve is generated in the pneumatic transport pipe connected to the wave transmission port of the casing through the bypass pipe.

Namely, according to the pulsating vibration air generation means, even if the wave transmission port of the casing is closed by the circumferential surface of the rotary type valve, continuous air flow (negative air) toward the air suction means is generated via the bypass pipe in the pneumatic transport pipe. Therefore, vibration (low frequency), which is apt to be caused when air flow to the air suction means is shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the casing and the pneumatic transport pipe connected to the wave transmission port of the casing and all of the compressed air or suction mode air generated by driving the air source is designed to be returned to the pneumatic transport pipe, so that there is no driving efficiency loss of the air source.

The pulsating vibration air generation means described in claim 7 is comprised of a main body having a hollow chamber with an air supply port connected to an air source and a wave transmission port, a valve seat provided in the hollow chamber in the main body, a valve for opening and closing the valve seat, and a rotary cam provided rotatably for opening and closing the valve for the valve seat, wherein a rotary roller is rotatably attached to a lower end of a shaft of the valve, the rotary cam is comprised of an inner rotary cam and an outer rotary cam, each of the rotary cams having a predetermined concavo-convex pattern so as to be separated at a distance of approximate diameter of the rotary roller, the roller is rotatably inserted between the inner rotary cam and the outer rotary cam, the valve moves up and down according to the predetermined concavo-convex pattern of the inner rotary cam and the outer rotary cam comprising the rotary cam so as to open and close the valve seat when a rotary drive means is connected to a rotary shaft of the rotary cam and the rotary drive means is driven to rotate the rotary cam, and a bypass pipe is connected between a conduit connecting the air source and the air supply port of the main body and a pneumatic transport pipe connected to the wave transmission port of the main body.

According to such pulsating vibration air generation means, as the bypass pipe is connected between the conduit connecting the air source and the air supply port of the main body and the pneumatic transport pipe connected to the wave transmission port of the main body, when compressed air generation means is used as an air source, positive air generated by driving the compression air generation means is supplied to the pneumatic transport pipe connected to the wave transmission port of the main body through the bypass pipe when the valve seat is closed by the valve.

In other words, even if the valve seat is closed by the valve, continuous air supply is executed to the pneumatic transport pipe from the compressed air generation means through the bypass pipe. As a result, according to the pulsating vibration air generation means, vibration (low frequency), which is apt to be caused when retention of air supplied from the compressed air generation means is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the valve seat is closed by the valve is generated in the pneumatic transport pipe connected to the wave transmission port through the bypass pipe.

Namely, according to the pulsating vibration air generation means, even if the valve seat is closed by the valve, continuous air flow (negative air) toward the air suction means via the bypass pipe is generated in the pneumatic transport pipe. Therefore, vibration (low frequency), which is apt to be caused when air flow to the air suction means is shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the main body and the pneumatic transport pipe connected to the wave transmission port of the main body and all of the compressed air or suction mode air generated by driving the air source is designed to be returned to the pneumatic transport pipe, so that there is no driving efficiency loss of the air source.

The pulsating vibration air generation means described in claim 8, the air source of the pulsating vibration air generation means in any one of claims 1–7 is compression air generation means.

According to the pulsating vibration air generation means, positive pulsating vibration air can be generated as the compressed air generation means is used as an air source.

Therefore, the pulsating vibration air generation means can be preferably used as positive pulsating vibration air generation means for pneumatically transporting powdered material at high density.

According to the pulsating vibration air generation means described in claim 9, the air source of the pulsating vibration air generation means in any one of claims 1–7 is air suction means.

According to the pulsating vibration air generation means, negative pulsating vibration air can be generated as the air suction means is used as an air source.

Therefore, the pulsating vibration air generation means can be preferably used as negative pulsating vibration air generation means for pneumatically transporting powdered material at low density and as pulsating vibration air generation means for generating suction mode pulsating vibration air for a powder removing apparatus.

The pulsating vibration air generation means described in claim 10 is comprised of a cylindrical casing having a wave transmission port on a circumferential surface thereof and having a first connection port and a second connection port disposed so as to face each other with a fixed distance on the circumferential surface, and a drum type rotary valve rotatably provided in the casing, wherein the first connection port and the second connection port on the circumferential surface of the casing are provided where the circumferential surface of the rotary valve is positioned when the rotary valve is contained in the casing, the wave transmission port on the circumferential surface of the casing is provided apart from where the circumferential surface of the rotary valve is positioned when the rotary valve is contained in the casing, compression air generation means is connected with the first connection port on the circumferential surface of the casing, air suction means is connected with the second connection port on the circumferential surface of the casing, the drum type rotary valve has a rotary support shaft at a center axis of the rotary valve, one end of the rotary valve is opened, another end of the rotary valve is closed, and at least one ventilation window is provided for the circumferential surface of the rotary valve, the rotary valve is contained in the casing in such a manner that one open end of the rotary valve faces to the wave transmission port of the casing, the at least one ventilation window on the circumferential surface of the rotary valve intermittently meets the first connection port or the second connection port on the circumferential surface of the casing according to rotation of the rotary valve when the rotary drive means is connected with the rotary support shaft and the rotary drive means is driven so as to rotate the valve in the casing.

According to the pulsating vibration air generation means, the compressed air generation means is connected with the first connection port provided on the circumferential surface of the casing and the air suction means is connected to the second connection port. Therefore, pulsating vibration air having large amplitude can be generated from the wave transmission port of the casing by driving both of the compression air generation means and the air suction means.

Further according to the pulsating vibration air generation means, if speed of the compressed air generation means is made larger than that of the air suction means, positive pulsating vibration air can be supplied in the conduit (pneumatic transport pipe) connected to the wave transmission port of the casing.

Furthermore according to the pulsating vibration air generation means, if speed of the air suction means is made larger than that of the compressed air generation means, negative pulsating vibration air can be supplied in the conduit (pneumatic transport pipe) connected to the wave transmission port of the casing.

DISCLOSURE OF THE INVENTION

The present invention will be detailed hereinafter referring to the attached drawings.

Embodiment of the Invention 1

Figure 1:
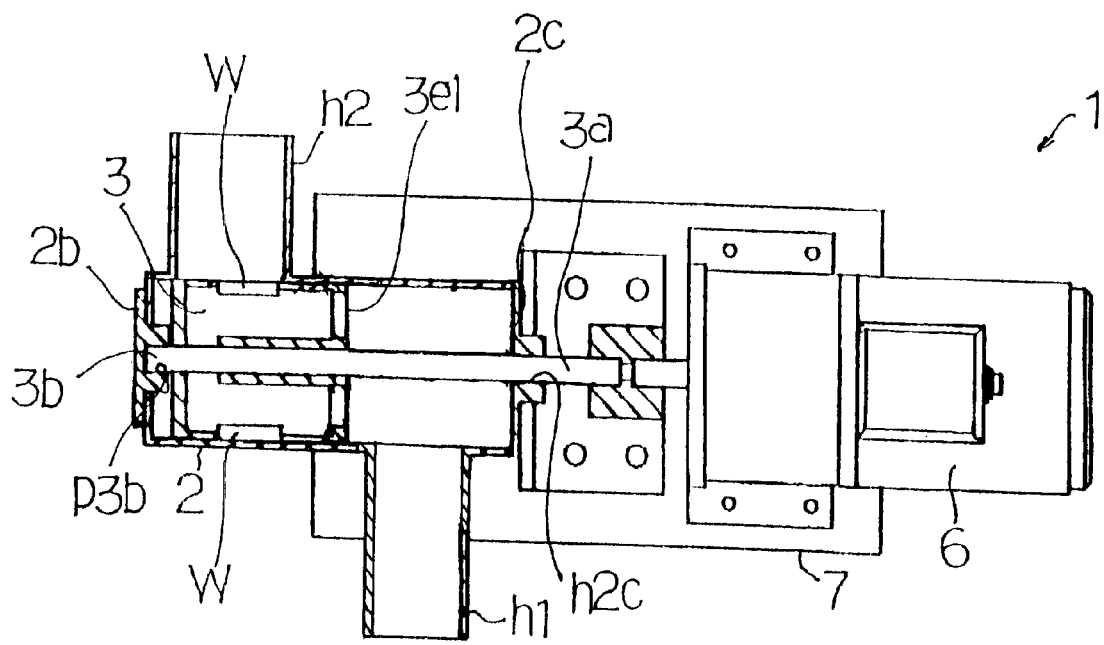
FIG. 1 is a diagrammatic plane view in which one part of one embodiment of the pulsating vibration air generation means of the present invention is cut off.
Figure 2:
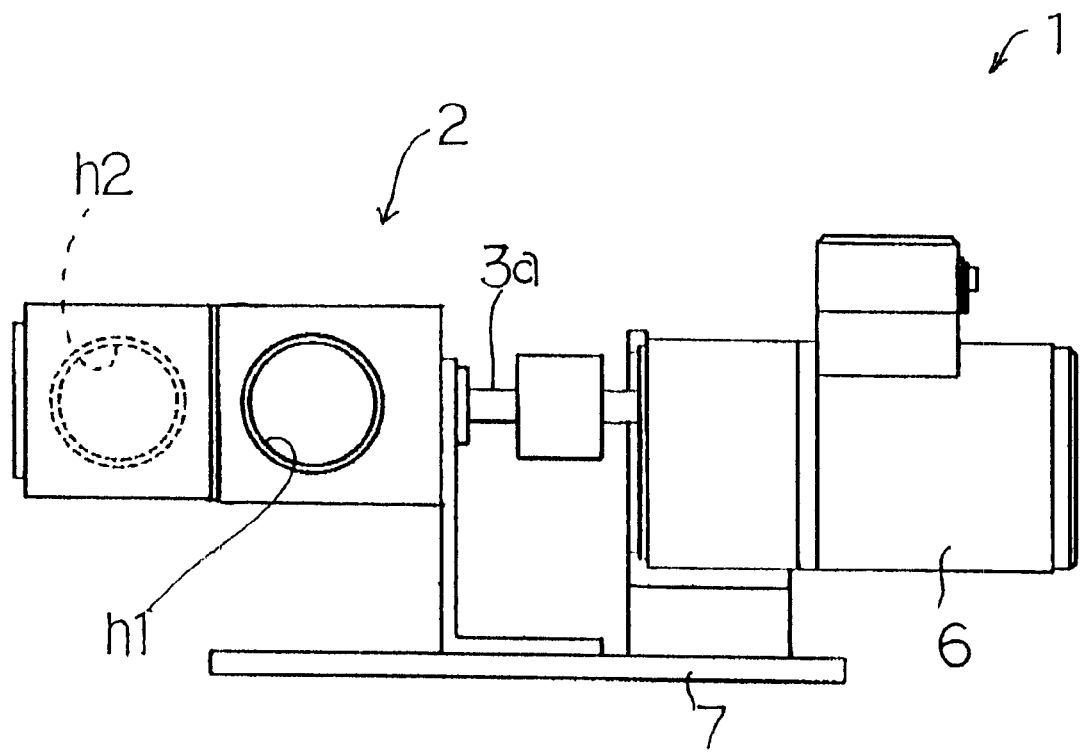
FIG. 2 is a diagrammatic side view of the pulsating vibration air generation means shown in FIG. 1.
Figure 3:
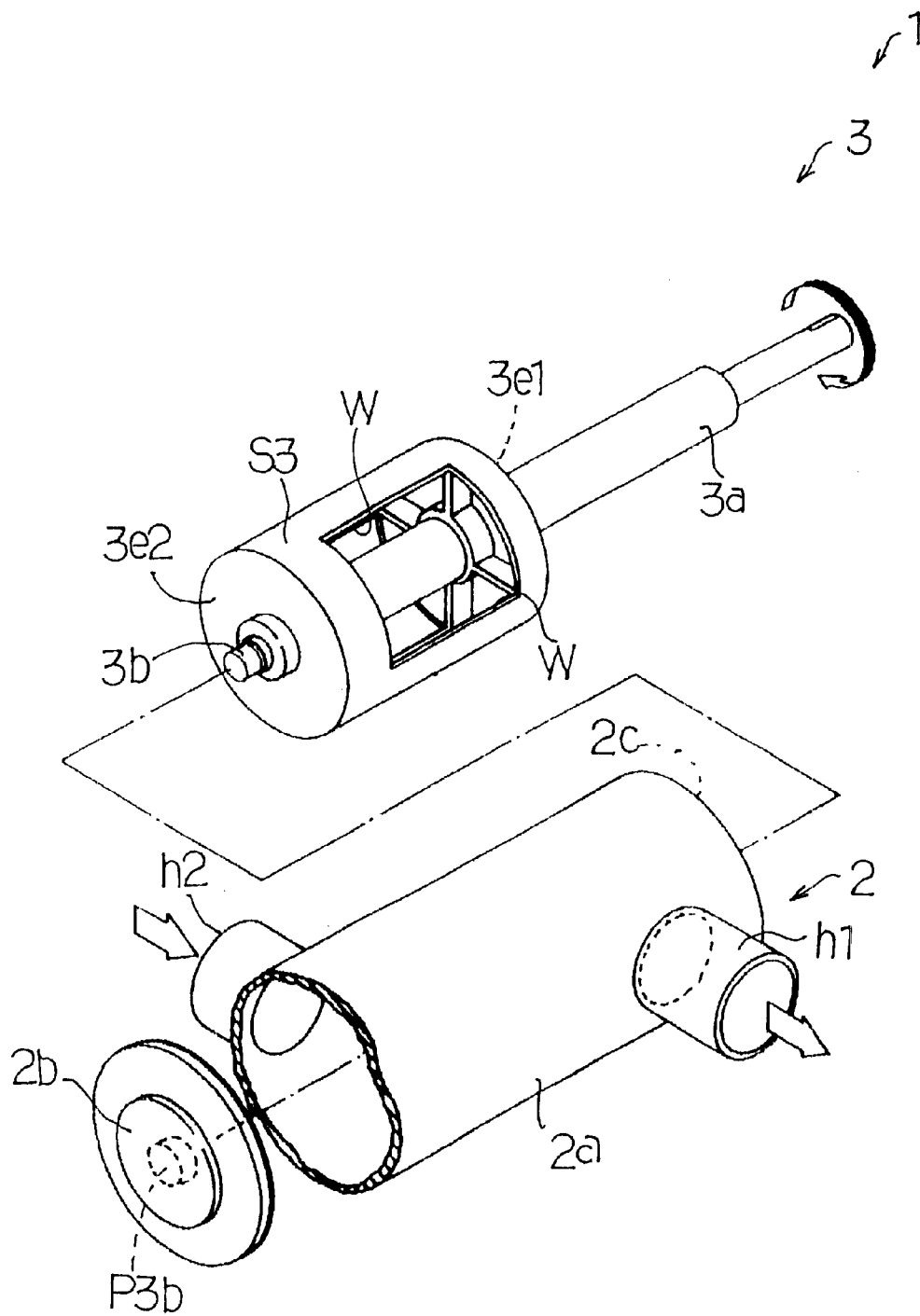
FIG. 3 is an exploded perspective view showing a substantial part of the pulsating vibration air generation means shown in FIG. 1.

FIG. 1 is a diagrammatic plane view in which one part of one embodiment of the pulsating vibration air generation means of the present invention is partially cut, FIG. 2 is a side view of the pulsating vibration air generation means shown in FIG. 1, and FIG. 3 is an exploded perspective view of substantial part of the pulsating vibration air generation means shown in FIG. 1.

The pulsating vibration air generation means 1 is provided with a cylindrical casing 2 and a drum type rotary valve 3 rotatably provided in the casing 2.

The cylindrical casing 2 has an air supply port h2 connected to an air source (not shown) and a wave transmission port h1 at the circumferential surface thereof.

A conduit (pneumatic transport pipe, not shown) is connected to the wave transmission port h1.

Any one of compression air generation means or air suction means is used as an air source (not shown).

Air supply means such as a blower or a compressor is used as compressed air generation means.

A blower or a vacuum pump is used as air suction means.

The air supply port h2 provided at the circumferential surface of the casing 2 is located at where a circumferential surface S3 of the rotary valve 3 is positioned when the rotary valve 3 is contained in the casing 2.

The wave transmission port h1 provided at the circumferential surface of the casing 2 is located apart from where the circumferential surface S3 of the rotary valve 3 is positioned when the rotary valve 3 is contained in the casing 2.

The drum type rotary valve 3 has a rotary support shaft 3a at the center axis of the rotary valve 3.

The rotary valve 3 also has a rotary support shaft 3b at an opposite side of the rotary support shaft 3a.

One end 3e1 of the drum type rotary valve 3 is opened and another end 3e2 is closed.

A ventilation window W is provided at the circumferential surface S3 of the rotary valve 3.

At least one ventilation window W may be provided at the circumferential surface S3 of the rotary valve 3.

In this embodiment two ventilation windows W, W are provided at the circumferential surface S3 of the rotary valve 3.

The rotary valve 3 is contained in the casing 2 in such a manner that the open end 3e1 of the rotary valve faces is directed to the wave transmission port h1 of the casing 2.

Rotary drive means such as a motor (refer to rotary drive means 6 in FIG. 1 and FIG. 2) is connected to the rotary support shaft 3a and the rotary valve 3 is rotated in the casing 2 by driving and rotating the rotary drive means 6. Then the ventilation windows W, W are designed to be intermittently located to meet the air supply port h2 provided at the circumferential surface of the casing 2 according to rotation of the rotary valve 3.

The member 7 shown in FIG. 1 and FIG. 2 is a base and the casing 2 and the rotary drive means 6 comprising the pulsating vibration air generation means 1 are attached on the base 7 in this embodiment.

Further in this embodiment, the casing 2 has a body 2a formed by cutting existing tube such as metal (stainless steel and so on) pipe or resin pipe at appropriate length, and covers 2b, 2c so as to close both open ends of the body 2a.

A bearing p3b for attaching the rotary support shaft 3b is provided at the center of the cover 2b.

A penetrating hole h2c for inserting the rotary support shaft 3a of the rotary valve 3 rotatably and airtightly is also provided at the center of the cover 2c.

Next, a method for generating pulsating vibration air at the wave transmission port h1 using the pulsating vibration air generation means 1 is explained.

At first a method for generating pulsating vibration air of positive pressure at the wave transmission port h1 using the pulsating vibration air generation means 1 is explained.

Compression air generation means is used as an air source (not shown) connected to the air supply port h2 for generating positive pulsating vibration air at the wave transmission port h1.

Figure 4:
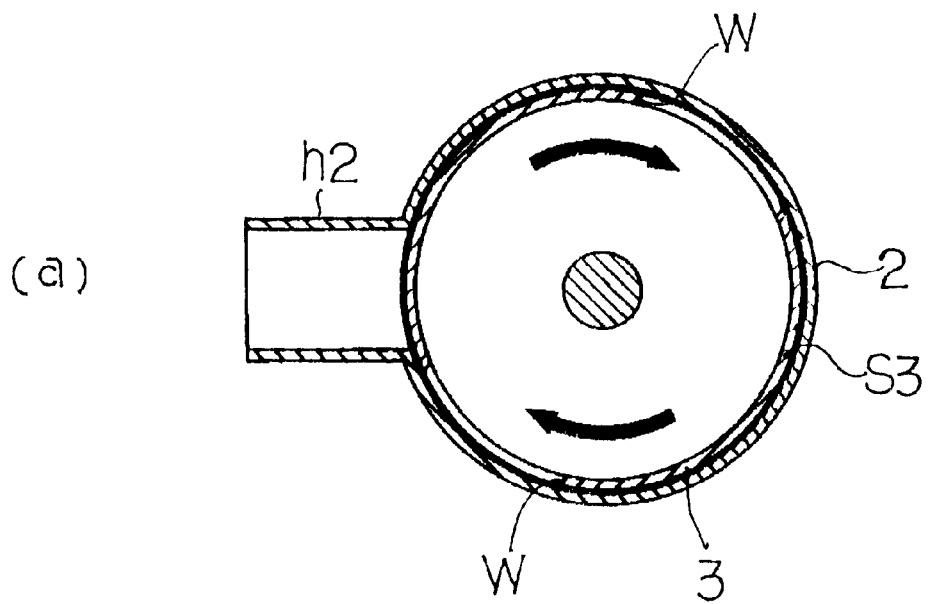
FIG. 4 is an explanatory view schematically showing operation of the pulsating vibration air generation means shown in FIG. 1.
Figure 4:
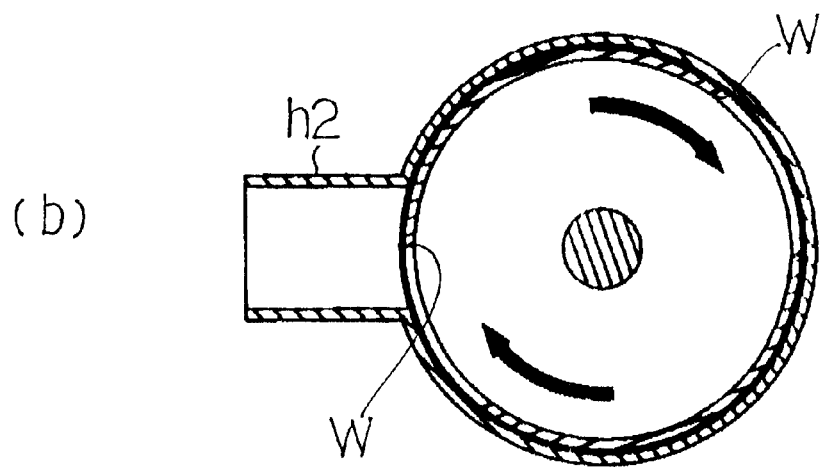
Figure 5:
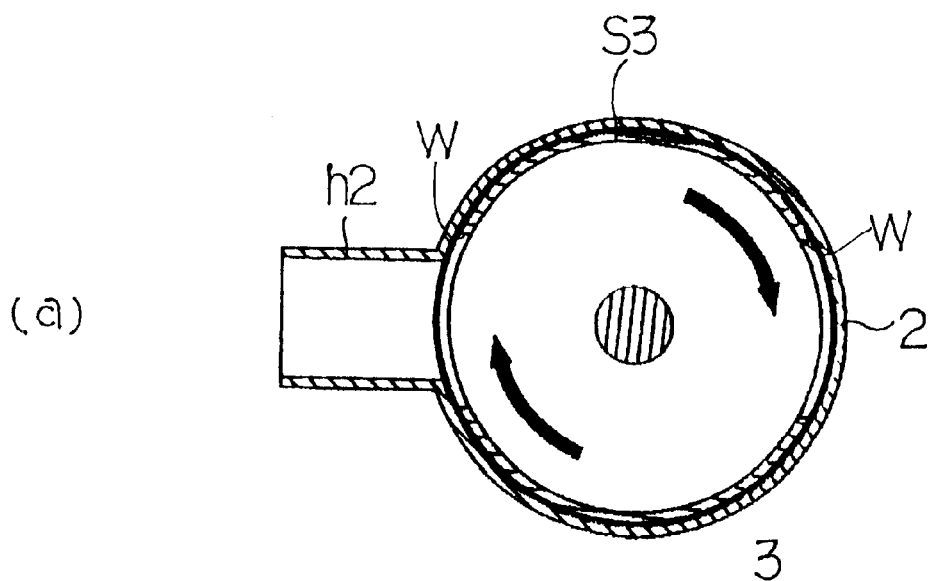
FIG. 5 is an explanatory view schematically showing operation of the pulsating vibration air generation means shown in FIG. 1.
Figure 5:
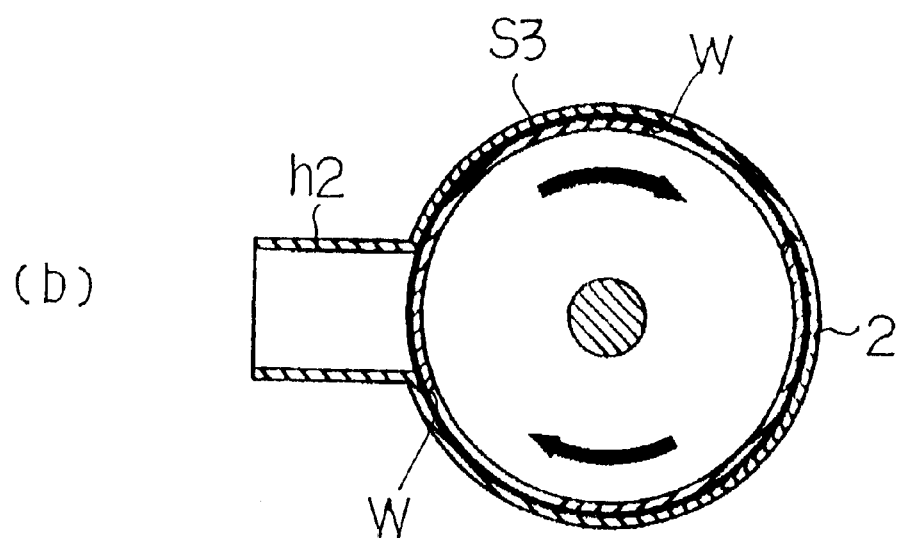

FIG. 4 and FIG. 5 explain operation of the pulsating vibration air generation means 1.

FIG. 4(a), FIG. 4(b), FIG. 5(a), and FIG. 5(b) are plane views schematically showing conditions wherein the casing 2 is cut off at where the air supply port h2 of the casing 2 is provided.

Figure 6:
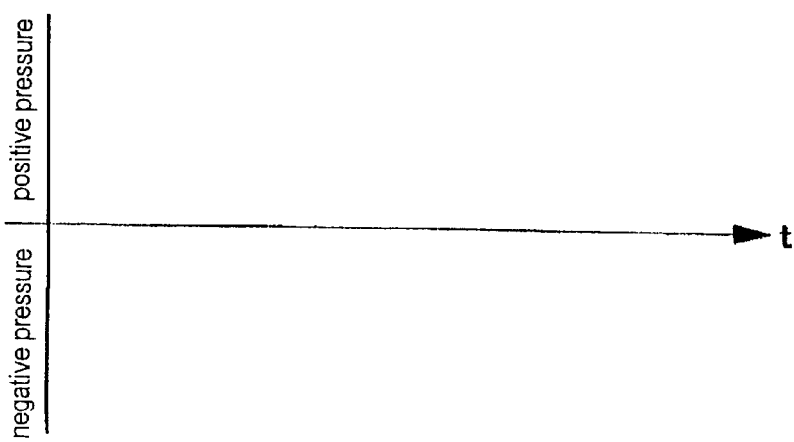
FIG. 6 is an explanatory view schematically showing the pulsating vibration air generated at the wave transmission port by driving the pulsating vibration air generation means shown in FIG. 1.
Figure 6:
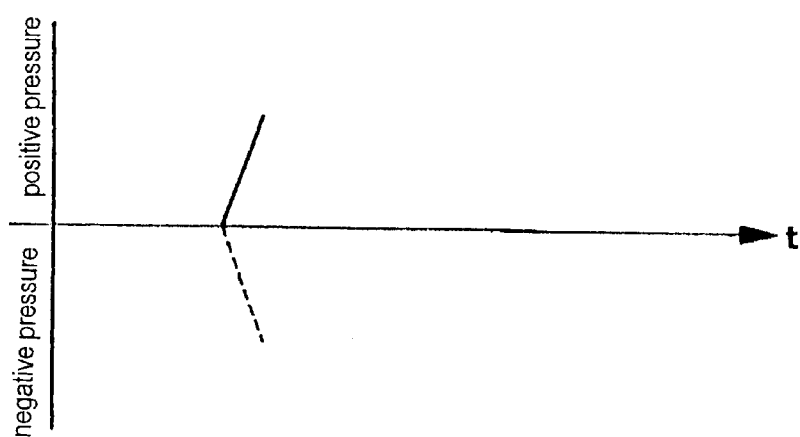
Figure 7:
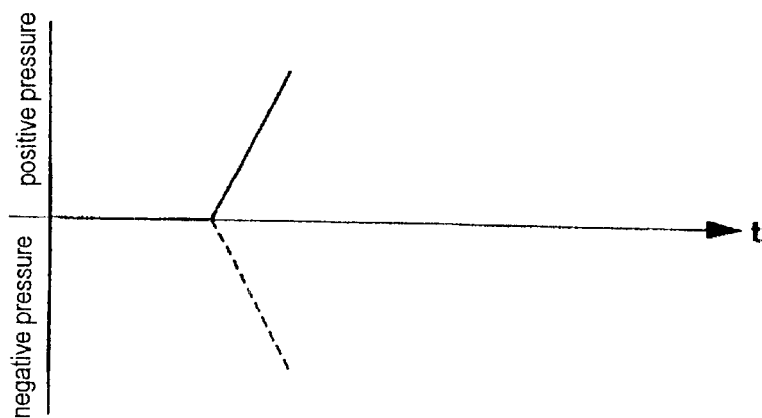
FIG. 7 is an explanatory view schematically showing the pulsating vibration air generated at the wave transmission port by driving the pulsating vibration air generation means shown in FIG. 1.
Figure 7:
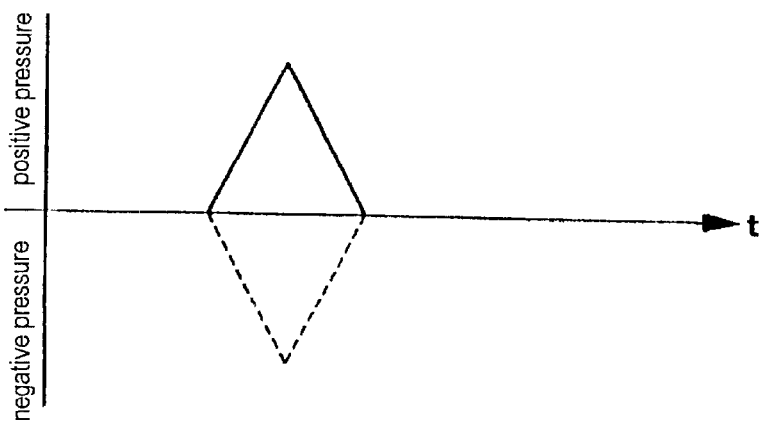

FIG. 6 and FIG. 7 are diagrammatic explanatory views of pulsating vibration air generated at the wave transmission port h1 by driving the pulsating vibration air generation means 1.

Figure 8:
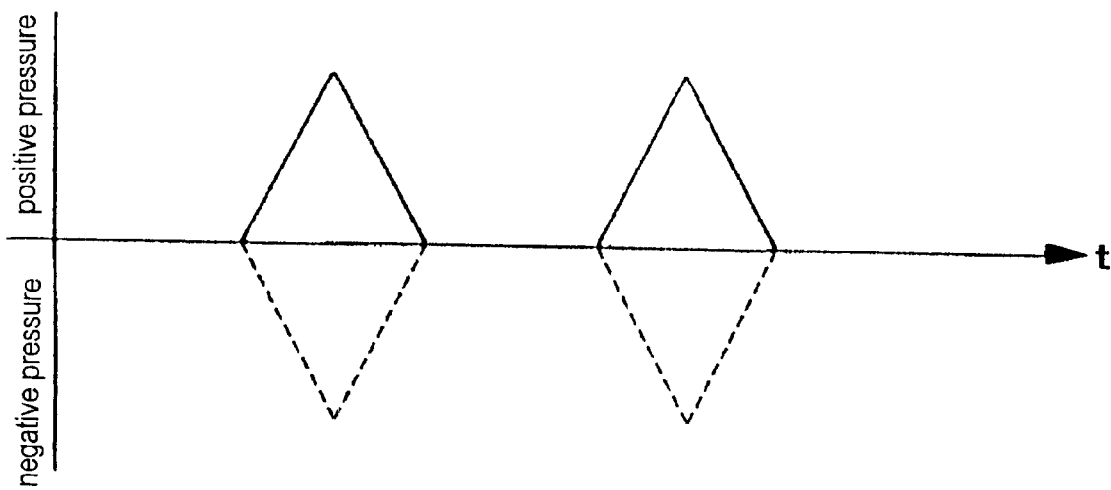
FIG. 8 is an explanatory view schematically showing continuous pulsating vibration air generated at the wave transmission port by driving the pulsating vibration air generation means shown in FIG. 1.

FIG. 8 is a diagrammatic explanatory view showing continuous pulsating vibration air generated at the wave transmission port h1 by driving the pulsating vibration air generation means 1.

More detailed, FIG. 6(a) is an explanatory view schematically showing pulsating vibration air generated at the wave transmission port h1 when the pulsating vibration air generation means 1 is in the condition of FIG. 4(a). FIG. 6(b) is an explanatory view schematically showing pulsating vibration air generated at the wave transmission port h1 when the pulsating vibration air generation means 1 is in the condition of FIG. 4(b). FIG. 7(a) is an explanatory view schematically showing pulsating vibration air generated at the wave transmission port h1 when the pulsating vibration air generation means 1 is in the condition of FIG. 5(a). FIG. 7(b) is an explanatory view schematically showing pulsating vibration air generated at the wave transmission port h1 when the pulsating vibration air generation means 1 is in the condition of FIG. 5(b).

Pulsating vibration air indicated in solid lines in FIG. 6(a), FIG. 6(b), FIG. 7(a), FIG. 7(b), and FIG. 8 shows positive pulsating vibration air generated at the wave transmission port h1 when the compressed air generation means is connected to the air supply port h2.

Compressed air generation means is connected to the air supply port h2 for supplying positive pulsating vibration air in the conduit (pneumatic transport pipe, not shown) connected to the wave transmission port h1.

Next, the compression air generation means is driven at a fixed speed and the rotary shaft of the rotary drive means 6 is connected with the rotary support shaft 3a. Then the rotary drive means 6 is driven and rotated at a fixed rotational speed so that the rotary valve 3 is rotated at a fixed rotational speed in the casing 2.

When compressed air generation means is used as an air source and the drum type rotary valve 3 is rotated in the casing 2, if the circumferential surface S3 of the drum type rotary valve 3 other than the ventilation window W is located at the air supply port h2, the air supply port h2 is closed by the circumferential surface S3 of the drum type rotary valve 3 so that compressed air supplied from the air supply port h2 provided at the circumferential surface of the casing 2 isn't supplied from the wave transmission port h1 into the conduit (pneumatic transport pipe) connected to the wave transmission port h1 (See FIG. 4(a) and FIG. 6(a)).

On the other hand, when the ventilation window W provided at the circumferential surface S3 of the drum type rotary valve 3 is located at the air supply port h2, the ventilation window W and the air supply port h2 are communicated so that compressed air fed to the air supply port h2 is supplied in the drum type rotary valve 3 through the ventilation window W from the air supply port h2 provided at the circumferential surface of the casing 2. Thus the compressed air supplied in the drum type rotary valve 3 via the ventilation window W is supplied from the wave transmission port h2 of the casing 2 into the conduit (pneumatic transport pipe) connected to the wave transmission port h2 through the open end 3e1 of the drum type rotary valve 3 (See FIG. 4(b), FIG. 5(a), FIG. 6(b), and FIG. 7(a)).

When compressed air generation means is used as an air source and the drum type rotary valve 3 is rotated in the casing 2, supply and stop of compressed air from the wave transmission port h1 of the casing 2 into the conduit (pneumatic transport pipe, not shown) connected to the wave transmission port h1 are repeated. As a result, positive pulsating vibration air is supplied in the conduit (pneumatic transport pipe, not shown) connected to the wave transmission port h1 (See FIG. 4(a), FIG. 4(b), FIG. 5(a), FIG. 5(b), FIG. 6(a), FIG. 6(b), FIG. 7(a), FIG. 7(b), and FIG. 8).

Next, a method for generating pulsating vibration air of negative pressure at the wave transmission port h1 is explained.

Air suction means is used as an air source (not shown) connected to the air supply port h2 for generating negative pulsating vibration air at the wave transmission port h1.

Pulsating vibration air indicated in broken lines in FIG. 6(a), FIG. 6(b), FIG. 7(a), and FIG. 7(b) shows negative pulsating vibration air generated at the wave transmission port h1 when the air suction means is connected to the air supply port h2.

Air suction means is connected to the air supply port h2 for supplying negative pulsating vibration air in the conduit (pneumatic transport pipe, not shown) connected to the wave transmission port h1.

Next, the air suction means is driven at a fixed speed and the rotary shaft of the rotary drive means 6 is connected with the rotary support shaft 3a. Then the rotary drive means 6 is driven and rotated at a fixed rotational speed so that the rotary valve 3 is rotated at a fixed rotational speed in the casing 2.

When air suction means is used as an air source and the drum type rotary valve 3 is rotated in the casing 2, if the circumferential surface S3 of the drum type rotary valve 3 other than the ventilation window W is located at the air supply port h2, the air supply port h2 is closed by the circumferential surface S3 of the drum type rotary valve 3 so that air flow toward the wave transmission port h1 isn't generated in the conduit (pneumatic transport pipe) connected to the wave transmission port h1 (See FIG. 4(a) and FIG. 6(a)).

On the other hand, when the ventilation window W provided at the circumferential surface of the drum type rotary valve 3 is located at the air supply port h2, the ventilation window W and the air supply port h2 are communicated. As a result the air supply port h2 provided at the circumferential surface of the casing 2 and the wave transmission port h1 provided at the circumferential surface of the casing 2 are communicated through the ventilation window W provided at the circumferential surface S3 of the drum type rotary valve and the open end 3e1 of the drum type rotary valve 3, so that air flow toward the wave transmission port h1 is generated in the conduit (pneumatic transport pipe) connected to the wave transmission port h1 (See FIG. 4(b), FIG. 5(a), FIG. 6(b), and FIG. 7(a)).

When air suction means is used as an air source and the drum type rotary valve 3 is rotated in the casing 2, flow and stop of air flow toward the wave transmission port h1 in the conduit (pneumatic transport pipe, not shown) connected to the wave transmission port h1 are repeated. As a result, negative pulsating vibration air is supplied into the conduit (pneumatic transport pipe, not shown) connected to the wave transmission port h1.

According to the pulsating vibration air generation means 1, the drum type rotary valve 3 having the ventilation window W is contained in the casing 2. If the drum type rotary valve 3 is contained in the casing 2 so as not to have gap between the inner circumference of the casing 2 and the outer circumference of the drum type rotary valve 3, air isn't leaked from the wave transmission port h1 of the casing 2 even if high pressure air is supplied in the air supply port h2 of the casing 2 because the air supply port h2 of the casing 2 is closed by the circumferential surface S3 of the drum type rotary valve 3 except when the ventilation window W of the drum type rotary valve 3 is located at the supply port h2 of the casing 2.

Further according to the pulsating vibration air generation means 1, the drum type rotary valve 3 having the ventilation window W is contained in the casing 2. If the drum type rotary valve 3 is contained in the casing 2 so as not to have gap between the inner circumference of the casing 2 and the outer circumference of the drum type rotary valve 3, air flow toward the wave transmission port h1 isn't generated in the conduit (pneumatic transport pipe, not shown) connected to the wave transmission port h1 of the casing 2 even when air is strongly sucked by the air suction means by connecting the air suction means to the air supply port h2 of the casing 2 because the air supply port h2 of the casing 2 is closed by the circumferential surface S3 of the drum type rotary valve 3 except when the ventilation window W of the drum type rotary valve 3 is located at the supply port h2 of the casing 2.

According to the pulsating vibration air generation means 1, pulsating vibration air is generated by means of the drum type rotary valve 3 so that such a problem that heat generation caused by driving an electromagnetic valve for a long time isn't happened. Therefore, the pulsating vibration air generation means 1 is suitable for generating pulsating vibration air for a long time.

Moreover, the pulsating vibration air generation means 1 is provided with the cylindrical casing 2 and the drum type rotary valve 3. As a result, there is an advantage that the means 1 can be easily large scaled in such a manner that the cylindrical casing 2 is enlarged into its diametrical direction and/or longitudinal direction and accordingly the drum type rotary valve 3 is enlarged into its diametrical direction and/or longitudinal direction for generating large amount of pulsating vibration air.

Embodiment of the Invention 2

Figure 9:
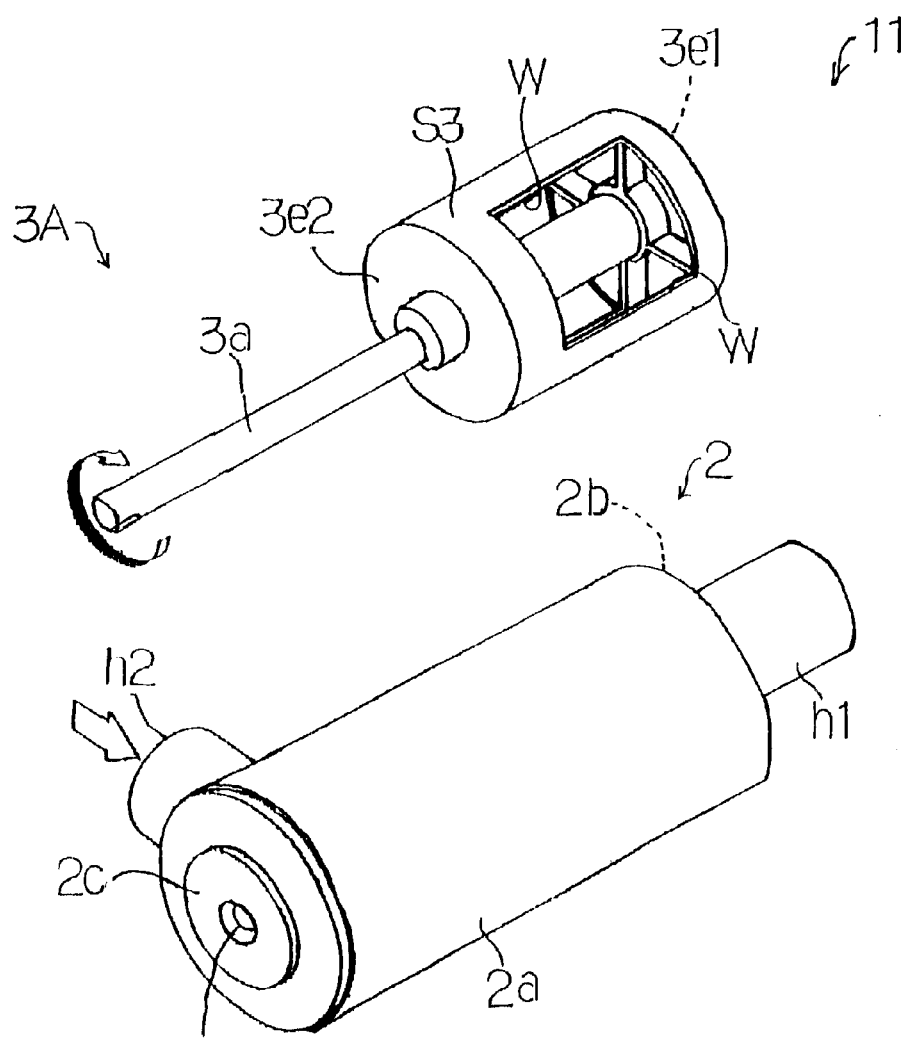
FIG. 9 is a perspective view schematically showing a substantial part of other embodiment of the pulsating vibration air generation means of the present invention.

FIG. 9 is a perspective view schematically showing the substantial part of other embodiment of the pulsating vibration air generation means of the present invention.

The pulsating vibration air generation means 11 has the same construction as the pulsating vibration air generation means 1 other than that a wave transmission port h1 is provided at a cover 2b, not on the circumferential surface of the cylindrical casing 2.

A drum type rotary valve 3A has a rotary support shaft 3a at a central axis of a rotary valve 3A.

When the wave transmission port h1 is formed at the cover 2b like the pulsating vibration air generation means 11 and compressed air generation means is used as an air source, positive pulsating vibration air is smoothly discharged from the wave transmission port h1 because compressed air supplied in the drum type rotary valve 3 is discharged from the wave transmission port h1 in the same discharge direction from an open end of the drum type rotary valve 3A through a ventilation window W of the drum type rotary valve 3A when an air supply port h2 of the circumferential surface of the casing 2 and the ventilation window W of the drum type rotary valve 3A are communicated.

On the other hand, air suction means is used as an air source, negative pulsating vibration air toward the wave transmission port h1 is smoothly generated in a conduit (pneumatic transport pipe, not shown) because negative pulsating vibration air is generated in a straight line into the wave transmission port h1 from the conduit (pneumatic transport pipe, not shown) when the air supply port h2 of the circumferential surface of the casing 2 and the ventilation window W of the drum type rotary valve 3A are communicated.

Embodiment of the Invention 3

Figure 10:
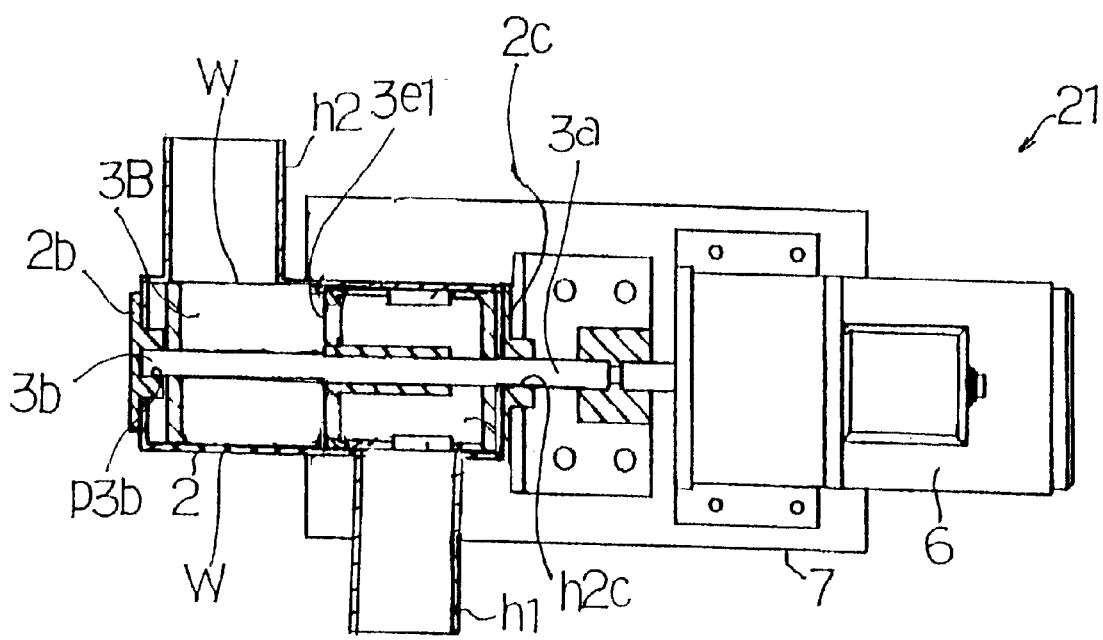
FIG. 10 is a diagrammatic plane view in which one part of another embodiment of the pulsating vibration air generation means of the present invention is cut off.
Figure 11:
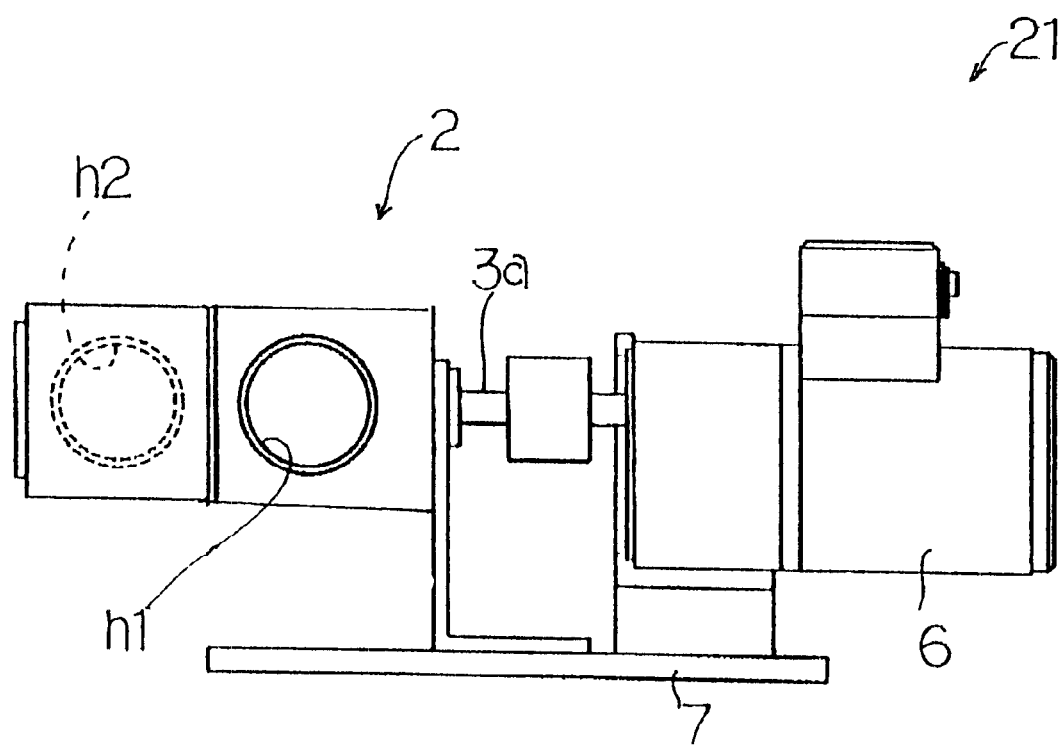
FIG. 11 is a diagrammatic side view of the pulsating vibration air generation means shown in FIG. 10.
Figure 12:
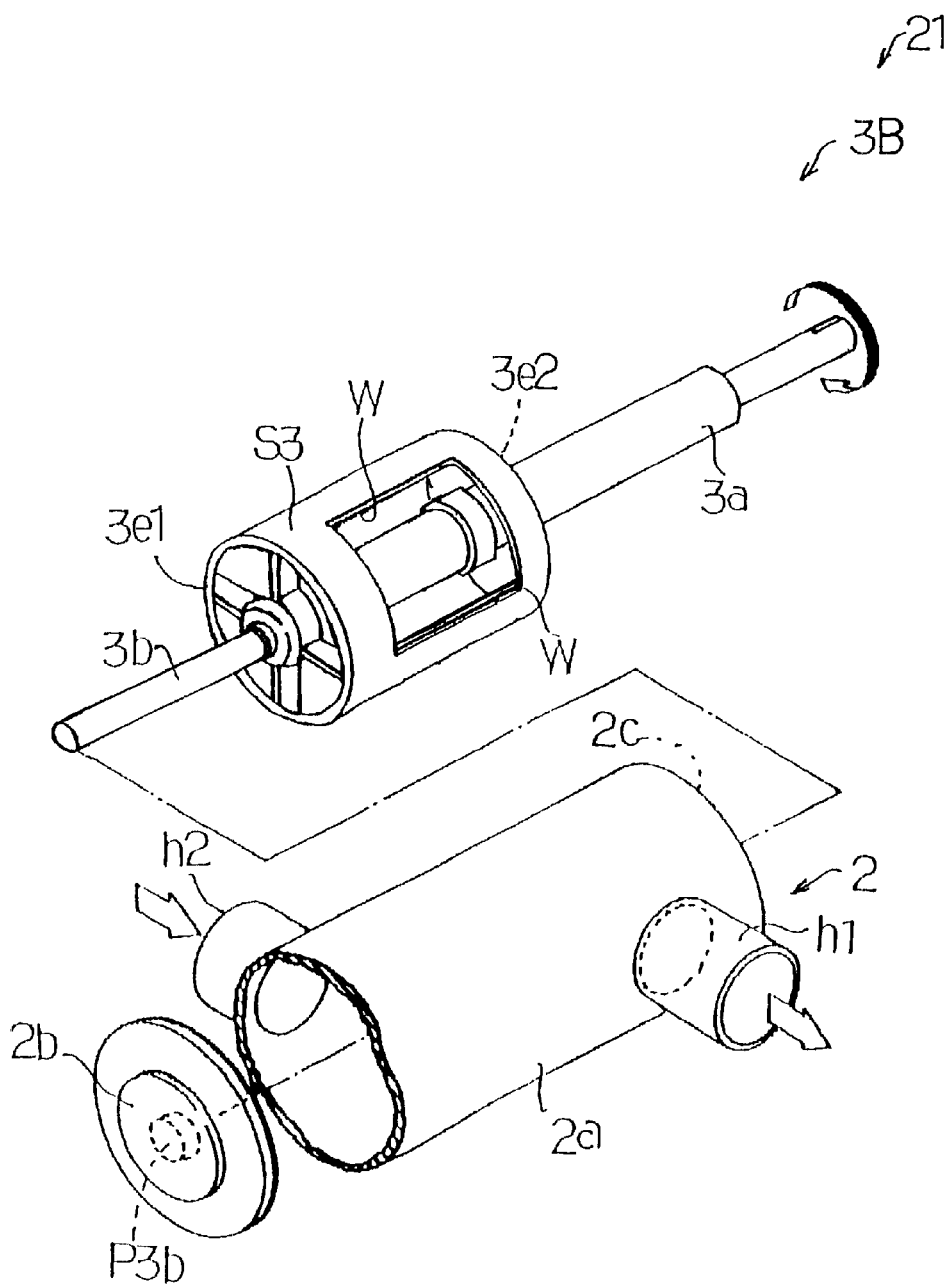
FIG. 12 is an exploded perspective view showing a substantial part of the pulsating vibration air generation means shown in FIG. 10.

FIG. 10 is a diagrammatic plane view in which one part of other embodiment of the pulsating vibration air generation means of the present invention is cut off, FIG. 11 is a diagrammatic side view of the pulsating vibration air generation means shown in FIG. 10, and FIG. 12 is an exploded perspective view showing a substantial part of the pulsating vibration air generation means shown in FIG. 10.

The pulsating vibration air generation means 21 is different from the pulsating vibration air generation means 1 in that a wave transmission port h1 is designed to be opened and closed by a drum type rotary valve 3B.

The pulsating vibration air generation means 21 has a cylindrical casing 2 and a drum type rotary valve 3B rotatably provided for the casing 2.

The cylindrical casing 2 has an air supply port h2 connected with the air source (not shown) and a wave transmission port h1 at the circumferential surface thereof.

A conduit (pneumatic transport pipe, not shown) is connected to the wave transmission port h1.

Compressed air generation means or air suction means is used as an air source (not shown).

Air supply means such as a blower or a compressor is used as compressed air generation means.

A blower or a vacuum pump is used as air suction means.

The above-mentioned construction is the same as the pulsating vibration air generation means 1, however following construction of the pulsating vibration air generation means 21 is different from the pulsating vibration air generation means 1.

According to the pulsating vibration air generation means 21, the wave transmission port h1 provided at the circumferential surface of the casing 2 is arranged at where the circumferential surface S3 of the rotary valve 3B is positioned when the rotary valve 3B is contained in the casing 2.

The air supply port h2 provided at the circumferential surface of the casing 2 is arranged apart from where the circumferential surface S3 of the rotary valve 3B is positioned when the rotary valve 3B is contained in the casing 2.

The drum type rotary valve 3B has a rotary support shaft 3a at the center axis of the rotary valve 3B.

The rotary valve 3B also has a rotary support shaft 3b at an opposite side of the rotary support shaft 3a.

One end 3e1 of the drum type rotary valve 3B is opened and the other end 3e2 is closed.

A ventilation window W is provided at the circumferential surface S3 of the rotary valve 3B.

At least one ventilation wind W may be provided at the circumferential surface S3 of the rotary valve 3B.

In this embodiment, two ventilation windows W, W are provided at the circumferential surface S3 of the rotary valve 3B.

The rotary valve 3B is contained in the casing 2 in such a manner that the open end 3e1 of the rotary valve 3B faces to the air supply port h2 of the casing 2.

When rotary drive means such as a motor (refer to the rotary drive means 6 shown in FIG. 10 and FIG. 11) is connected to the rotary support shaft 3a and the rotary valve 3B is rotated in the casing 2 by driving and rotating the rotary drive means 6, at least two ventilation windows W, W provided at the circumferential surface S3 of the rotary valve 3B are intermittently positioned to meet the wave transmission port h1 provided at the circumferential surface of the casing 2 according to rotation of the rotary valve 3B respectively.

Next, a method for generating pulsating vibration air at the wave transmission port h1 using the pulsating vibration air generation means 21 is explained.

At first method for generating positive vibration air at the wave transmission port h1 using the pulsating vibration air generation means 21 is explained.

Compression air generation means is used as an air source (not shown) connected to the air supply port h2 for generating positive pulsating vibration air at the wave transmission port h1.

Figure 13:
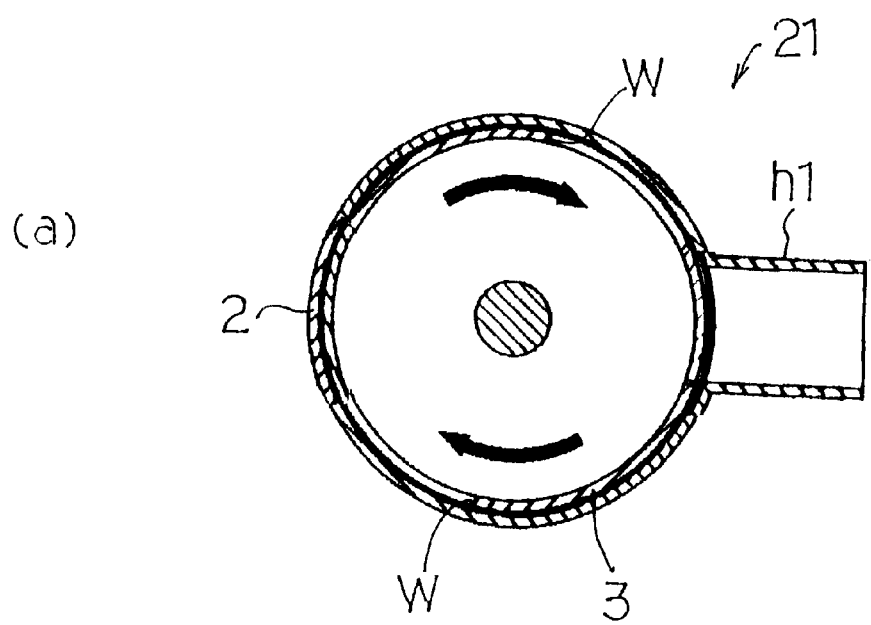
FIG. 13 is an explanatory view schematically showing operation of the pulsating vibration air generation means shown in FIG. 10.
Figure 13:
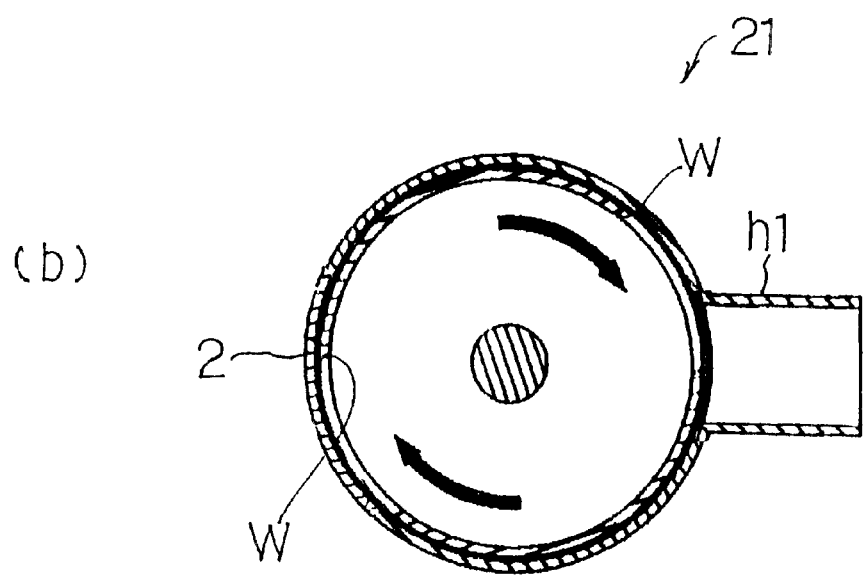
Figure 14:
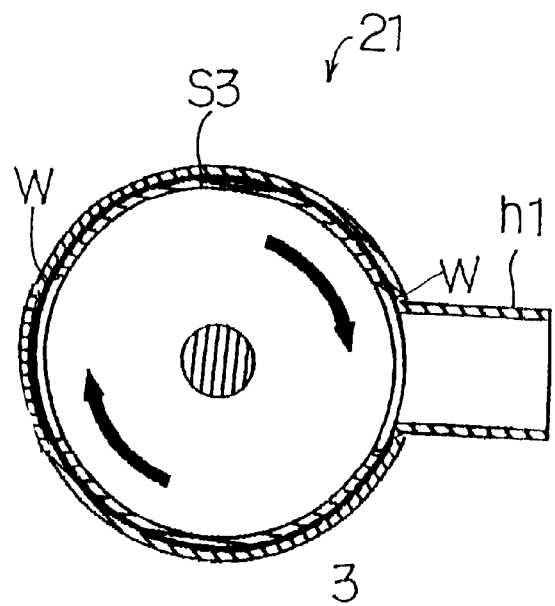
FIG. 14 is an explanatory view schematically showing operation of the pulsating vibration air generation means shown in FIG. 10.
Figure 14:
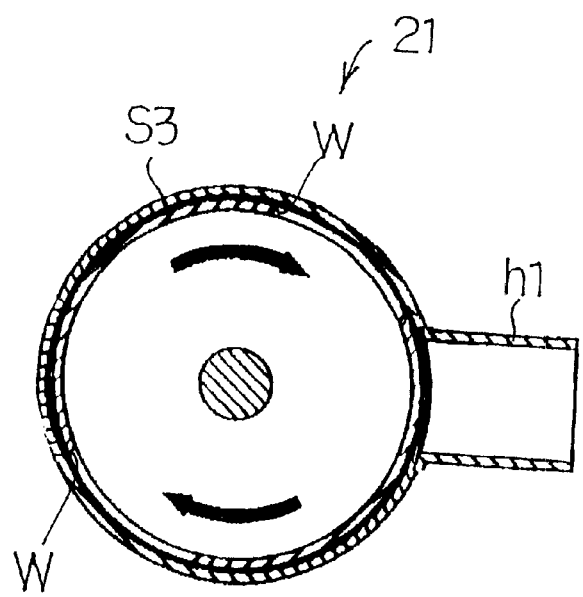

FIG. 13 and FIG. 14 explain operation of the pulsating vibration air generation means 21.

Compressed air generation means is connected to the air supply port h2 for supplying positive pulsating vibration air in the conduit (pneumatic transport pipe, not shown) connected to the wave transmission port h1.

Next, the compression air generation means is driven at a fixed speed and the rotary shaft of the rotary drive means 6 is connected with the rotary support shaft 3a. Then the rotary drive means 6 is driven and rotated at a fixed rotational speed so that the rotary valve 3B is rotated at a fixed rotational speed in the casing 2.

When compressed air generation means is used as an air source and the drum type rotary valve 3B is rotated in the casing 2, if the circumferential surface S3 of the drum type rotary valve 3B other than the ventilation window W is located at the wave transmission port h1, the wave transmission port h1 is closed by the circumferential surface S3 of the drum type rotary valve 3B so that compressed air supplied from the air supply port h2 provided at the circumferential surface of the casing 2 isn't supplied from the wave transmission port h1 into the conduit (pneumatic transport pipe) connected to the wave transmission port h1 (See FIG. 13(a)).

On the other hand, when the ventilation window W provided at the circumferential surface S3 of the drum type rotary valve 3B is located at the wave transmission port h1, the ventilation window W and the wave transmission port h1 are communicated so that compressed air supplied to the air supply port h2 is supplied from the wave transmission port h1 into the conduit (pneumatic transport pipe, not shown) connected to the wave transmission port h1 through the ventilation window W from the open end 3e1 of the drum type rotary valve 3B. (See FIG. 13(b), FIG. 14(a)).

When compressed air generation means is used as an air source and the drum type rotary valve 3B is rotated in the casing 2, supply and stop of compressed air from the wave transmission port h1 of the casing 2 into the conduit (pneumatic transport pipe, not shown) connected to the wave transmission port h1 are repeated. As a result, positive pulsating vibration air is supplied in the conduit (pneumatic transport pipe, not shown) connected to the wave transmission port h1 (See FIG. 13(a), FIG. 13(b), FIG. 14(a), FIG. 14(b)).

Positive pulsating vibration air thus supplied from the wave transmission port h1 of the casing 2 of the pulsating vibration air generation means 21 into the conduit (pneumatic transport pipe, not shown) connected to the wave transmission port h1 is the same as the waves shown in solid lines in FIG. 6(a), FIG. 6(b), FIG. 7(a), FIG. 7(b), and FIG. 8 so that schematic explanatory view of the positive pulsating vibration air is omitted.

Next, a method for generating negative pulsating vibration air at the wave transmission port h1 by the pulsating vibration air generation means 21 is explained.

Air suction means is used as an air source (not shown) connected to the air supply port h2 for generating negative pulsating vibration air at the wave transmission port h1.

Air suction means is connected to the air supply port h2 for supplying negative pulsating vibration air in the conduit (pneumatic transport pipe, not shown) connected to the wave transmission port h1.

Next, the air suction means is driven at a fixed speed and the rotary shaft of the rotary drive means 6 is connected with the rotary support shaft 3a. Then the rotary drive means 6 is driven and rotated at a fixed rotational speed so that the rotary valve 3 is rotated at a fixed rotational speed in the casing 2.

When air suction means is used as an air source and the drum type rotary valve 3B is rotated in the casing 2, if the circumferential surface S3 of the drum type rotary valve 3B other than the ventilation window W is located at the wave transmission port h1, the wave transmission port h1 is closed by the circumferential surface S3 of the drum type rotary valve 3B so that air flow toward the wave transmission port h1 isn't generated in the conduit (pneumatic transport pipe) connected to the wave transmission port h1.

On the other hand, when the ventilation window W provided at the circumferential surface S3 of the drum type rotary valve 3 is located at the wave transmission port h1, the ventilation window W and the wave transmission port h1 are communicated. As a result the air supply port h2 provided at the circumferential surface of the casing 2 and the wave transmission port h1 provided at the circumferential surface of the casing 2 are communicated through the ventilation window W provided at the circumferential surface S3 of the drum type rotary valve 3B and the open end 3e1 of the drum type rotary valve 3B, so that air flow toward the wave transmission port h1 is generated in the conduit (pneumatic transport pipe) connected to the wave transmission port h1.

When air suction means is used as an air source and the drum type rotary valve 3B is rotated in the casing 2, flow and stop of air flow toward the wave transmission port h1 of the casing in the conduit (pneumatic transport pipe, not shown) connected to the wave transmission port h1 are repeated. As a result, negative pulsating vibration air is supplied into the conduit (pneumatic transport pipe, not shown) connected to the wave transmission port h1.

Negative pulsating vibration air thus supplied from the wave transmission port of the casing 2 of the pulsating vibration air generation means 21 into the conduit (pneumatic transport pipe, not shown) connected to the wave transmission port h1 is the same as the waves shown in broken lines in FIG. 6(a), FIG. 6(b), FIG. 7(a), FIG. 7(b), and FIG. 8 so that schematic explanatory view of the negative pulsating vibration air is omitted.

According to the pulsating vibration air generation means 21, the drum type rotary valve 3B having the ventilation window W is contained in the casing. If the drum type rotary valve 3B is contained in the casing 2 so as not to have gap between the inner circumference of the casing 2 and the outer circumference of the drum type rotary valve 3B, air isn't leaked from the wave transmission port h1 of the casing 2 even if high pressure air is supplied in the air supply port h2 of the casing 2 because the wave transmission port h1 of the casing 2 is closed by the circumferential surface S3 of the drum type rotary valve 3B except when the ventilation window W of the drum type rotary valve 3B is located at the wave transmission port h1 of the casing 2.

Further according to the pulsating vibration air generation means 21, the drum type rotary valve 3B having the ventilation window W is contained in the casing 2. If the drum type rotary valve 3B is contained in the casing 2 so as not to have gap between the inner circumference of the casing 2 and the outer circumference of the drum type rotary valve 3B, air flow toward the wave transmission port h1 isn't generated in the conduit (pneumatic transport pipe, not shown) connected to the wave transmission port h1 of the casing 2 even when air is strongly sucked by the air suction means by connecting the air suction means to the air supply port h2 of the casing 2 because the wave transmission port h1 of the casing 2 is closed by the circumferential surface S3 of the drum type rotary valve 3B except when the ventilation window W of the drum type rotary valve 3B is located at the wave transmission port h1 of the casing 2.

According to the pulsating vibration air generation means 21, pulsating vibration air is generated by means of the drum type rotary valve 3B so that such a problem that heat generation caused by driving an electromagnetic valve for a long time isn't happened. Therefore, the pulsating vibration air generation means 21 is suitable for generating pulsating vibration air for a long time.

Moreover, the pulsating vibration air generation means 21 is provided with the cylindrical casing 2 and the drum type rotary valve 3B. As a result, there is an advantage that the means 1 can be easily large scaled in such a manner that the cylindrical casing 2 is enlarged into its diametrical direction and/or longitudinal direction and accordingly the rotary valve 3B is enlarged into its diametrical direction and/or longitudinal direction for generating large amount of pulsating vibration air.

Embodiment of the Invention 4

Figure 15:
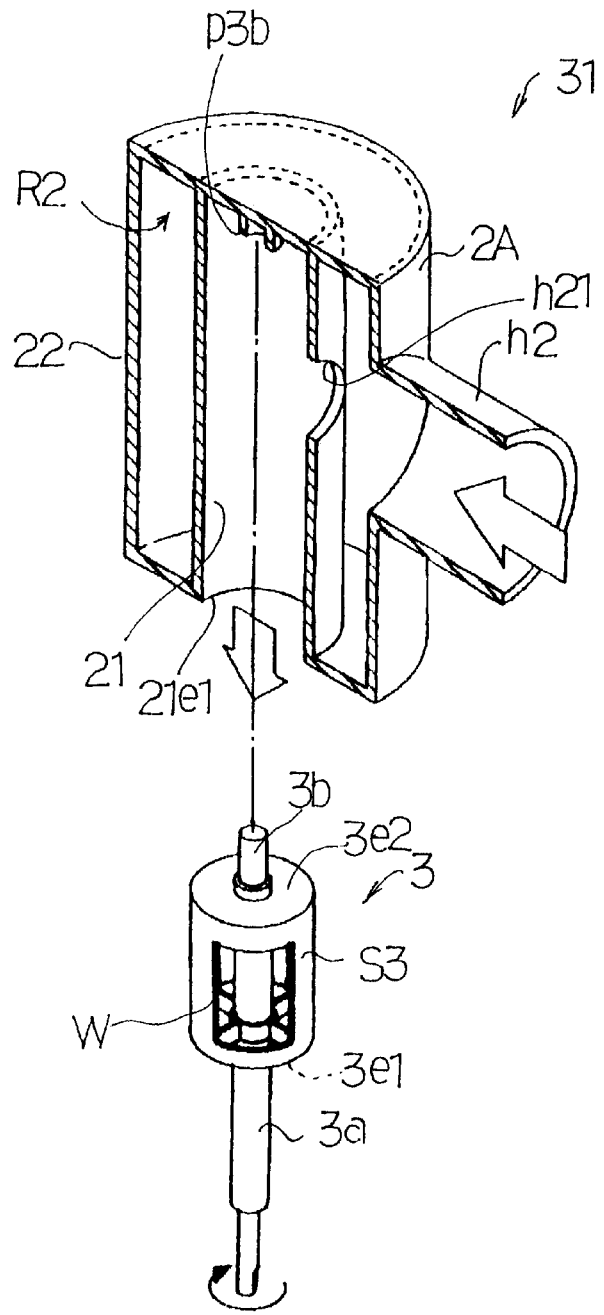
FIG. 15 is a substantial sectional perspective view of other embodiment of the pulsating vibration air generation means of the present invention.

FIG. 15 is a substantial sectional perspective view of other embodiment of the pulsating vibration air generation means of the present invention.

The pulsating vibration air generation means 31 has a casing 2A and a drum type rotary valve 3.

The casing 2A is double structure with an inner cylinder 21 and an outer cylinder 22 spaced apart each other.

The both ends of the inner cylinder 21 and the outer cylinder 22 are sealed.

An annular space R2 is formed for the casing 2A by sealing the both ends of the inner cylinder 21 and the outer cylinder 22.

An air supply port h2 connected to the air source is provided for the circuit surface of the outer cylinder 22.

An opening h2 is provided at the circumferential surface of the inner cylinder 21.

One end 21e1 of the inner cylinder 21 is opened.

A drum type rotary valve 3 is rotatably contained in the inner cylinder 21 of the casing 2A.

The opening h21 of the circumferential surface of the inner cylinder 21 is provided so as to be positioned at where the circumferential surface S3 of the rotary valve 3 is located when the rotary valve 3 is contained in the inner cylinder 21.

The drum type rotary valve 3 has a rotary support shaft 3a at the center axis of the rotary vale 3.

One end 3e1 of the rotary valve 3 is opened and the other end 3e2 of the rotary valve 3 is closed.

A ventilation window W is provided for the circumferential surface S3 of the rotary valve 3.

At least one ventilation window W may be provided for the circumferential surface S3 of the rotary valve 3.

In this embodiment, the rotary valve 3 is contained in the inner cylinder 21 of the casing 2 in such a manner that the one open end 3e1 of the rotary valve 3 faces to the open end 21e1 of the inner cylinder 21 of the casing. Rotary drive means (refer to the rotary drive means 6 in FIG. 1) is connected to the rotary support shaft 3a.

When the rotary valve 3 is rotated in the inner cylinder 21 of the casing 2 by driving and rotating the rotary drive means (see the rotary drive means 6 in FIG. 1), the ventilation window W provided for the circumferential surface S3 of the rotary valve 3 intermittently comes to a position which meets the opening h21 of the circumferential surface of the inner cylinder 21 of the casing 2.

According to the pulsating vibration air generation means 31, the casing 2 is double structure with the inner cylinder 21 and the outer cylinder 22 and the opening h21 of the circumferential surface of the inner cylinder 24 is designed to be positioned at where the circumferential surface S3 of the drum type rotary valve 3 is located when the drum type rotary valve 3 is contained in the inner cylinder 21.

Therefore, when compressed air generation means is used as an air source and the drum type rotary valve 3 is rotated in the inner cylinder 21, the opening h21 is closed by the circumferential surface S3 of the drum type rotary valve 3 when the circumferential surface S3 of the drum type rotary valve 3 other than the ventilation window W is positioned at the opening port h21. Therefore, compressed air supplied from the air supply port h2 provided at the circumferential surface of the outer cylinder 22 isn't discharged from the open end 3e1 of the rotary valve 3.

On the other hand, when the ventilation window W of the circumferential surface S3 of the drum type rotary valve 3 is positioned at the opening h21 of the circumferential surface of the inner cylinder 21, the ventilation window W and the opening h21 are communicated. The compressed air supplied from the air supply port h2 of the circumferential surface of the outer cylinder 22 is supplied in the drum type rotary valve 3 through the ventilation window W of the circumferential surface S3 of the drum type rotary valve 3 and is discharged from the end 3e1 of the drum type rotary valve 3.

When compressed air generation means is used as an air source and the drum type rotary valve 3 is rotated in the inner cylinder 21, stop and discharge of compressed air from the end 3e1 of the drum type rotary valve are repeated. As a result, positive pulsating vibration air is supplied in the conduit (pneumatic transport pipe, not shown) connected to the open end 21e1 of the inner cylinder 21.

Further, when air suction means is used as an air source and the drum type rotary valve 3 is rotated in the inner cylinder 21, air flow toward the open end 3e1 of the rotary valve 3 isn't generated at the open end 3e1 of the rotary valve 3 because the opening h21 is closed by the circumferential surface S3 of the drum type rotary valve 3 when the circumferential surface S3 of the drum type rotary valve 3 other than the ventilation window W is positioned at the opening h21.

On the other hand, when the ventilation window W of the circumferential surface S3 of the rotary valve 3 is positioned at the opening h21 of the circumferential surface of the inner cylinder 21, the ventilation window W and the opening h21 are communicated. Therefore, air flow toward the open end 3e1 of the rotary valve 3 is generated at the open end 3e1 of the rotary valve 3 because the air supply port h2 of the circumferential surface of the outer cylinder 22 and the open end 3e1 of the rotary valve 3 are communicated through the ventilation window W and the opening h21.

When air suction means is used as an air source and the drum type rotary valve 3 is rotated in the inner cylinder 21, flow and stop of air flow toward the open end 3e1 of the rotary valve 3 are repeated. Therefore, when the conduit (pneumatic transport pipe, not shown) is connected to the open end 21e1 of the inner cylinder 21, negative pulsating vibration air toward the open end 3e1 of the drum type rotary valve 3 is generated in the conduit (pneumatic transport pipe, not shown) connected to the open end 21e1 of the inner cylinder.

Figure 16:
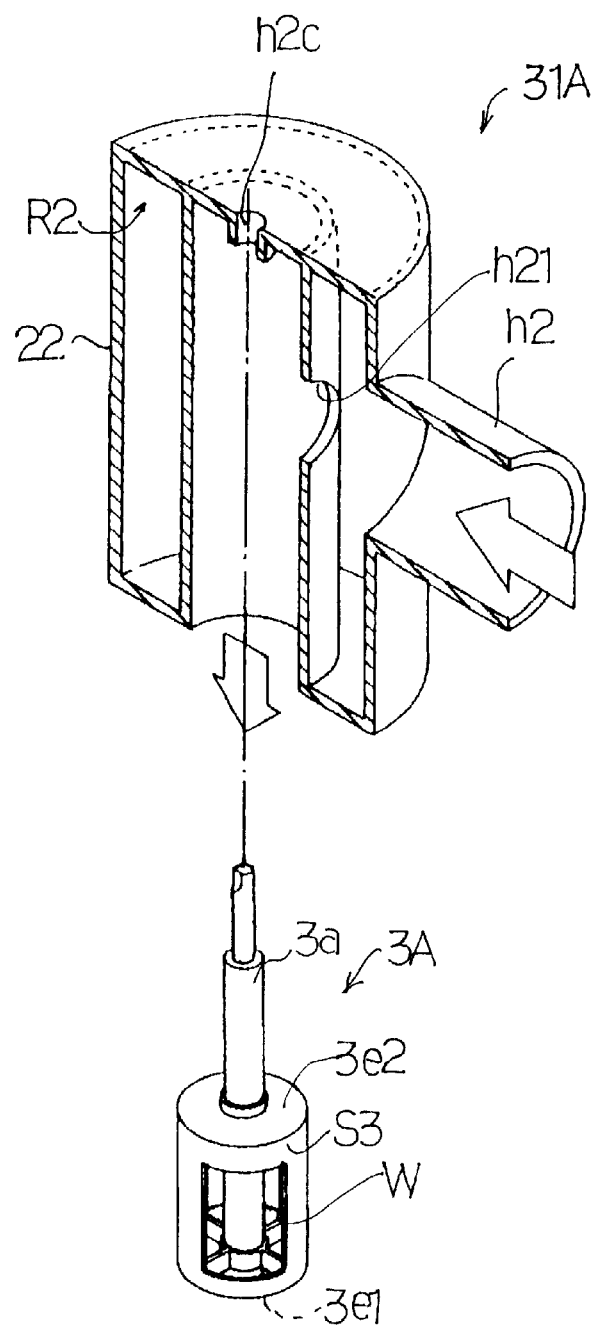
FIG. 16 is a substantial sectional perspective view of other embodiment of the pulsating vibration air generation means of the present invention.

It is preferable to provide the rotary support shaft 3a connected to the rotary drive means (refer to the rotary drive means 6 in FIG. 1) opposite to the open end 21e1 of the inner cylinder 21 for rotating the rotary valve 3A like the pulsating vibration air generation means 31 in FIG. 16 in order to facilitate connection of the conduit (pneumatic transport pipe, not shown) to the open end 21e1 of the inner cylinder 21.

Embodiment of the Invention 5

Figure 17:
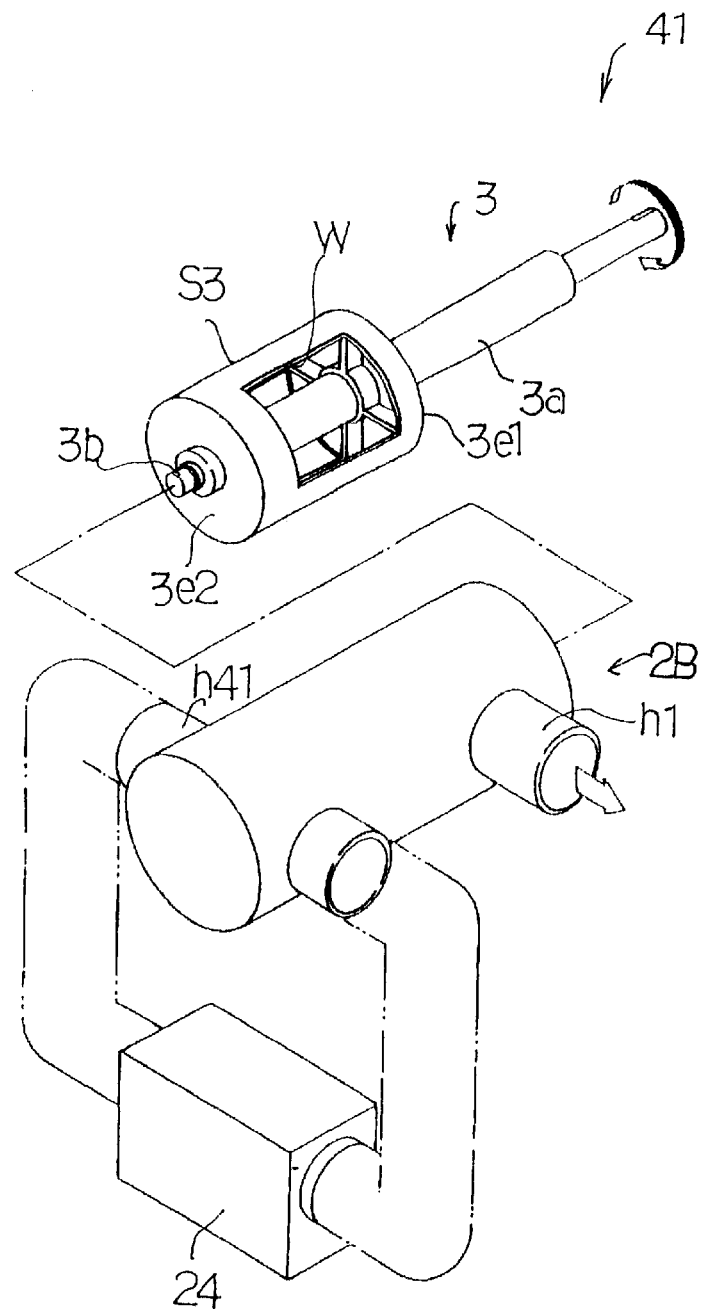
FIG. 17 shows diagrammatic construction of other embodiment of the pulsating vibration air generation means of the present invention.

FIG. 17 is a substantial sectional perspective view of other embodiment of the pulsating vibration air generation means of the present invention.

The pulsating vibration air generation means 41 has a cylindrical casing 2B and a drum type rotary valve 3.

The casing 2B has a first connection port h41 and a second connection port h42 on the circumferential surface thereof so as to have a fixed distance.

The first connection port h41 and the second connection port h42 are faced on the circumferential surface of the casing 2B as shown in FIG. 17.

The casing 2B has a wave transmission port h1 on its circumferential surface.

The drum type rotary valve 3 is rotatably contained in the casing 2B.

The first connection port h41 and the second connection port h42 of the circumferential surface of the casing 2B are provided so as to be positioned at where the circumferential surface S3 of the rotary valve 3 is located when the rotary valve 3 is contained in the casing 2B.

The wave transmission port h1 of the circumferential surface of the casing 2B is provided so as to be positioned apart from where the circumferential surface S3 of the rotary valve 3 is located when the rotary valve 3 is contained in the casing 2B.

According to the pulsating vibration air generation means 41, compressed air generation means is connected to the first connection port h41 provided at the circumferential surface of the casing 2B.

Air suction means is connected to the second connection port h42 provided at the circumferential surface of the casing 2B.

In this embodiment, compression air generation means such as a blower is used as an air source 24 and the first connection port h41 is connected to its air supply side and the second connection port h42 is connected to its air suction side.

The drum type rotary valve 3 has a rotary support shaft 3a at the center axis of the rotary vale 3.

One end 3e1 of the rotary valve 3 is opened and the other end 3e2 of the rotary valve 3 is closed.

A ventilation window W is provided for the circumferential surface S3 of the rotary valve 3.

In this embodiment one ventilation window W is provided for the circumferential surface S3 of the rotary valve 3.

The rotary valve 3 is contained in the casing 2B in such a manner that the one open end 3e1 of the rotary valve 3 faces to the wave transmission port h1 of the casing 2B.

Rotary drive means (refer to the rotary drive means 6 in FIG. 1) is connected to the rotary support shaft 3a.

According to the pulsating vibration air generation means 41, when the rotary valve 3 is rotated in the casing 2B by driving and rotating the rotary drive means (see the rotary drive means 6 in FIG. 1), the ventilation window W provided for the circumferential surface S3 of the rotary valve 3 intermittently comes to a position which meets the first connection port h41 or the second connection port h42 of the circumferential surface of the casing 2B.

According to the pulsating vibration air generation means 41, compressed air generation means is connected to the first connection port h41 and air suction mean is connected to the second connection port h42 so that pulsing vibration air with large amplitude can be generated from the wave transmission port h1 of the casing 2B by driving both of the compressed air generation means and the air suction means.

Further according to the pulsating vibration air generation means 41, if drive amount of the compressed air generation means is made larger than that of the air suction means, positive pulsating vibration air can be supplied in the conduit (pneumatic transport pipe) connected to the wave transmission port h1 of the casing 2B.

Furthermore according to the pulsating vibration air generation means 41, if drive amount of the air suction means is made larger than that of the compressed air generation means, negative pulsating vibration air can be supplied in the conduit (pneumatic transport pipe) connected to the wave transmission port h1 of the casing 2B.

Figure 18:
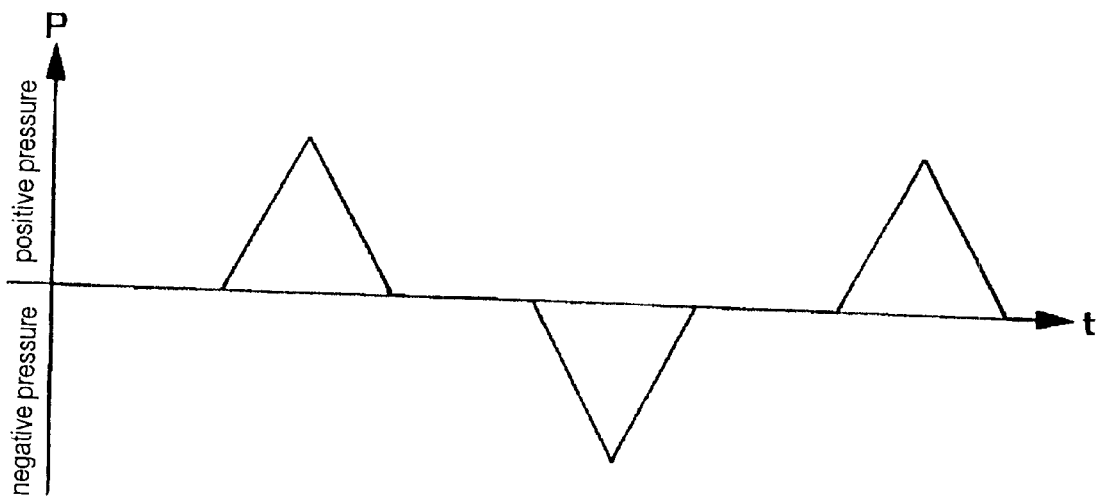
FIG. 18 is an explanatory view continuously showing pulsating vibration air generated at the wave transmission port by driving the pulsating vibration air generation means shown in FIG. 17.

Namely, when the pulsating vibration air generation means 41 is used and the ventilation window W of the rotary valve 3 is positioned at the first connection port h41, positive pulsating vibration air is generated from the wave transmission port h1. When the ventilation window W is positioned at the second connection port h42, negative pulsating vibration air toward the wave transmission port h1 is generated (see FIG. 18).

Next, applications of the pulsating vibration air generation means 1, 11, 21, 31, 31A, 41 are illustratively explained.

Figure 19:
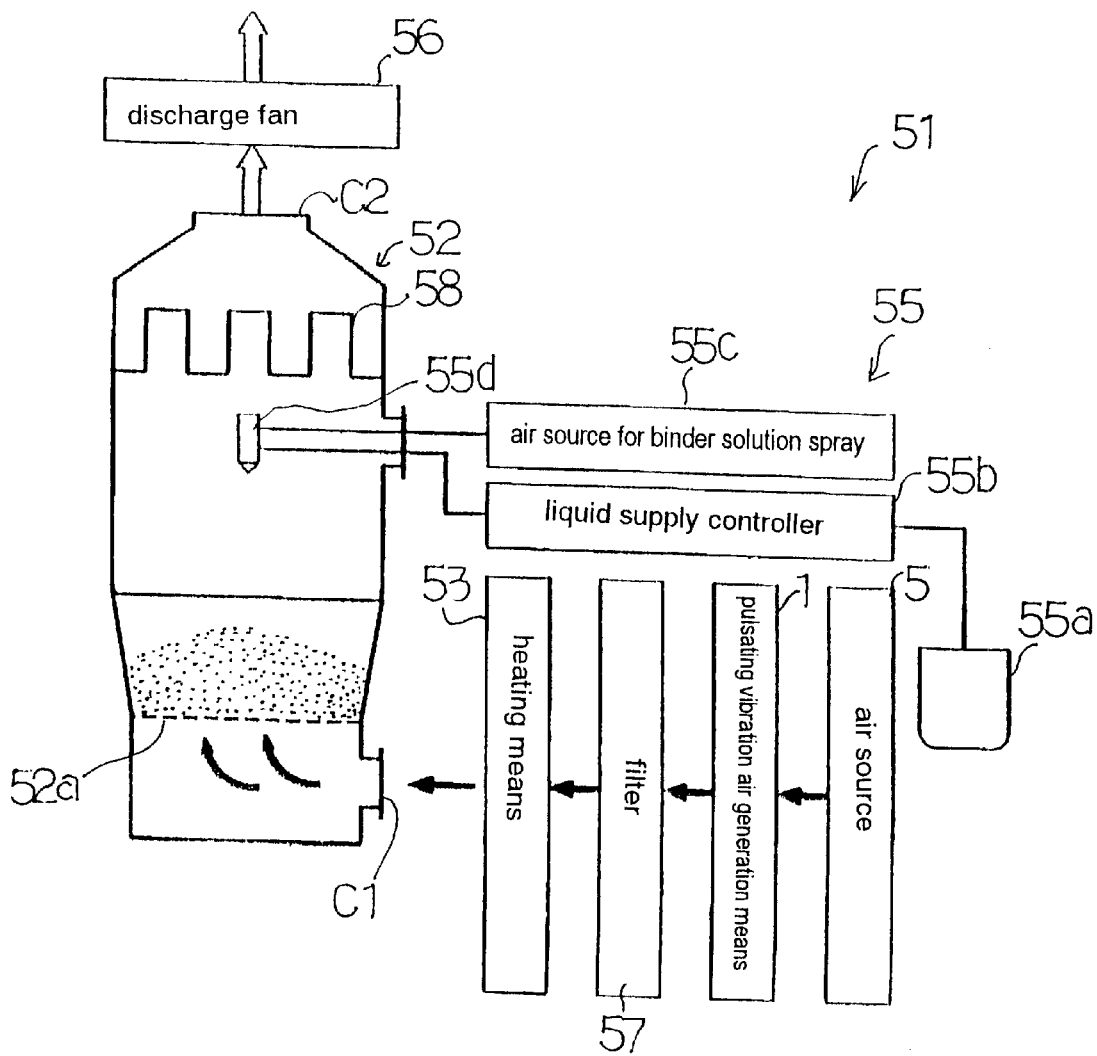
FIG. 19 shows diagrammatic construction of a fluid-bed granulation means incorporating the pulsating vibration air generation means shown in FIG. 1.

FIG. 19 shows diagrammatic construction of a fluid-bed granulation means incorporating the pulsating vibration air generation means 1.

The fluid-bed granulation means 51 has a granulation tank 52, an air source 54, pulsating vibration air generation means 1, heating means 53, and binder spray means 55.

The granulation tank 52 is provided with a fluid plate 52a made of porous material.

The granulation tank 52 is also provided with a heated air supply port C1 under the fluid plate 52a.

Further the granulation tank 52 is provided with an air discharge port C2 to which a discharge fan 56 is connected at its upper portion.

The binder spray means 55 has a binder solution storage tank 55a for storing binder solution, liquid supply control means 55b, an air source 55c for spraying binder solution, and a binder spray nozzle 55d.

The binder spray nozzle 55d is attached at a predetermined place in the granulation tank 52.

When binder solution is spayed from the binder spray nozzle 55d, binder solution is stored in the binder solution storage tank 55a and each of the liquid supply control means 55b and the air source 55c for spraying binder solution is driven at a fixed speed. When the liquid supply control means 55b is driven, liquid solution is supplied from the binder solution storing tank 55a to the binder spray nozzle 55d. Then the binder solution supplied by the liquid supply control means 55b from the binder spray nozzle 55d is designed to be sprayed in nebulosus condition by the air for spraying binder solution supplied from the air source 55c for spraying binder solution.

Compressed air generation means such as a blower is used as an air source 54 in the granulation means 51.

When the air source 54 is driven at a fixed speed and the pulsating vibration air generation means 1 is also driven at a fixed speed, compressed air generated by driving the air source 54 is converted to positive pulsating vibration air by the pulsating vibration air generation means 1.

Positive pulsating vibration air discharged from the pulsating vibration air generation means 1 is heated to a predetermined temperature by the heating means 53.

Thus heated positive pulsating vibration air at a predetermined temperature by the heating means 53 is supplied from the heated air supply port C1 under the fluid plate 52a so as to be blown upward from the fluid plate 52a.

The member indicated as 57 in FIG. 19 is a filter. The filter 57 is provided if necessary so as to remove powder and dust included in the positive pulsating vibration air discharged from the pulsating vibration air generation means 1.

The member indicated as 58 in FIG. 19 is a bug filter. The bug filter 58 is provided for collecting powdered material or material under granulation to be contained in the granulation tank 52 when granulated material is produced by the fluid-bed granulation means 51.

When granulated material with desired particle diameter and desired size distribution is produced by means of the fluid-bed granulation means 51, powdered material is contained on the fluid plate 52a in the granulation tank 52.

Then binder solution is stored in the binder solution storing tank 55a.

The air source 54, the pulsating vibration air generation means 1, the heating means 53 and the discharge fan 56 are driven at a fixed speed respectively, and powdered material stored on the fluid plate 52a in the granulation tank 52 is mixed with and dispersed in heated positive pulsating vibration air so that desired fluid bed is obtained.

Then misty binder solution is sprayed from the binder spray nozzle 55d by driving the binder spray means 55, and fluidized bed between the particles is bound and dried by the binder so that granulated material with desired particle diameter and desired size distribution is produced.

Thus, if heated positive pulsating vibration air, not heated steady pressure air, is used, pinhole of powdered material, which is apt to be caused by using heated steady pressure air, is hardly caused when powdered material stored on the fluid plate 52a is fluidized. Therefore, granulated material having narrow size distribution and having large peak value in a certain particle diameter value can be produced at high productivity because almost all of the powdered material stored on the fluid plate 52a becomes fluidized bed.

In this embodiment, the granulation means 51 using the pulsating vibration air generation means 1 is explained. However, it is only an exemplification and any one of pulsating vibration air generation means 11, 21, 31, 31A, and 41 can be preferably used instead of the pulsating vibration air generation means 1 for the granulation means 51.

Figure 20:
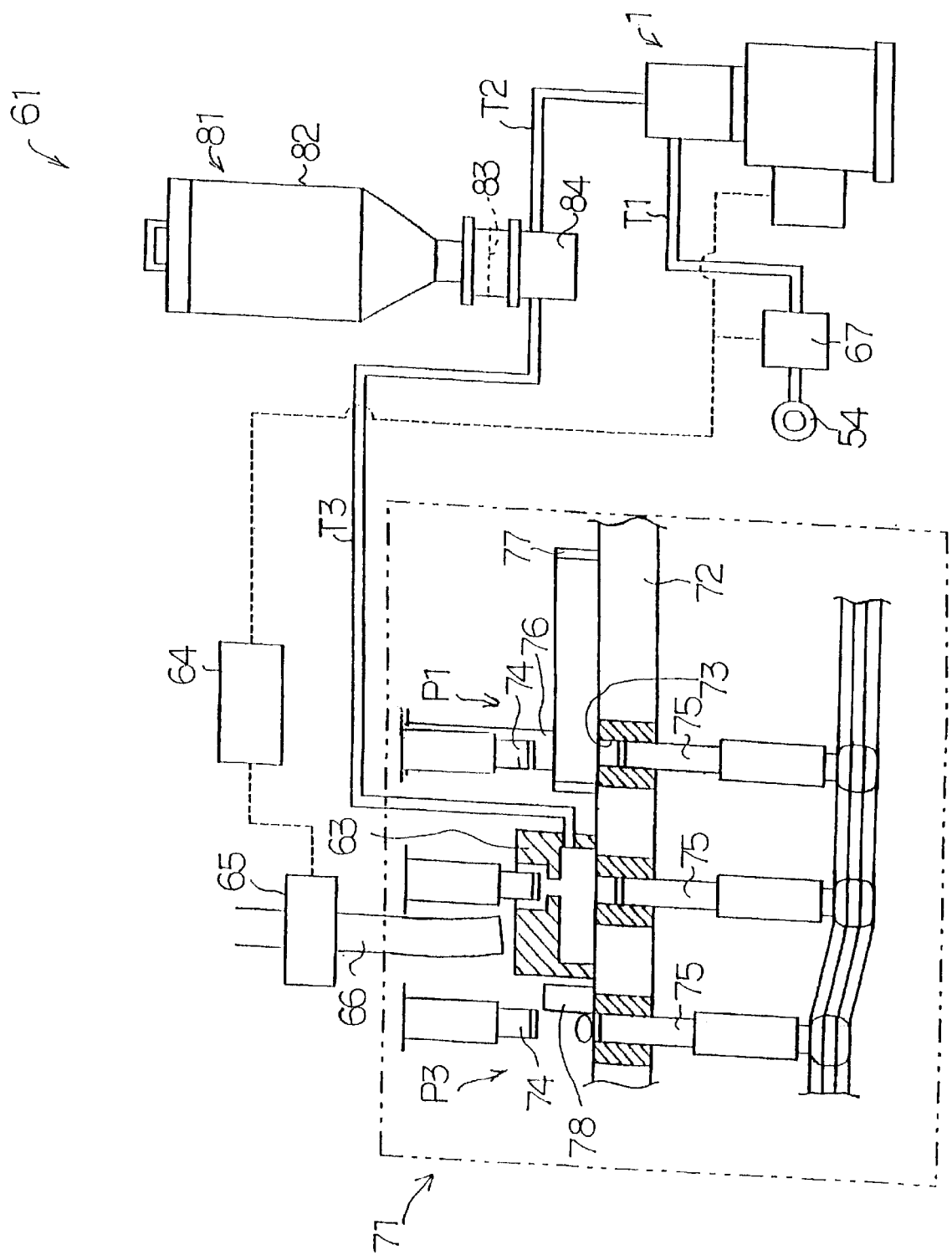
FIG. 20 shows diagrammatic construction of an external lubricant spray type tabletting means incorporating the pulsating vibration air generation means shown in FIG. 1.

FIG. 20 shows diagrammatic construction of an external lubricant spray type tabletting means incorporating the pulsating vibration air generation means 1.

According to the external lubricant spray type tabletting means 61, lubricant is applied on each surface (material contact surface) of an upper punch 74, a lower punch 75, and a die 73 for preventing attachment of molding material on the surface (material contact surface) of the upper punch 74, the lower punch 75, and the die 73. Molding material is compressed so as to produce a tablet by means of the upper punch 74 on which surface (material surface) lubricant is applied, the lower punch 75 on which surface (material surface) lubricant is applied, and the die 73 on which surface (material surface) lubricant is applied.

The external lubricant spray type tabletting means 61 has a rotary type tabletting machine 71, lubricant spray means 63, quantitative discharge means 81, pulsating vibration air generation means 1, and an air source 54.

The rotary type tabletting machine 71 is a well-known type having a rotary table 72 with plural dies 73 . . . , plural upper punches 74 . . . , and plural lower punches 75 . . . .

Next, operation of the rotary type tabletting machine 71 is explained.

The rotary type tabletting machine 71 has a material charge point P1, a compression point P2, and a tablet discharge point P3.

For producing tablets by the rotary type tabletting machine 71, the rotary table 72, the plural upper punches 74 . . . , and the plural lower punches 75 . . . are synchronized and rotated at a fixed rotational speed.

Molding material is sequentially charged in the dies 73 . . . at the material charge point P1, molding material charged in the dies 73 . . . at the material charge point P1 is compressed by the upper punches 74 . . . and the lower punches 75 . . . combined with each dies 73 . . . at the material compression point (not shown). Thus obtained tablets are sequentially and continuously discharged at the tablet discharge point P3.

The lubricant spray means 63 is fixedly provided between the tablet discharge point P3 and the material charge point P1 on the rotary table 72 and sequentially sprays lubricant powder on the dies 73 . . . fed under the lubricant spray means 63 by rotation of the rotary table 72, and the lower punches 75 . . . inserted in a fixed position in each of the dies 73 . . . fed under the lubricant spray means 63, and the upper punches 74 . . . fed above the lubricant spray means 63 by driving and rotating the plural upper punches 74 . . . .

Next construction of the quantitative discharge means 81 is explained.

Figure 21:
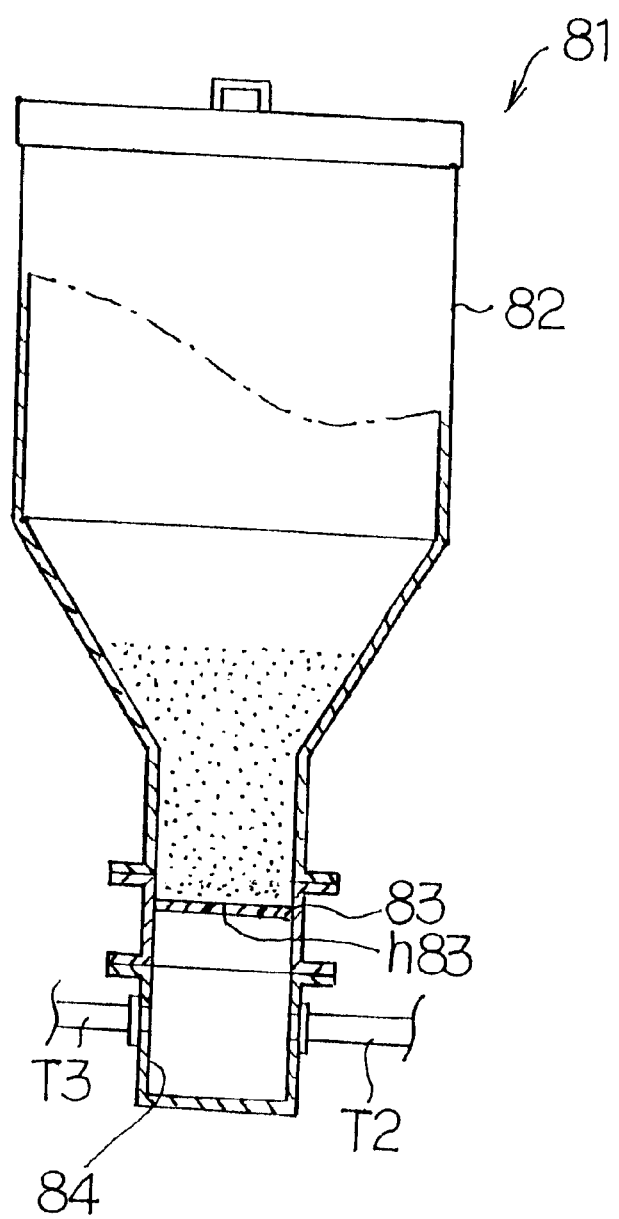
FIG. 21 is a partial cut away sectional view diagrammatically showing a quantitative discharge means used in the external lubricant spray type tabletting means shown in FIG. 20.

FIG. 21 is a partial cut away sectional view diagrammatically showing quantitative discharge means 81.

The quantitative discharge means 81 has a material storage hopper 82 for storing lubricant powder, an elastic membrane 83 provided so as to form the bottom of the material storage hopper 82, and a dispersion chamber 84 connected to the material storage hopper 82 interposing the elastic membrane 83.

Figure 22:
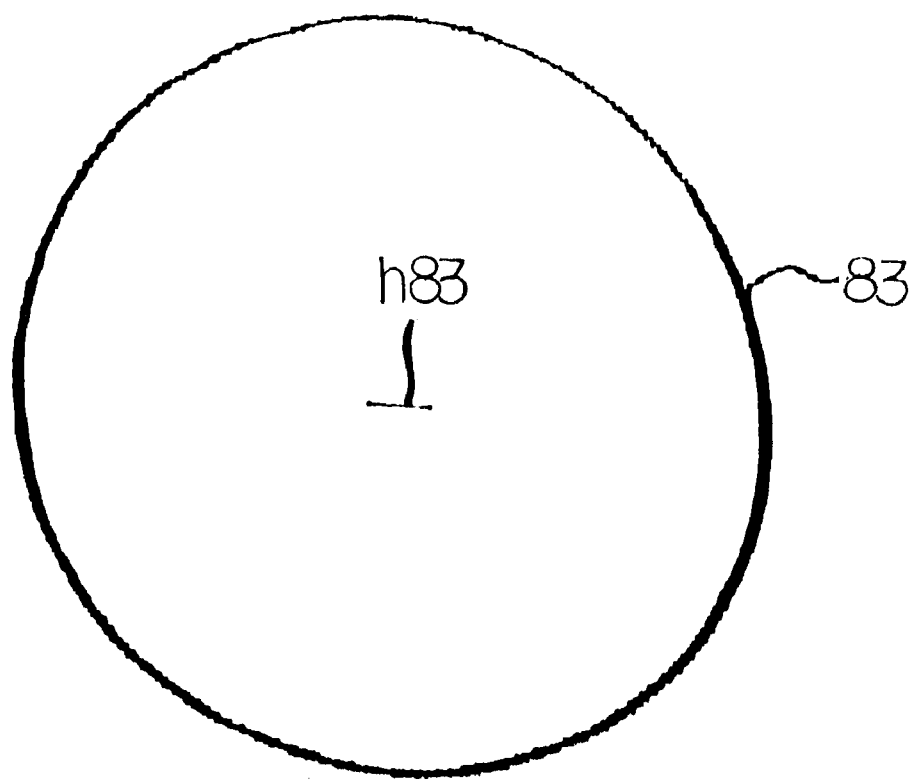
FIG. 22 is a plane view diagrammatically showing an elastic membrane used in the quantitative discharge means shown in FIG. 21.

FIG. 22 is a plane view diagrammatically showing an elastic membrane 83.

The elastic membrane 83 is made of synthetic rubber such as silicon rubber and has an aperture h83 at the center thereof.

The dispersion chamber 84 is provided with an air introduction port 84a and the air discharge port 84b.

The air introduction port 84a is connected to the wave transmission port h1 of the pulsating vibration air generation means 1 via a conduit (pneumatic transport pipe) T2.

Thus positive pulsating vibration air generated by driving the pulsating vibration air generation means 1 is supplied from the air introduction port 84a in the dispersion chamber 84.

The air discharge port 84b is connected to the lubricant spray means 63 via the conduit (pneumatic transport pipe) T2.

Then, operation of the quantitative discharge means 81 is explained.

At first lubricant powder is stored in the material storage hopper 82 when lubricant powder is supplied in the lubricant spray means 63 by means of the quantitative discharge means 81.

Positive pulsating vibration air is supplied in the conduit (pneumatic transport pipe) T2 from the wave transmission port h1 of the pulsating vibration air generation means 1 by driving the air source 54 and the pulsating vibration air generation means 1.

Positive pulsating vibration air supplied in the conduit (pneumatic transport pipe) T2 from the wave transmission port h1 of the pulsating vibration air generation means 1 is flown in the dispersion chamber 84 from the air introduction port 84a.

Pressure change such that pressure is heightened and lowered according to the frequency of flown positive pulsating vibration air is caused in the dispersion chamber 84 by positive pulsating vibration air.

When positive pulsating vibration air supplied in the dispersion chamber 84 is at its peak frequency and the pressure in the dispersion chamber 84 is heightened, the elastic membrane 83 is curved upward in such a manner that the periphery becomes node of vibration and the center of the membrane 83 becomes antinode of vibration.

The aperture h83 provided for the elastic membrane 83 is changed into V-shaped, wherein upper part is opened, when seen in section.

This time lubricant powder stored on the elastic membrane 83 drops in the V-shaped aperture.

When positive pulsating vibration air supplied in the dispersion chamber 84 gradually becomes its valley of frequency from its peak and pressure in the dispersion chamber 84 becomes low, the elastic membrane 83 wants to return its original position because of its resilience. The lubricant powder dropped in the V-shaped aperture h83 when the elastic membrane 83 is curved upward is contained in the aperture 83.

Then when positive pulsating vibration air supplied in the dispersion chamber 84 becomes its valley of frequency and the pressure in the dispersion chamber 84 is lowered, the elastic membrane 83 is curved downward in such a manner that the periphery becomes node of vibration and the center of the membrane 83 becomes antinode of vibration.

The aperture h83 provided for the elastic membrane 83 is changed into reverse V-shaped, wherein lower part is opened, when seen in section. This time the lubricant powder contained in the aperture h83 of the elastic membrane 83 is discharged into the dispersion chamber 84.

The up and down vibration of the above-mentioned elastic membrane 83 is defined by the positive pulsating vibration air supplied in the dispersion chamber 84.

Accordingly if positive pulsating vibration air supplied in the dispersion chamber 84 is made constant, the discharge amount of the lubricant powder from the aperture h83 of the elastic membrane becomes constant.

The lubricant powder discharge in the dispersion chamber 84 is mixed with positive pulsating vibration air supplied in the dispersion chamber 84 to be dispersed and is discharged to a conduit (pneumatic transport pipe) T3 together with positive pulsating vibration air from the air discharge port 84b of the dispersion chamber 84.

The lubricant powder discharged in the conduit (pneumatic transport pipe) T3 together with positive pulsating vibration air is pneumatically transported in the conduit (pneumatic transport pipe) T3 and supplied in the lubricant spray means 63 while being mixed with and dispersed in pulsating vibration air.

According to the external lubricant spray type tabletting means 61, lubricant powder being mixed with and dispersed in positive pulsating vibration air is pneumatically transported in the conduit (pneumatic transport pipe) T3 connecting the quantitative discharge means 81 and the lubricant spray means 63.

Therefore, accumulation and pinhole of powdered material in the conduit (pneumatic transport pipe) T3, which is apt to be caused for pneumatically transporting powdered material by means of steady pressure air flow, is hardly caused.

As a result, according to the external lubricant spray type tabletting means 61, a fixed amount of lubricant powder can be always constantly sprayed together with positive pulsating vibration air from the lubricant spray means 63. Therefore, suitable amount of lubricant powder can be sequentially applied on the surfaces (material contact surfaces) of the dies 73 . . . fed under the lubricant spray means 63 by rotation of the rotary table 72, and the surfaces (material contact surfaces) of the lower punches 75 . . . inserted in a fixed position in each of the dies 73 fed under the lubricant spray means 63, and the surfaces (material contact surfaces) of the upper punches 74 . . . fed above the lubricant spray means 63 by rotating the plural upper punches 74 . . . .

Accordingly if such external lubricant spray type tabletting means 61 is used, molding material doesn't attach on the surfaces (material contact surfaces) of the plural dies 73 . . . , the surfaces (material contact surfaces) of the plural lower punches 75 . . . , and the surfaces (material contact surfaces) of the plural upper punches 74 . . . . Therefore, tablets don't have tabletting troubles such as sticking, laminating, and capping so that efficient continuous tabletting of the tablets can be done.

Further according to the external lubricant spray type tabletting means 61, lubricant powder isn't required to be added in the molding material. Therefore, tablets without including lubricant powder therein can be produced when molding material without including lubricant powder is tabletted by means of the external lubricant spray type tabletting means 61. Thus produced tablet without including lubricant powder brings out rapid disintegration characteristic because such tablets don't cause phenomenon of delay of disintegration characteristic of tablet arisen by water repellency of lubricant powder, which is apt to be seen in the tablets including lubricant powder.

The member shown as 64 in FIG. 20 is a processing unit controlling and unifying the entire external lubricant spray type tabletting means 61, the member shown as 65 is air suction means such as a blower for sucking and removing extra lubricant powder among the lubricant powder sprayed from the lubricant spray means 63, the member T4 is a suction duct connected with the air suction means 65, and the member 66 is flow rate control means provided if necessary.

The member shown as 76 is a feed chute provided at the material discharge point P1, the member 77 shows a scraper for controlling the charge amount of the molding material in the dies 73 . . . at the material discharge point P1, and the member 78 is a scraper for discharging the tablets at a desirable place.

In this embodiment the external lubricant spray type tabletting means 61 uses the pulsating vibration air generation means 1 as the pulsating vibration air generation means. However, it is one of exemplification and pulsating vibration air generation means 11, 21, 31, 31A, 41 may be preferably used for the external lubricant spray type tabletting means 61 instead of the pulsating vibration air generation means 1.

In the following embodiments of the invention 6–9, pulsating vibration air generation means wherein vibration (low frequency) is prevented, large load isn't applied on the air source, and drive efficiency loss of the air source isn't caused is explained.

Embodiment of the Invention 6

Figure 23:
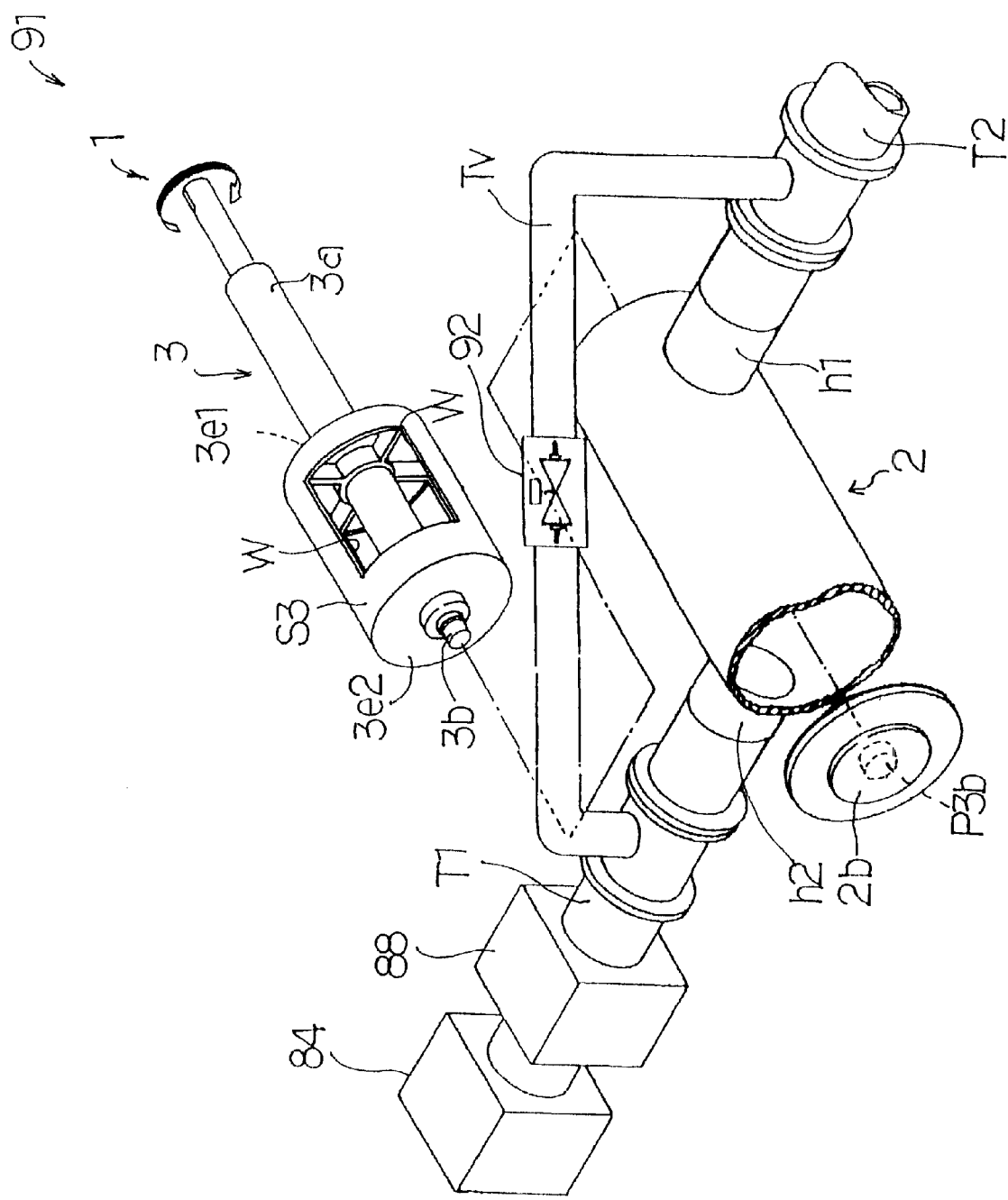
FIG. 23 shows diagrammatic construction of other embodiment of the pulsating vibration air generation means of the present invention.

FIG. 23 shows diagrammatic construction of other embodiment of the pulsating vibration air generation means of the present invention.

The pulsating vibration air generation means 91 has pulsating vibration air generation means 1 and a bypass pipe Tv.

The bypass pipe Tv is connected between a conduit T1 connecting an air source 84 and an air supply port h2 of a casing 2 and a conduit T2 (pneumatic transport pipe) connected to a wave transmission port h1 of the casing 2.

According to the pulsating vibration air generation means 91, as the bypass pipe Tv is connected between the conduit T1 connecting the air source 84 and the air supply port h2 of the casing 2 and the conduit T2 (pneumatic transport pipe) connected to the wave transmission port h1 of the casing 2, when compressed air generation means is used as the air source 84, positive air generated by driving the compressed air generation means is supplied to the conduit (pneumatic transport pipe) T2 connected to the wave transmission port h1 of the casing 2 via the bypass pipe Tv when the air supply port h2 of the casing 2 is closed by a circumferential surface S3 of a drum type rotary valve 3.

Namely according to the pulsating vibration air generation means 91, even if the air supply port h2 of the casing 2 is closed by the circumferential surface S3 of the drum type rotary valve 3, continuous air supply from the compression air generation means is done to the conduit (pneumatic transport pipe) T2 through the bypass pipe Tv. Therefore, absolute retention of air supplied from the compressed air generation means isn't generated so that vibration (low frequency), which may be caused for the pulsating vibration air generation means 1, isn't arisen. As a result, there is no work environmental problem such that operators feel bad while operating the pulsating vibration air generation means 91.

If air suction means is used as the air source 84, when the air supply port h2 of the casing 2 is closed by the circumferential surface S3 of the drum type rotary valve 3, air flow (negative air) toward the air suction means generated by driving the air suction means is generated in the pneumatic transport pipe connected to the wave transmission port h1 of the casing 2 through the bypass pipe Tv.

According to the pulsating vibration air generation means 91, even if the air supply port h2 of the casing 2 is closed by the circumferential surface S3 of the drum type rotary valve 3, continuous air flow (negative air) is generated in the conduit (pneumatic transport pipe) T2 through the bypass pipe Tv. Therefore, there is no phenomenon such that air directing to the air suction means is completely shut off in the pulsating vibration air generation means 91, so that vibration (low frequency), which may be caused when the air toward the air suction means is completely shut off, isn't happened. As a result, there is no work environmental problem such that operators feel bad while operating the pulsating vibration air generation means 91.

According to the pulsating vibration air generation means 91, the conduit T1 connecting the air source 84 and the air supply port h2 of the casing 2 and the conduit (pneumatic transport pipe) Tv connected to the wave transmission port h1 of the casing 2 are connected by the bypass pipe Tv and all of the compressed air or suction mode air generated by driving the air source 84 is designed to be returned in the conduit (pneumatic transport pipe) T2, so that there is no loss of drive efficiency of the air source 84.

The inventors of the present invention have confirmed by an experiment that property as positive pulsating vibration air isn't lost even if compressed mode steady pressure air is superposed on positive pulsating vibration air through the bypass pipe Tv.

Further they have also confirmed by an experiment that property as negative pulsating vibration air isn't lost even if suction mode steady pressure air is superposed on negative pulsating vibration air through the bypass pipe Tv.

In FIG. 23, the member shown as 92 is a flow control valve provided for controlling flow amount of compressed mode steady pressure air or suction mode steady pressure air flowing in the bypass pipe Tv if necessary.

Embodiment of the Invention 7

Figure 24:
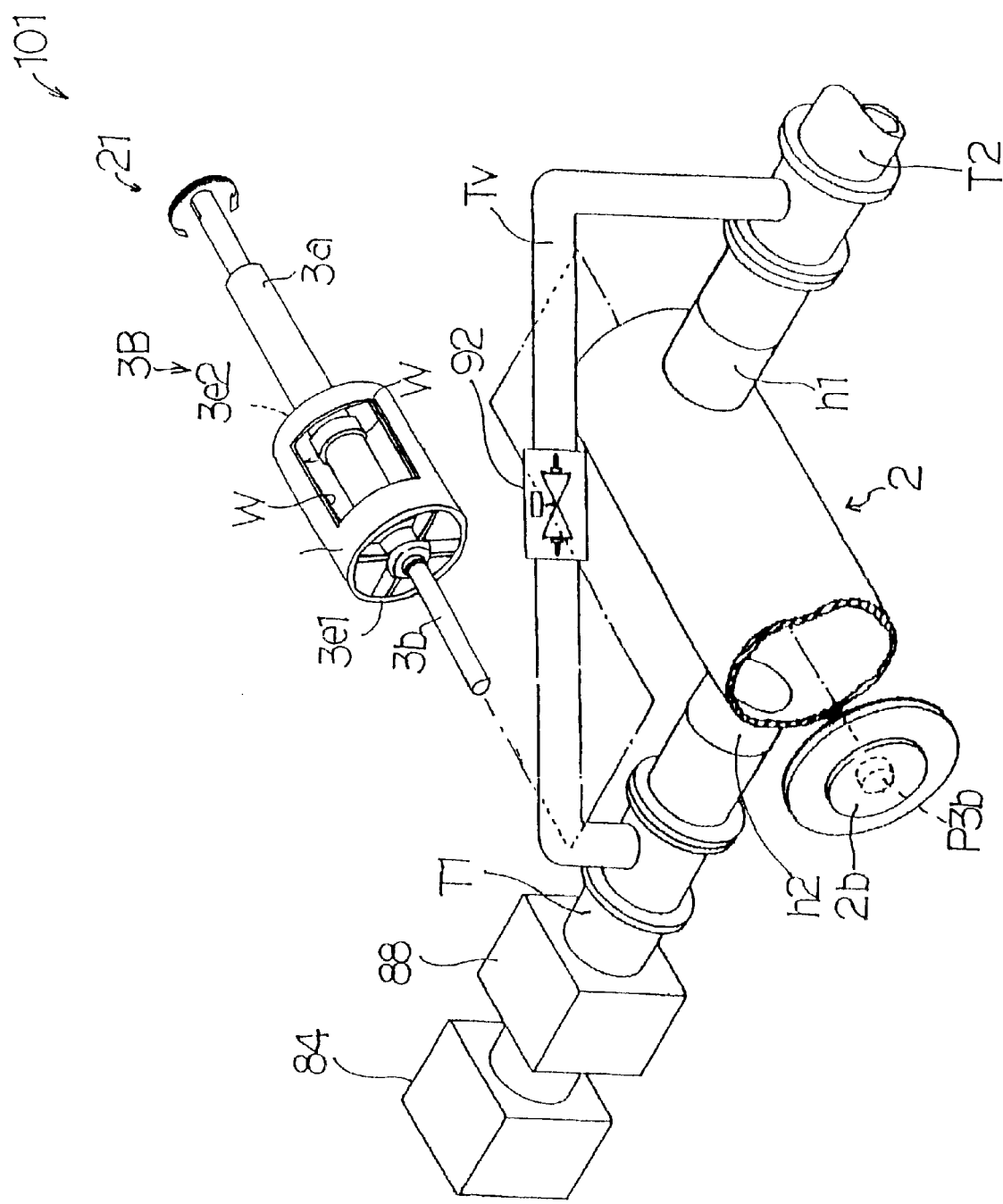
FIG. 24 shows diagrammatic construction of other embodiment of the pulsating vibration air generation means of the present invention.

FIG. 24 shows diagrammatic construction of other embodiment of the pulsating vibration air generation means of the present invention.

The pulsating vibration air generation means 101 has pulsating vibration air generation means 21 and a bypass pipe Tv.

The bypass pipe Tv is connected between a conduit T1 connecting an air source 84 and an air supply port h2 of a casing 2 and a conduit T2 (pneumatic transport pipe) connected to a wave transmission port h1 of the casing 2.

According to the pulsating vibration air generation means 101, as the bypass pipe Tv is connected between the conduit T1 connecting the air source 84 and the air supply port h2 of the casing 2 and the conduit T2 (pneumatic transport pipe) connected to the wave transmission port h1 of the casing 2, when compressed air generation means is used as the air source 84, positive air generated by driving the compressed air generation means is supplied to the conduit (pneumatic transport pipe) T2 connected to the wave transmission port h1 of the casing 2 via the bypass pipe Tv when the wall transmission port h1 of the casing is closed by a circumferential surface S3 of a drum type rotary valve 3.

Namely according to the pulsating vibration air generation means 101, even if the wave transmission port h1 of the casing 2 is closed by the circumferential surface S3 of the drum type rotary valve 3, continuous air supply from the compression air generation means is done to the conduit (pneumatic transport pipe) T2 through the bypass pipe Tv. Therefore, complete retention of air supplied from the compressed air generation means isn't generated so that vibration (low frequency), which may be caused for the pulsating vibration air generation means 1, isn't arisen. As a result, there is no work environmental problem such that operators feel bad while operating the pulsating vibration air generation means 101.

If air suction means is used as the air source 84, when the wave transmission port h1 of the casing 2 is closed by the circumferential surface S3 of the drum type rotary valve 3, air flow (negative air) toward the air suction means generated by driving the air suction means is generated in the pneumatic transport pipe connected to the wave transmission port h1 of the casing 2 through the bypass pipe Tv.

According to the pulsating vibration air generation means 101, even if the wave transmission port h1 of the casing 2 is closed by the circumferential surface S3 of the drum type rotary valve 3, continuous air flow (negative air) toward the air suction means is generated in the conduit (pneumatic transport pipe) T2 through the bypass pipe Tv. Therefore, there is no phenomenon such that air toward the air suction means is completely shut off in the pulsating vibration air generation means 101, so that vibration (low frequency), which may be caused when the air toward the air suction means is completely shut off, isn't happened. As a result, there is no work environmental problem such that operators feel bad while operating the pulsating vibration air generation means 101.

According to the pulsating vibration air generation means 101, the conduit T1 connecting the air source 84 and the air supply port h2 of the casing 2 and the conduit (pneumatic transport pipe) T2 connected to the wave transmission port h1 of the casing 2 are connected by the bypass pipe Tv and all of the compressed air or suction mode air generated by driving the air source 84 is designed to be returned in the conduit (pneumatic transport pipe) T2, so that there is no loss of drive efficiency of the air source 84.

The inventors of the present invention have confirmed by an experiment that property as positive pulsating vibration air isn't lost even if compressed mode steady pressure air is superposed on positive pulsating vibration air through the bypass pipe Tv.

Further they have also confirmed by an experiment that property as negative pulsating vibration air isn't lost even if suction mode steady pressure air is superposed on negative pulsating vibration air through the bypass pipe Tv.

Embodiment of the Invention 8

Figure 25:
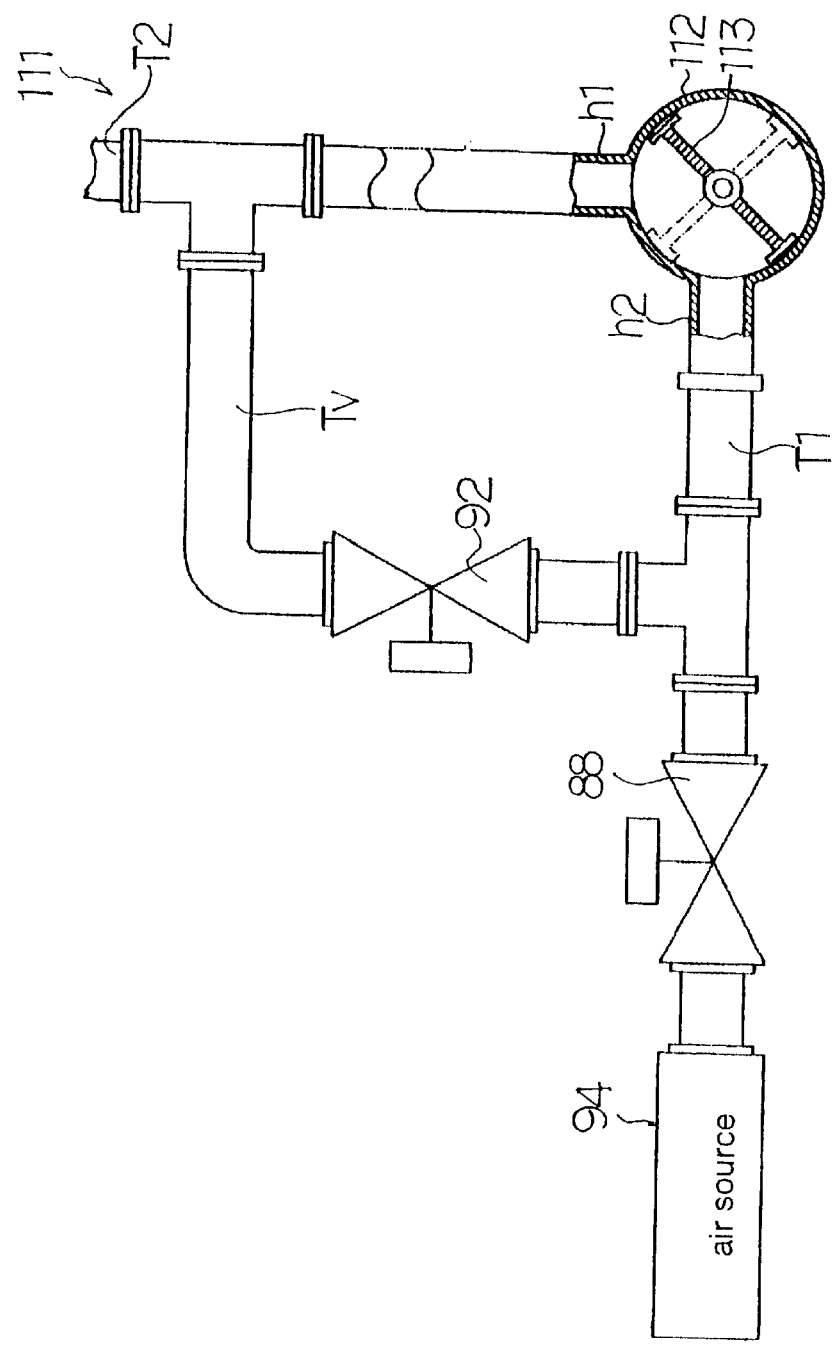
FIG. 25 shows diagrammatic construction of other embodiment of the pulsating vibration air generation means of the present invention.

FIG. 25 shows diagrammatic construction of another embodiment of the pulsating vibration air generation means of the present invention.

The pulsating vibration air generation means 111 has a casing 112 and a rotary type valve 113.

The casing 112 has an air supply port h2 connected to the air source 94 and a wave transmission port h1 at its circumferential surface.

The rotary type valve 113 is rotatably contained in the casing 112 so as to divide the space in the casing 112 into two parts.

According to the pulsating vibration air generation means 111, when the rotary type valve 113 is positioned at solid lines in the figure, the air supply port h2 and the wave transmission port h1 are communicated. If compressed air generation means is used as the air source 94, compressed air generated by driving the compressed air generation means is supplied to the conduit T2 (pneumatic transport) connected to the wave transmission port h1.

On the other hand according to the pulsating vibration air generation means 111, when the rotary type valve 113 is positioned at dotted lines in the figure, the air supply port h2 and the wave transmission port h1 are shut off by the rotary type valve 113. If compressed air generation means is used as the air source 94, compressed air generated by driving the compressed air generation means isn't supplied to the conduit T2 (pneumatic transport) connected to the wave transmission port h1.

According to the pulsating vibration air generation means 111, the above-mentioned operations are repeated while the compressed air generation means is driven and the rotary type valve 113 is driven and rotated. As a result, positive pulsating vibration air is generated in the conduit (pneumatic transport pipe) T2 connected to the wave transmission port h1.

According to the pulsating vibration air generation means 111, when the rotary type valve 113 is positioned at solid lines in the figure, the air supply port h2 and the wave transmission port h1 are communicated. If air suction means is used as the air source 94, suction mode air flow toward the wave transmission port h1 generated by driving the air suction means is generated in the conduit T2 (pneumatic transport) connected to the wave transmission port h1.

On the other hand according to the pulsating vibration air generation means 111, when the rotary type valve 113 is positioned at dotted lines in the figure, the air supply port h2 and the wave transmission port h1 are closed by the rotary type valve 113. If air suction means is used, suction mode air flow generated by driving the air suction means isn't generated in the conduit T2 (pneumatic transport) connected to the wave transmission port h1.

According to the pulsating vibration air generation means 111, the above-mentioned operations are repeated while the air suction means is driven and the rotary type valve 113 is driven and rotated. As a result, negative pulsating vibration air is generated in the conduit (pneumatic transport pipe) T2 connected to the wave transmission port h1.

Further, a bypass pipe Tv is connected between the conduit T1 connecting the air source 94 and the air supply port h2 of the casing 112 and the conduit (pneumatic transport pipe) T2 connected to the wave transmission port h1 of the casing 112.

According to the pulsating vibration air generation means 111, as the bypass pipe Tv is connected between the conduit T1 connecting the air source 94 and the air supply port h2 of the casing 112 and the conduit (pneumatic transport pipe) T2 connected to the wave transmission port h1 of the casing 112, when compressed air generation means is used as the air source 94, positive, air generated by driving the compressed air generation means is supplied to the conduit (pneumatic transport pipe) T2 connected to the wave transmission port h1 of the casing 112 through the bypass pipe Tv while the wave transmission h1 of the casing 112 is closed by the circumferential surface of the rotary type valve 113.

Namely, according to the pulsating vibration air generation means 111, while the wave transmission port h1 of the casing 112 is closed by the circumferential surface of the rotary type valve 113, air supplied from the compressed air generation means isn't completely stayed in the pulsating vibration air generation means 111 because continuous air supply form the compressed air generation means is done to the conduit (pneumatic transport pipe) T2 via the bypass pipe Tv. As a result, vibration (low frequency), which is apt to be caused when air supplied from compressed air generation means is completely retained, isn't happened in the pulsating vibration air generation means 111. Therefore, there is no work environmental problem such that operators get sick while operating the pulsating vibration air generation means if this pulsating vibration air generation means 111 is used.

When air suction means is used as the air source 94, while the wave transmission port h1 of the casing 112 is closed by the circumferential surface of the rotary type valve 113, air flow (negative air) generated by driving the air suction means toward the air suction means is generated into the air source 94 via the bypass pipe Tv.

Namely according to the pulsating vibration air generation means 111, when the wave transmission port h1 of the casing 112 is closed by the circumferential surface of the rotary type valve 113, continuous air flow (negative air) toward air suction means via the bypass pipe Tv is generated in the pneumatic transport pipe T2. Therefore, vibration (low frequency) which is caused when air toward the air suction means is completely shut off isn't happened in the pulsating vibration air generation means 111. As a result, there is no work environmental problem such that operators get sick while operating the pulsating vibration air generation means if this pulsating vibration air generation means 111 is used.

According to the pulsating vibration air generation means 111, the conduit T1 connecting the air source 94 and the air supply port h2 of the casing 112 and the pneumatic transport pipe T2 connected to the wave transmission port h1 of the casing 112 are connected by the bypass pipe Tv and all of the compressed air or suction mode air generated by driving the air source 94 is designed to be returned in the pneumatic transport pipe T2, so that there is no loss of drive efficiency of the air source 94.

The inventors of the present invention have confirmed by an experiment that property as positive pulsating vibration air isn't lost even if compressed mode steady pressure air is superposed on positive pulsating vibration air through the bypass pipe Tv.

Further they have also confirmed by an experiment that property as negative pulsating vibration air isn't lost even if suction mode steady pressure air is superposed on negative pulsating vibration air through the bypass pipe Tv.

Embodiment of the Invention 9

Figure 26:
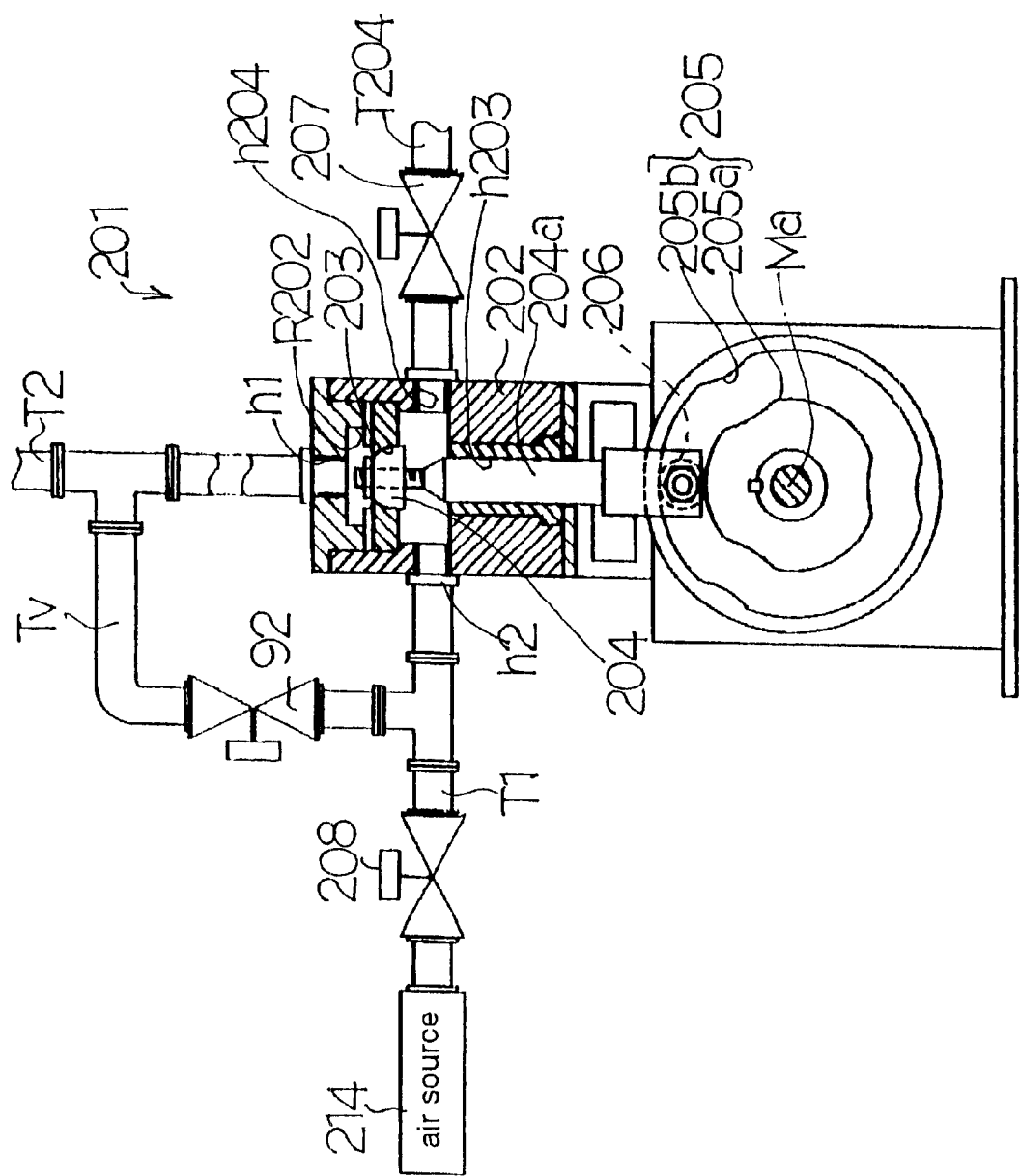
FIG. 26 shows diagrammatic construction of other embodiment of the pulsating vibration air generation means of the present invention.

FIG. 26 shows diagrammatic construction of other embodiment of the pulsating vibration air generation means of the present invention.

The pulsating vibration air generation means 201 is provided with a main body 202 including a hollow chamber R202 having an air supply port h2 connected to an air source 214 (compressed air generation means such as a blower in this embodiment) and a wave transmission port h1, a valve seat 203 provided in the hollow chamber R202 of the main body 202, a valve 204 for opening and closing the valve seat 203, and a rotary cam 205 rotatably provided for opening and closing the valve seat 203 by the valve 204.

The valve 204 has a plug 204a.

The plug 204a is up and down movably and airtightly attached in a plug insertion hole h203 provided in the main body 202.

A rotary roller 206 is rotatably attached on the lower end of the shaft 204a.

The rotary cam 205 has an inner rotary cam 205a and an outer rotary cam 205b.

A fixed concavo-convex pattern is provided on each of the inner rotary cam 205a and the outer rotary cam 205b so as to have a distance of about the diameter of the rotary roller 206.

The rotary roller 206 is rotatably inserted between the inner rotary cam 205a and the outer rotary cam 205b.

The rotary cam 205 is designed to be attached on a rotary shaft Ma of rotary drive means such as a motor (not shown).

A conduit T1 is connected between the air source 214 and the air supply port h2.

A conduit (pneumatic transport pipe) T2 is connected with the wave transmission port h1.

A hole shown as h204 is, for example, a penetrating hole designed so as to communicate with atmosphere and is provided if necessary. In this embodiment, a conduit T204 is connected with the penetrating hole h204 and a valve 207 is interposed therebetween.

The member indicated as numeral 208 in FIG. 26 shows a flow controller provided if necessary.

Next, a method for generating pulsating vibration air at the wave transmission port h1 using the pulsating vibration air generation means 201 is explained hereinafter.

For generating pulsating vibration air at the wave transmission port h1, the rotary cam 205 having a concavo-convex pattern which is suitable for mixing and dispersing powdered material depending on its physical property is attached on the rotary shaft Ma of the rotary drive means such as a motor (not shown).

Then the air source 214 (compressed air generation means such as a blower in this embodiment) is driven and positive air is transmitted in the conduit T1.

When the flow controller 208 is interposed in the conduit T1, flow amount of positive air supplied to the air supply port h2 is controlled by means of the flow controller 208.

The rotary drive means (not shown) is rotated at a fixed speed together with the above-mentioned operations, then the rotary cam 205 attached on the rotary shaft Ma is rotated at a fixed rotational speed.

The rotary roller 206 is rotated between the inner rotary cam 205a and the outer rotary cam 205b by the rotation of the rotary cam 205 and is moved up and down in compliance with the concavo-convex pattern provided for the inner rotary cam 205a and the outer rotary cam 205b respectively. Therefore, the valve 204 is moved up and down in compliance with the concavo-convex pattern of the rotary cam 205 so as to open and close the valve seat 203.

Because of the open and close of the valve seat 203 caused by up and down movement of the valve 204 according to the concavo-convex pattern of the rotary cam 205, positive pulsating vibration air is output from the transmission port h1 into the conduit T2 (pneumatic transport pipe) connected to the wave transmission port h1.

If air suction means such as a vacuum pump is used as the air source 214, negative pulsating vibration air toward the wave transmission port h1 can be generated in the conduit T2 (pneumatic transport pipe) by the same manner mentioned above.

According to the pulsating vibration air generation means 201, pulsating vibration air is generated by opening and closing the valve seat 203 by the valve 204 by means of the rotary cam 205 so that such a problem of heat generation caused by operating an electromagnetic valve for a long time doesn't happen. Therefore, such means is suitable for producing pulsating vibration air for a long time.

Further according to the pulsating vibration air generation means 201, when compressed air generation means is used as the air source 214 and powdered material is pneumatically transported, a rotary cam 205 having a concavo-convex pattern suitable for mixing and dispersing powdered material depending on its physical property is used. Accordingly there is an advantage that efficient pneumatic transportation of powdered material can be achieved.

Moreover according to the pulsating vibration air generation means 201, when air suction means is used as the air source 214 and powder attached on the surface of tablet is removed, a rotary cam 205 having a concavo-convex pattern suitable for sucking and removing powder from the surface of tablet depending on the physical property of the powder to be removed is used. Therefore, there is such an advantage that efficient powder removing operation can be achieved.

Further according to the pulsating vibration air generation means 201, a bypass pipe Tv is connected between the conduit T1 connecting the air source 214 and the air supply port h2 of the main body 202 and the conduit T2 (pneumatic transport pipe) connected to the wave transmission port h1 of the main body 101. When compressed air generation means is used as the air source 214, positive air generated by driving the compressed air generation means is supplied to the conduit (pneumatic transport pipe) T2 connected to the wave transmission port h1 of the main body 202 via the bypass pipe Tv when the valve seat 203 is closed by the valve 204.

Namely according to the pulsating vibration air generation means 201, even if the valve seat 203 is closed by the valve 203, continuous air supply from the compression air generation means is done to the conduit (pneumatic transport pipe) T2 through the bypass pipe Tv. Therefore, vibration (low frequency) which may be caused when air supplied from the compressed air generation means is completely retained, doesn't arise for the pulsating vibration air generation means 1. As a result, there is no work environmental problem such that operators feel bad while operating the pulsating vibration air generation means 201.

If air suction means is used as the air source 214, when the valve seat 203 is closed by the valve 204, air flow (negative air) toward the air suction means generated by driving the air suction means is generated in the pneumatic transport pipe T2 (pneumatic transport pipe) through the bypass pipe Tv.

According to the pulsating vibration air generation means 201, even if the valve seat 203 is closed by the valve 204, continuous air flow (negative air) is generated in the pneumatic transport pipe T2 through the bypass pipe Tv. Therefore, there is no phenomenon such that vibration (low frequency), which may be caused when the air toward the air suction means is completely shut off, doesn't arise in the pulsating vibration air generation means 201. As a result, there is no work environmental problem such that operators feel bad while operating the pulsating vibration air generation means 201.

According to the pulsating vibration air generation means 201, the conduit T1 connecting the air source 214 and the air supply port h2 of the main body 202 and the conduit (pneumatic transport pipe) T2 connected to the wave transmission port h1 of the main body 202 are connected by the bypass pipe Tv and all of the compressed air or suction mode air generated by driving the air source 214 is designed to be returned in the conduit (pneumatic transport pipe) T2, so that there is no loss of drive efficiency of the air source 214.

The inventors of the present invention have confirmed by an experiment that property as positive pulsating vibration air isn't lost even if compressed mode steady pressure air is superposed on positive pulsating vibration air through the bypass pipe Tv.

Further they have also confirmed by an experiment that property as negative pulsating vibration air isn't lost even if suction mode steady pressure air is superposed on negative pulsating vibration air through the bypass pipe Tv.

Although figures are omitted herein, in the pulsating vibration air generation means 31 in FIG. 15, if a bypass pipe (not shown) is further connected between a conduit (not shown) connecting an air source (not shown) and the air supply port h2 of the casing 2A and a conduit (pneumatic transport pipe, not shown) connected to the open end 21e1 of the inner cylinder 21 of the casing 2A, the pulsating vibration air generation means 31 can be prevented from generating vibration (low frequency), large load isn't applied on the air source, and drive efficiency loss isn't caused in the air source.

Although figures are omitted herein, in the pulsating vibration air generation means 41A in FIG. 17, if a bypass pipe (not shown) is further connected between a conduit (not shown) connecting an air source (not shown) and the air supply port h2 of the casing 2A and a conduit (pneumatic transport pipe, not shown) connected to the open end 21e1 of the inner cylinder 21 of the casing 2A, the pulsating vibration air generation means 41 can be prevented from generating vibration (low frequency), large load isn't applied on the air source, and drive efficiency loss isn't caused in the air source.

Next, applications of the pulsating vibration air generation means 91, 101, 111, 201 providing a bypass pipe Tv are explained.

Figure 27:
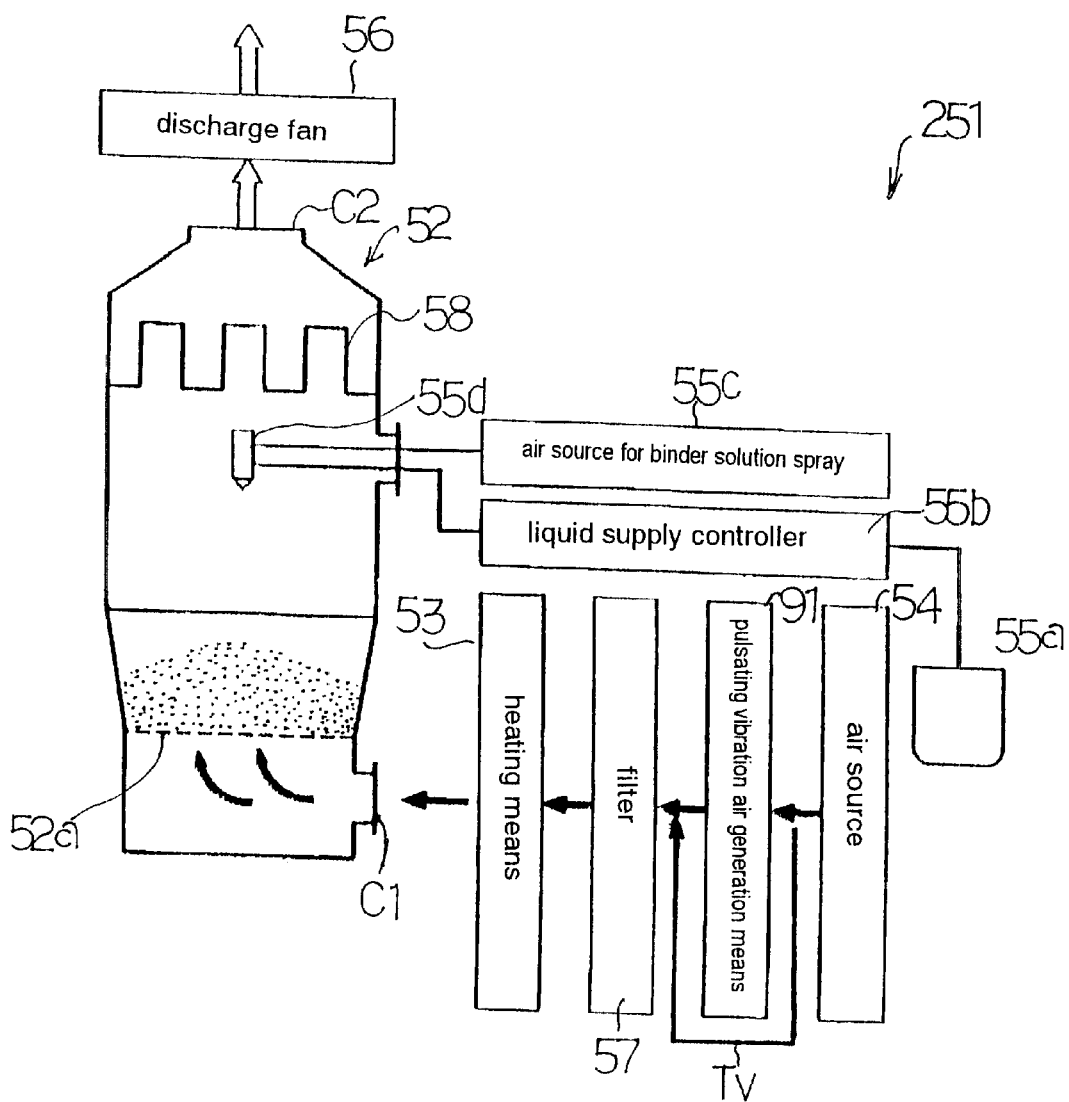
FIG. 27 shows diagrammatic construction of a fluid-bed granulation means incorporating the pulsating vibration air generation means shown in FIG. 23.

FIG. 27 shows diagrammatic construction of a fluid-bed granulation means incorporating the pulsating vibration air generation means 91.

As the fluid-bed granulation means 251 is the same as the fluid-bed granulation means 51 except that the pulsating vibration air generation means 1 is replaced with the pulsating vibration air generation means 91, the same members used for the fluid-bed granulation means 51 have the same reference numeral and their explanations are omitted.

Because the fluid-bed granulation means 251 uses the pulsating vibration air generation means 91 having a bypass pipe Tv, operators aren't annoyed by vibration (low frequency) while granulation operation.

In this embodiment, the pulsating vibration air generation means 91 is incorporated in the fluid-bed granulation means 251, however, the pulsating vibration air generation means 101, 111, 201 having the bypass pipe Tv may be used instead of the pulsating vibration generation means 91.

Figure 28:
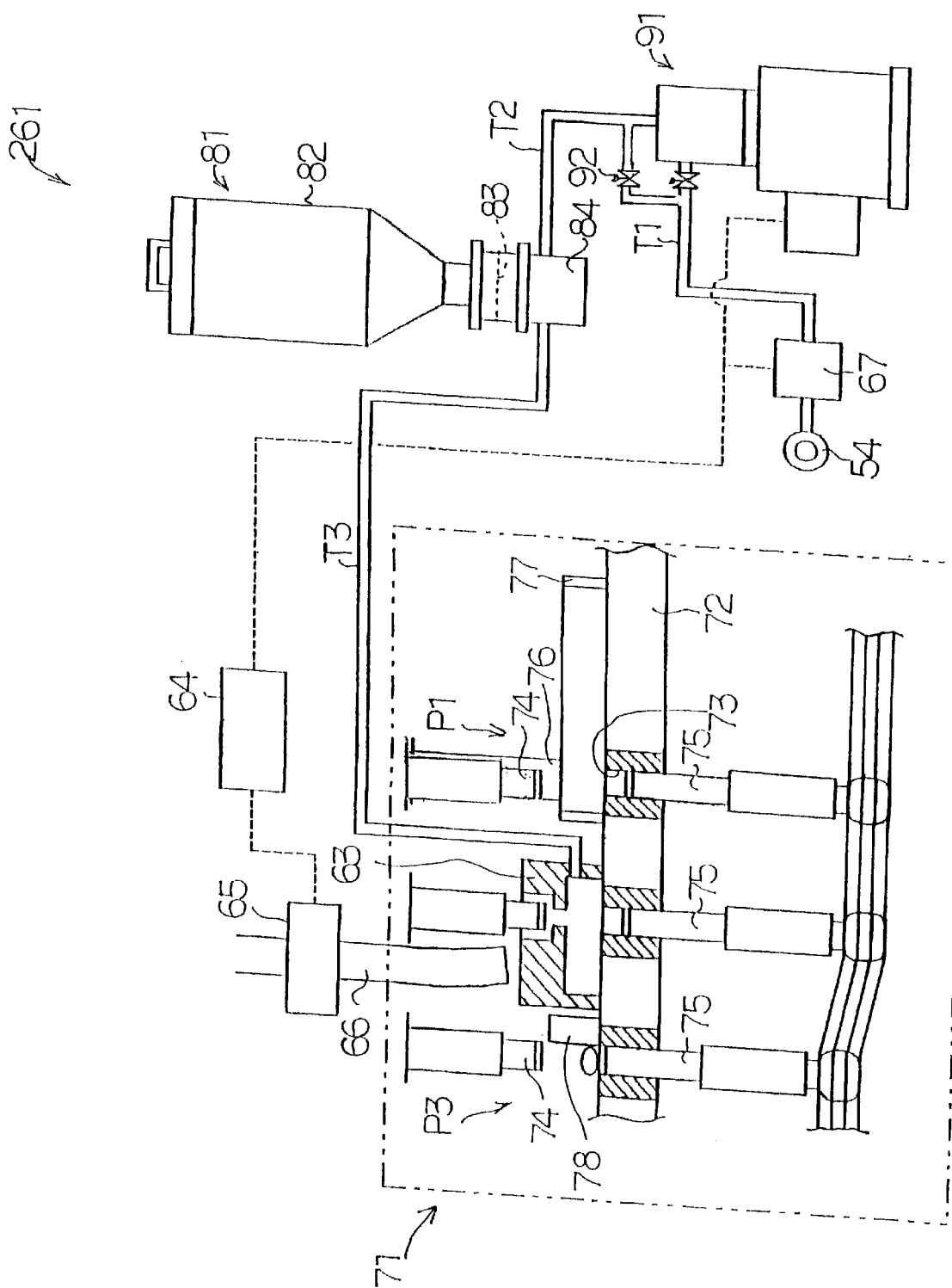
FIG. 28 shows diagrammatic construction of an external lubricant spray type tabletting means incorporating the pulsating vibration air generation means shown in FIG. 23.
Figure 29:
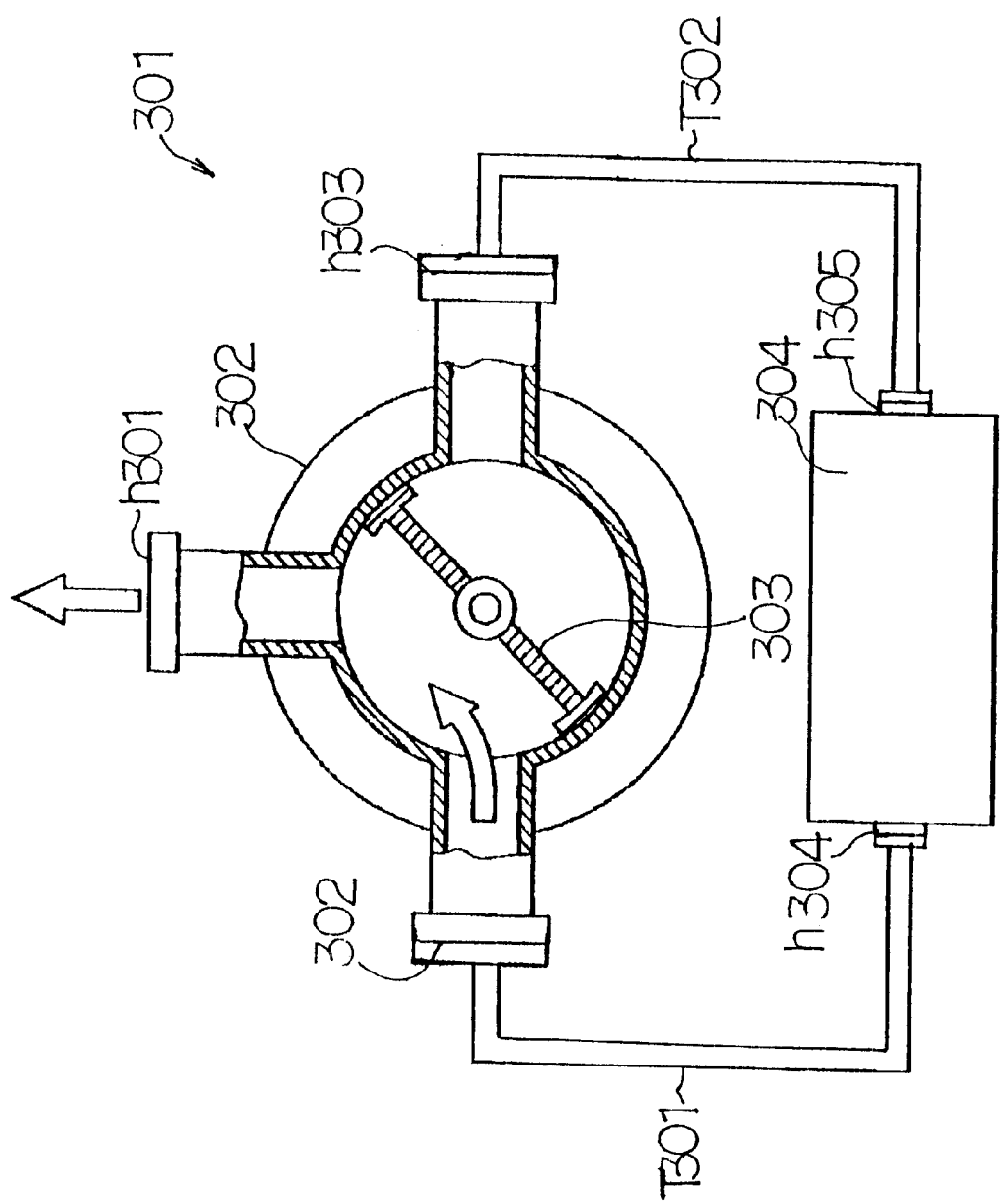
FIG. 29 shows diagrammatic construction of one embodiment of the prior pulsating vibration air generation means.
Figure 30:
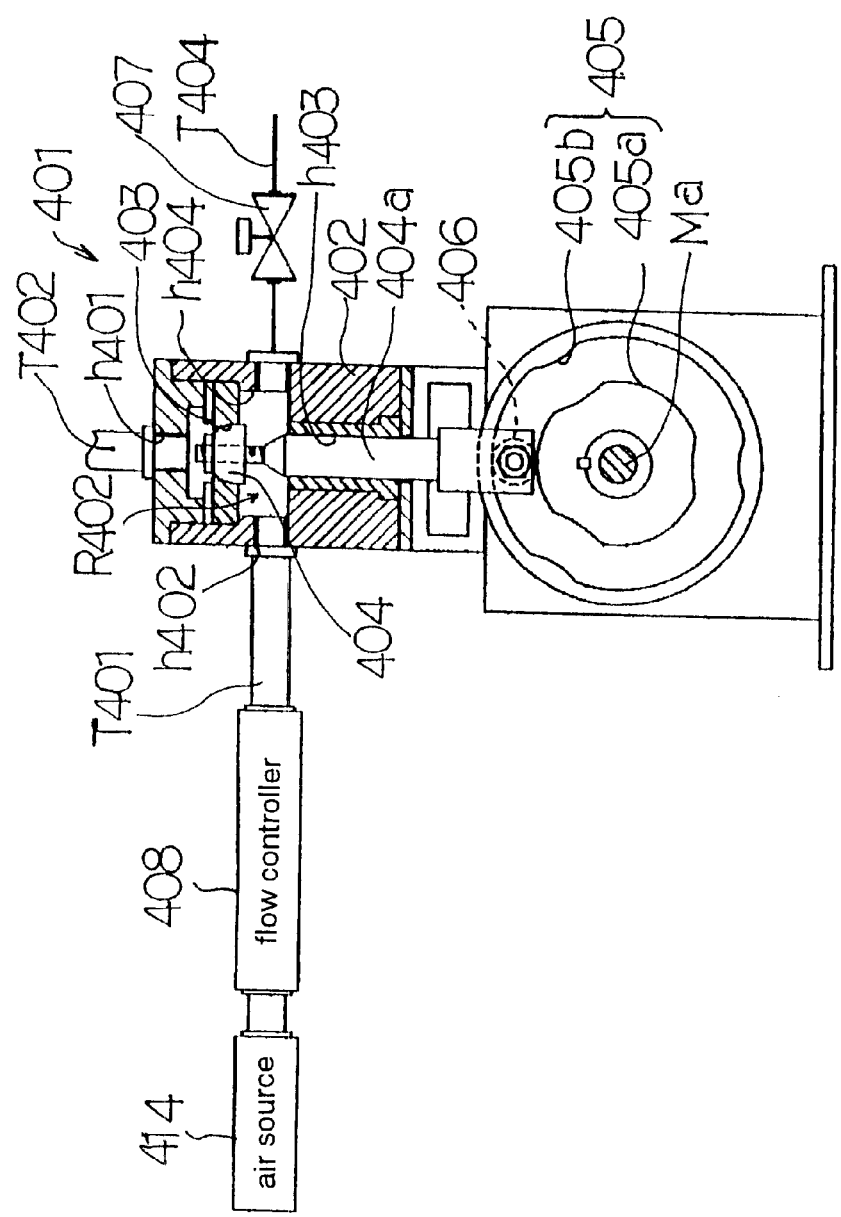
FIG. 30 shows diagrammatic construction of another embodiment of the prior pulsating vibration air generation means.

FIG. 28 shows diagrammatic construction of an external lubricant spray type tabletting means incorporating the pulsating vibration air generation means 91.

As the external lubricant spray type tabletting means 261 is the same as the external lubricant spray type tabletting means 61 except that the pulsating vibration air generation means 1 is replaced with the pulsating vibration air generation means 91, the same members used for the external lubricant spray type tabletting means 61 have the same reference numeral and their explanations are omitted.

Because the external lubricant spray type tabletting means 261 uses the pulsating vibration air generation means 91 having the bypass pipe Tv, operators aren't annoyed by vibration (low frequency) while granulation operation.

In this embodiment, the pulsating vibration air generation means 91 is incorporated in the external lubricant spray type tabletting means 261, however, the pulsating vibration air generation means 101, 111, 201 having the bypass pipe Tv may be used instead of the pulsating vibration generation means 91.

Industrial Applicability

As mentioned above, according to the pulsating vibration air generation means described in claim 1, as the drum type rotary valve having the ventilation window is contained in the casing, if the drum type rotary valve is contained in the casing so as not to have any gap between the inner circumferential surface of the casing and the outer circumferential surface of the drum type rotary valve, air isn't leaked from the wave transmission port of the casing even if high pressure air is supplied to the air supply port of the casing because the air supply port of the casing is closed by the circumferential surface of the drum type rotary valve except when the ventilation window of the drum type rotary valve is positioned at the air supply port of the casing.

Further according such pulsating vibration air generation means, as the drum type rotary valve having the ventilation window is contained in the casing, if the drum type rotary valve is contained in the casing so as not to have gap between the circumferential surface of the casing and the outer circumferential surface of the drum type rotary valve, the air supply port of the casing is closed by the circumferential surface of the drum type rotary valve except when the ventilation window of the drum type rotary valve is positioned at the air supply port of the casing. Therefore, even if air is strongly sucked by the air suction means by connecting the air suction means to the air supply port of the casing, air flow toward the wave transmission port isn't generated in the conduit (pneumatic transport pipe) connected to the wave transmission port of the casing.

Further according to the pulsating vibration air generation means, as pulsating vibration air is generated by means of the drum type rotary valve, there is no trouble such that heat generation is caused by driving an electromagnetic valve for a long time. Therefore, such pulsating vibration air generation means is suitable for generating pulsating vibration air for a long time.

Moreover, the pulsating vibration air generation means is provided with the cylindrical casing and the drum type rotary valve. As a result, there is an advantage such that when the apparatus is enlarged so as to generate large amount of pulsating vibration air, it is enough that the cylindrical casing is enlarged in its diametric direction and/or its longitudinal direction and accordingly the drum type rotary valve is enlarged in its diametric direction and/or its longitudinal direction.

According to the pulsating vibration air generation means described in claim 2, as the drum type rotary valve having the ventilation window is contained in the rotary valve, if the drum type rotary valve is contained in the casing so as not to have any gap between the inner circumferential surface of the casing and the outer circumferential surface of the drum type rotary valve, air isn't leaked from the wave transmission port of the casing even if high pressure air is supplied to the air supply port of the casing because the wave transmission port of the casing is closed by the circumferential surface of the drum type rotary valve except when the ventilation window of the drum type rotary valve is positioned at the wave transmission port of the casing.

Further according to such pulsating vibration air generation means, as the drum type rotary valve having the ventilation window is contained in the casing, if the drum type rotary valve is contained in the casing so as not to have gap between the circumferential surface of the casing and the outer circumferential surface of the drum type rotary valve, the wave transmission port of the casing is closed by the circumferential surface of the drum type rotary valve except when the ventilation window of the drum type rotary valve is positioned at the wave transmission port of the casing. Therefore, even if air is strongly sucked by the air suction means by connecting the air suction means to the air supply port of the casing, air flow toward the wave transmission port isn't generated in the conduit (pneumatic transport pipe) connected to the wave transmission port of the casing.

Further according to the pulsating vibration air generation means, as pulsating vibration air is generated by means of the drum type rotary valve, there is no trouble such that heat generation is caused by driving an electromagnetic valve for a long time. Therefore, such pulsating vibration air generation means is suitable for generating pulsating vibration air for a long time.

Moreover, the pulsating vibration air generation means is provided with the cylindrical casing and the drum type rotary valve. As a result, there is an advantage such that when the apparatus is enlarged so as to generate large amount of pulsating vibration air, it is enough that the cylindrical casing is enlarged in its diametric direction and/or its longitudinal direction and accordingly the drum type rotary valve is enlarged in its diametric direction and/or its longitudinal direction.

According to the pulsating vibration air generation means described in claim 3, the bypass pipe is connected between the conduit connecting the air source and the air supply port of the casing and the pneumatic transport pipe connected to the wave transmission port of the casing. If compression air generation means is used as air source, the compressed air generated by driving the compressed air generation means is supplied to the pneumatic transport pipe connected to the wave transmission port of the casing via the bypass pipe when the air supply port or wave transmission port of the casing is closed by the circumferential surface of the drum type rotary valve.

In other words, even if the air supply port or the wave transmission port of the casing is closed by the circumferential surface of the drum type rotary valve, continuous air supply is executed to the pneumatic transport pipe from the compressed air generation means through the bypass pipe. As a result, according to the pulsating vibration air generation means, because complete retention of air supplied from the compressed air generation means isn't caused, vibration (low frequency), which is apt to be caused when complete air retention is generated, isn't happened. Accordingly, there is no work environmental problem such that operators feel bad while operating such pulsating vibration air generation means.

Further, when air suction means is used as an air source, and when the air supply port or the wave transmission port of the casing is closed by the circumferential surface of the drum type rotary valve, air flow (negative pressure) toward the air suction means generated by driving the air suction means is generated in the pneumatic transport pipe connected to the wave transmission port of the casing through the bypass pipe.

Namely, according to the pulsating vibration air generation means, even if the air supply port or the wave transmission port of the casing is closed by the circumferential surface of the drum type rotary valve, continuous air flow (negative air) toward the air suction means via the bypass pipe is generated in the pneumatic transport pipe. Therefore, vibration (low frequency), which is apt to be caused when air flow to the air suction means is completely shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the casing and the pneumatic transport pipe connected to the wave transmission port of the casing and all of the compressed air or suction mode air generated by driving the air source is designed to be returned to the pneumatic transport pipe, so that there is no driving efficiency loss of the air source.

According to the pulsating vibration air generation means described in claim 4, the casing is double structure with the inner cylinder and the outer cylinder and the opening provided for the circumferential surface of the inner cylinder is located at where the circumferential surface of the drum type rotary valve is located when the drum type rotary valve is contained in the inner cylinder.

Therefore, when the compressed air generation means is used as an air source, the drum type rotary valve is rotated in the inner cylinder, and the circumferential surface of the drum type rotary valve other than the ventilation window is located at the opening, the opening is closed by the circumferential surface of the drum type rotary valve. Therefore, the compressed air supplied from the air supply port provided at the circumferential surface of the outer cylinder isn't discharged from the open end of the rotary valve.

On the other hand, when the ventilation window provided at the circumferential surface of the drum type rotary valve comes to the opening of the circumferential surface of the inner cylinder, the ventilation window and the opening are communicated so that the compressed air supplied from the air supply port provided at the circumferential surface of the outer cylinder is supplied to the drum type rotary valve via the ventilation window provided at the circumferential surface of the drum type rotary valve and is discharged from one end of the drum type rotary valve.

When compressed air is used as an air source and the drum type rotary valve is rotated in the inner cylinder, discharge and stop of compressed air from the one end of the drum type rotary valve are repeated, as the result, positive pulsating vibration air is supplied in the conduit (pneumatic transport pipe) connected to the open end of the inner cylinder.

Further, when compressed air generation means is used as an air source, the drum type rotary valve is rotated in the inner cylinder, the circumferential surface of the drum type rotary valve other than the ventilation window is located at the opening, the opening is closed by the circumferential surface of the drum type rotary valve. Therefore, air flow toward the open end of the rotary valve isn't generated at the open end of the rotary valve.

On the other hand, when the ventilation window provided at the circumferential surface of the drum type rotary valve comes to the opening of the circumferential surface of the inner cylinder, the ventilation window and the opening are communicated. As a result, the air supply port provided at the circumferential surface of the outer cylinder and the open end of the rotary valve are communicated through the ventilation window and the opening, so that air flow toward the open end of the rotary valve is generated at the open end of the rotary valve.

When air suction means is used as an air source and the drum type rotary valve is rotated in the inner cylinder, flow and stop of air flow toward the open end of the rotary valve are repeated, as the result, negative pulsating vibration air is generated in the conduit (pneumatic transport pipe) connected to the open end of the inner cylinder when the conduit (pneumatic transport pipe) is connected to the opening end of the inner cylinder.

According to the pulsating vibration air generation means described in claim 5, as the bypass pipe is connected between the conduit connecting the air source and the air supply port of the casing and the pneumatic transport pipe connected to the wave transmission port of the casing, when compressed air generation means is used as an air source, positive air generated by driving the compression air generation means is supplied to the pneumatic transport pipe connected to the wave transmission port of the casing through the bypass pipe when the wave transmission port of the casing is closed by the circumferential surface of the drum type rotary valve.

In other words, even if the wave transmission port of the casing is closed by the circumferential surface of the rotary valve, continuous air supply is executed to the pneumatic transport pipe from the compressed air generation means through the bypass pipe. As a result, according to the pulsating vibration air generation means, vibration (low frequency), which is apt to be caused when retention of air supplied from the compressed air generation means is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the wave transmission port of the casing is closed by the circumferential surface of the rotary valve is generated in the pneumatic transport pipe connected to the wave transmission port of the casing through the bypass pipe.

Namely, according to the pulsating vibration air generation means, even if the wave transmission port of the casing is closed by the circumferential surface of the drum type rotary valve, continuous air flow (negative air) toward the air suction means via the bypass pipe is generated in the pneumatic transport pipe. Therefore, vibration (low frequency), which is apt to be caused when air flow to the air suction means is completely shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the outer cylinder and the pneumatic transport pipe connected to the open end of the inner cylinder and all of the compressed air or suction mode air generated by driving the air source is designed to be returned to the pneumatic transport pipe, so that there is no driving efficiency loss of the air source.

According to the pulsating vibration air generation means described in claim 6, as the bypass pipe is connected between the conduit connecting the air source and the air supply port of the casing and the pneumatic transport pipe connected to the wave transmission port of the casing, when compressed air generation means is used as an air source, positive air generated by driving the compression air generation means is supplied to the pneumatic transport pipe connected to the wave transmission port of the casing through the bypass pipe when the wave transmission port of the casing is closed by the circumferential surface of the rotary type valve.

In other words, even if the wave transmission port of the casing is closed by the circumferential surface of the rotary type valve, continuous air supply is executed to the pneumatic transport pipe from the compressed air generation means through the bypass pipe. As a result, according to the pulsating vibration air generation means, vibration (low frequency), which is apt to be caused when retention of air supplied from the compressed air generation means is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the wave transmission port of the casing is closed by the circumferential surface of the rotary type valve is generated in the pneumatic transport pipe connected to the wave transmission port of the casing through the bypass pipe.

Namely, according to the pulsating vibration air generation means, even if the wave transmission port of the casing is closed by the circumferential surface of the rotary type valve, continuous air flow (negative air) toward the air suction means via the bypass pipe is generated in the pneumatic transport pipe. Therefore, vibration (low frequency), which is apt to be caused when air flow to the air suction means is completely shut off, isn't generated. As a result, there is no work environmental problem such that operators feel bad while operating such pulsating vibration air generation means.

Further according to the pulsating vibration air generation means, the bypass pipe is connected between the conduit connecting the air source and the air supply port of the casing and the pneumatic transport pipe connected to the wave transmission port of the casing and all of the compressed air or suction mode air generated by driving the air source is designed to be returned to the pneumatic transport pipe, so that there is no driving efficiency loss of the air source.

According to the pulsating vibration air generation means described in claim 7, as the bypass pipe is connected between the conduit connecting the air source and the air supply port of the main body and the pneumatic transport pipe connected to the wave transmission port of the main body, when compressed air generation means is used as an air source, positive air generated by driving the compression air generation means is supplied to the pneumatic transport pipe connected to the wave transmission port of the main body through the bypass pipe when the valve seat is closed by the valve.

In other words, even if the valve seat is closed by the valve, continuous air supply is executed to the pneumatic transport pipe from the compressed air generation means through the bypass pipe. As a result, according to the pulsating vibration air generation means, vibration (low frequency), which is apt to be caused when retention of air supplied from the compressed air generation means is generated, isn't happened. Accordingly, there is no work environmental problem such that operators feel bad while operating such pulsating vibration air generation means.

Further, when air suction means is used as an air source, air flow (negative pressure) toward the air suction means generated by driving the air suction means when the valve seat is closed by the valve is generated in the pneumatic transport pipe connected to the wave transmission port of the casing through the bypass pipe.

Namely, according to the pulsating vibration air generation means, even if the valve seat is closed by the valve, continuous air flow (negative air) toward the air suction means via the bypass pipe is generated in the pneumatic transport pipe. Therefore, vibration (low frequency), which is apt to be caused when air flow to the air suction means is shut off, isn't generated. As a result, there is nowork environmental problem such that operators feel bad while operating such pulsating vibration air generation means.

Further according to the pulsating vibration air generation means, the bypass pipe is connected between the conduit connecting the air source and the air supply port of the main body and the pneumatic transport pipe connected to the wave transmission port of the main body and all of the compressed air or suction mode air generated by driving the air source is designed to be returned to the pneumatic transport pipe, so that there is no driving efficiency loss of the air source.

According to the pulsating vibration air generation means described in claim 8, positive pulsating vibration air can be generated because the compressed air generation means is used as an air source.

Therefore, the pulsating vibration air generation means can be preferably used as positive pulsating vibration air generation means for pneumatically transporting powdered material at high density.

According to the pulsating vibration air generation means described in claim 9, as the air suction means is used as an air source, negative pulsating vibration air can be generated.

Therefore, the pulsating vibration air generation means can be preferably used as negative pulsating vibration air generation means for pneumatically transporting powdered material at low density and as pulsating vibration air generation means for generating suction mode pulsating vibration air for a powder removing apparatus.

According to the pulsating vibration air generation means described in claim 10, the compressed air generation means is connected with the first connecting port provided on the circumferential surface of the casing and the air suction means is connected to the second connection port. Therefore, pulsating vibration air having large amplitude can be generated from the wave transmission port of the casing by driving both of the compression air generation means and the air suction means.

Further according to the pulsating vibration air generation means, if drive amount of the compressed air generation means is made larger than that of the air suction means, positive pulsating vibration air can be supplied in the conduit (pneumatic transport pipe) connected to the wave transmission port of the casing.

Furthermore according to the pulsating vibration air generation means, if drive amount of the air suction means is made larger than that of compressed air generation means, negative pulsating vibration air can be supplied in the conduit (pneumatic transport pipe) connected to the wave transmission port of the casing.

What is claimed is:

1. Pulsating vibration air generation means comprising;
    a cylindrical casing having an air supply port connected with an air source and a wave transmission port, and
    a drum type rotary valve constructed rotatably in said casing, wherein;
        said air supply port is provided on a circumferential surface of said casing and is located where a circumferential surface of said rotary valve is positioned when said rotary valve is contained in said casing,
        said wave transmission port provided for said casing is located apart from where the circumferential surface of said rotary valve is positioned when said rotary valve is contained in said casing,
        said drum type rotary valve is comprised of a rotary support shaft at a center axis of said rotary valve, one end of said rotary valve is opened, another end of said rotary valve is closed, at least one ventilation window is provided at the circumferential surface of said rotary valve,
        said rotary valve is contained in said casing in such a manner that said open end of said rotary valve faces to said wave transmission port of said casing, and
        said at least one ventilation window provided at the circumferential surface of said rotary valve is designed to intermittently meet said air supply port provided on the circumferential surface of said casing according to rotation of said valve when rotary drive means is connected with said rotary support shaft and said rotary drive means is driven so as to rotate said rotary valve in said casing.

2. Pulsating vibration air generation means comprising;
    a cylindrical casing having an air supply port connected with an air source and a wave transmission port, and
    a drum type rotary valve constructed rotatably in said casing, wherein;
        said wave transmission port is provided on a circumferential surface of said casing and is located where a circumferential surface of said rotary valve is positioned when said rotary valve is contained in said casing,
        said air supply port provided for said casing is located apart from where the circumferential surface of said rotary valve is positioned when said rotary valve is contained in said casing,
        said drum type rotary valve is comprised of a rotary support shaft at a center axis of said rotary valve, one end of said rotary valve is opened, another end of said rotary valve is closed, at least one ventilation window is provided at the circumferential surface of said rotary valve, said rotary valve is contained in said casing in such a manner that said open end of said rotary valve faces to said air supply port of said casing, and said at least one ventilation window provided at the circumferential surface of said rotary valve is designed to intermittently meet said wave transmission port provided on the circumferential surface of said casing according to rotation of said valve when rotary drive means is connected with said rotary support shaft and said rotary drive means is driven so as to rotate said valve in said casing.

3. Pulsating vibration air generation means as set forth in claim 1 or 2 wherein a bypass pipe is connected between a conduit connecting said air source and said air supply port of said casing and a pneumatic transport pipe connected to said wave transmission port of said casing.

4. Pulsating vibration air generation means as set forth in claim 3 wherein said air source is compressed air generation means.

5. Pulsating vibration air generation means as set forth in claim 3 wherein said air source is air suction means.

6. Pulsating vibration air generation means, comprising;
a casing doubly constructed with an inner cylinder and an outer cylinder spaced apart, said casing forming an annular space by closing both ends of the inner cylinder and the outer cylinder, an air supply port connected with an air source being provided at a circumferential surface of said outer cylinder, an opening being provided at a circumferential surface of said inner cylinder, and one end of said inner cylinder being opened, a drum type rotary valve rotatably provided in said inner cylinder of said casing, wherein;
said opening provided on the circumferential surface of said inner cylinder is located where the circumferential surface of said rotary valve is positioned when said rotary valve is contained in said inner cylinder, said drum type rotary valve is comprised of a rotary support shaft at a center axis of said rotary valve, one end of said rotary valve is opened, another end of said rotary valve is closed, and at least one ventilation window is provided at the circumferential surface of said rotary valve, said rotary valve is contained in said inner cylinder in such a manner that said open end of said rotary valve faces to said opening of said inner cylinder of said casing, and said at least one ventilation window provided at a circumferential surface of said rotary valve is designed to intermittently meet said opening provided on the circumferential surface of said inner cylinder of said casing according to rotation of said rotary valve when rotary drive means is connected with said rotary support shaft and the rotary drive means is driven so as to rotate said rotary valve in said inner cylinder of said casing.

7. Pulsating vibration air generation means as set forth in claim 6 wherein a bypass pipe is connected between a conduit connecting said air source and said air supply port of said outer cylinder and a pneumatic transport pipe connected to said open end of said inner cylinder.

8. Pulsating vibration air generation means, comprising;
a casing having an air supply port connected with an air source and a wave transmission port at a circumferential surface thereof, a rotary type valve provided rotatably in said casing so as to divide said casing into two spaces, and a bypass pipe connecting between a conduit connecting said air source and said air supply port of said casing and a pneumatic transport pipe connected to said wave transmission port of said casing.

9. Pulsating vibration air generation means, comprising;
a main body having a hollow chamber with an air supply port connected to an air source and a wave transmission port, a valve seat provided in said hollow chamber in said main body, a valve for opening and closing said valve seat, and a rotary cam provided rotatably for opening and closing said valve for said valve seat, wherein;
a rotary roller is rotatably attached to a lower end of a shaft of said valve, said rotary cam is comprised of an inner rotary cam and an outer rotary cam, each of said rotary cams having a predetermined concavo-convex pattern so as to be separated at a distance of approximate diameter of said rotary roller, said rotary roller is rotatably inserted between said inner rotary cam and said outer rotary cam, said valve is moved up and down according to said predetermined concavo-convex pattern of said inner rotary cam and said outer rotary cam comprising said rotary cam so as to open and close said valve seat when rotary drive means is connected to a rotary shaft of said rotary cam and said rotary drive means is driven to rotate said rotary cam, and a bypass pipe is connected between a conduit connecting said air source and said air supply port of said main body and a pneumatic transport pipe connected to said wave transmission port of said main body.

10. Pulsating vibration air generation means as set forth in any one of claims 1, 2 and 6–9 wherein said air source is compressed air generation means.

11. Pulsating vibration air generation means as set forth in any one of claims 1, 2 and 6–9 wherein said air source is air suction means.

12. Pulsating vibration air generation means, comprising;
a cylindrical casing having a wave transmission port on a circumferential surface thereof and having a first connection port and a second connection port disposed so as to face each other with a fixed distance on the circumferential surface, and a drum type rotary valve rotatably provided in said casing, wherein;
said first connection port and said second connection port on said circumferential surface of said casing are provided where said circumferential surface of said rotary valve is positioned when said rotary valve is contained in said casing, said wave transmission port on said circumferential surface of said casing is provided apart from where said circumferential surface of said rotary valve is positioned when said rotary valve is contained in said casing, compressed air generation means is connected with said first connection port on said circumferential surface of said casing, air suction means is connected with said second connection port on said circumferential surface of said casing, said drum type rotary valve has a rotary support shaft at a center axis of said rotary valve, one end of said rotary valve is opened, another end of said rotary valve is closed, and at least one ventilation window is provided on said circumferential surface of said rotary valve, said rotary valve is contained in said casing in such a manner that one open end of said rotary valve faces to said wave transmission port of said casing, said at least one ventilation window on said circumferential surface of said rotary valve is designed to intermittently meet said first connection port and said second connection port on said circumferential surface of said casing according to rotation of said rotary valve when rotary drive means is connected with said rotary support shaft and said rotary drive means is driven so as to rotate said valve in said casing.

* * * * *